(12) United States Patent
Kadono et al.

(10) Patent No.: US 7,167,591 B2
(45) Date of Patent: Jan. 23, 2007

(54) IMAGE ENCODING METHOD AND IMAGE DECODING METHOD

(75) Inventors: Shinya Kadono, Nishinomiya (JP); Satoshi Kondo, Yawata (JP); Makoto Hagai, Moriguchi (JP); Kiyofumi Abe, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 246 days.

(21) Appl. No.: 10/478,184

(22) PCT Filed: Apr. 10, 2003

(86) PCT No.: PCT/JP03/04538

§ 371 (c)(1),
(2), (4) Date: Nov. 19, 2003

(87) PCT Pub. No.: WO03/088677

PCT Pub. Date: Oct. 23, 2003

(65) Prior Publication Data

US 2004/0146212 A1    Jul. 29, 2004

Related U.S. Application Data

(60) Provisional application No. 60/377,656, filed on May 6, 2002.

(30) Foreign Application Priority Data

| Apr. 12, 2002 | (JP) | ............................. 2002-110424 |
| Jun. 28, 2002 | (JP) | ............................. 2002-190955 |
| Feb. 26, 2003 | (JP) | ............................. 2003-049711 |

(51) Int. Cl.
    *G06K 9/46* (2006.01)

(52) U.S. Cl. ...................... 382/236; 382/237; 382/238; 382/239

(58) Field of Classification Search ................ 382/233, 382/234, 235, 236, 245, 248, 242, 237, 238, 382/239
See application file for complete search history.

(56) References Cited

U.S. PATENT DOCUMENTS

| 2,316,279 | A | * | 4/1943 | Osbrink ...................... 164/224 |
| 5,289,276 | A | | 2/1994 | Siracusa et al. |
| 5,291,592 | A | * | 3/1994 | Kita ........................ 707/104.1 |
| 5,579,393 | A | * | 11/1996 | Conner et al. .............. 713/176 |
| 6,411,394 | B1 | * | 6/2002 | Nakamura et al. ......... 358/1.15 |
| 6,463,209 | B2 | * | 10/2002 | Schultz et al. .............. 386/125 |
| 6,668,374 | B1 | * | 12/2003 | Sten et al. .................. 717/173 |
| 6,804,299 | B2 | * | 10/2004 | Moni et al. ............ 375/240.03 |
| 6,823,016 | B1 | * | 11/2004 | Nguyen et al. ........ 375/240.25 |
| 2001/0036230 | A1 | | 11/2001 | Sugiyama |

FOREIGN PATENT DOCUMENTS

| JP | 8-280022 | 10/1996 |
| JP | 2001-103426 | 4/2001 |
| JP | 2001-209573 | 8/2001 |
| JP | 2001-258039 | 9/2001 |

OTHER PUBLICATIONS

T. Wiegand: "Joint Model No. 1 (JM-1)", ITU Study Group 16—Video Coding Experts Group, Dec. 3, 2001, pp. 1 and 3-75, XP001086629.

Thomas Wiegand: "Report of AHG on incorporation of enhanced AnnexU/H.263", VCEG Document VCEG-010, Dec. 6, 2001, pp. 1-9, XP002373819.

G. Sullivan: "Draft for H.263++ Annexes U, V and W to Recommendation H.263", ITU-T H.263++ Draft for H.263++ Annexes U, V and W to Recommendation H.263, XX, XX, Nov. 2000, pp. 1-46, XP000986538.

Y. Wang et al.: "Error Resilient Video Coding Techniques Real-Time Video Communications Over Unreliable Networks", IEEE Signal Processing Magazine, IEEE Service Center, Piscataway, NJ, Jul. 2000, pp. 61-82, XP002951457.

R. Talluri: "Error-Resilient Video Coding in the ISO MPEG-4 Standard", IEEE Communications Magazine, IEEE Service Center, New York, NY, vol. 36, No. 6, Jun. 1998, pp. 112-119, XP000668915.

S. Kadono et al.: "Error Robustness Memory Management Control Operation", Joint Video Team (JVT) of ISO/IEC MPEG & ITU-T VCEG (ISO/IEC JTC1/SC29/WG11 and ITU-T SG16 Q6), XX, XX, Jul. 22, 2002, pp. 1-7, XP002354616.

* cited by examiner

*Primary Examiner*—Samir Ahmed
*Assistant Examiner*—Yosef Kassa
(74) *Attorney, Agent, or Firm*—Wenderoth, Lind, & Ponack, L.L.P.

(57) ABSTRACT

The present invention provides an image coding method and an image decoding method by which an image can be restored correctly even if part of memory management information is lost by a transmission channel error, a candidate of a reference image that can be referred to is selected more appropriately, and coding efficiency is improved.

The image coding method includes a step for executing coding of an image (Step 100), a step for judging whether a picture in the memory which is never used as reference exists (Step 102), a step for coding memory management information for releasing the picture in the memory which is never used as reference when a picture in the memory which is never used as reference exists (Step 103), a step for releasing the picture in the memory which is never used as reference (Step 104), a step for judging whether the memory management information that releases the picture in the memory which is never used as reference is coded by coding of an image immediately before (Step 105), and a step for coding again the memory management information that releases the picture in the memory which is never used as reference when the memory management information is coded (Step 106).

1 Claim, 38 Drawing Sheets

Fig. 1
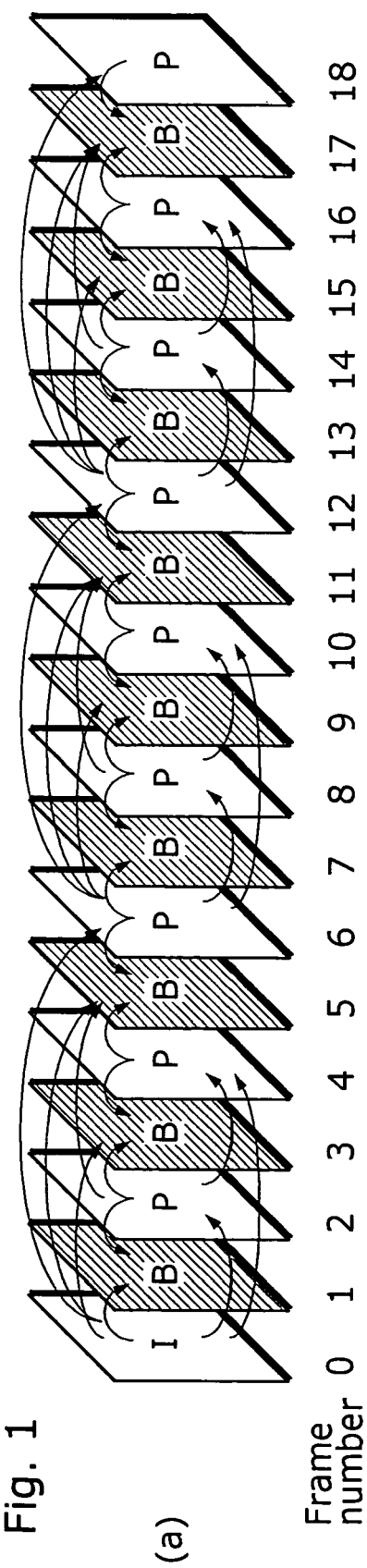
(a)
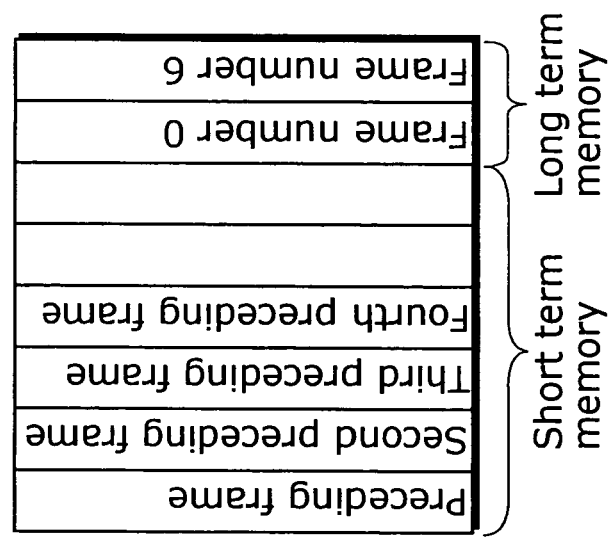
(b)

Fig. 15

| Code | Command | Added information |
|---|---|---|
| 0 | Terminate command | Non |
| 1 | Release short term memory | Released frame No. |
| 2 | Release long term memory | Released frame No. |
| 3 | Move an image from short term memory to long term memory | Frame Nos. of short term memory and long term memory |
| 4 | Change the number of pictures for long term memory | Number of pictures for long term memory |
| 5 | Initialization | Non |

Fig. 22

| Code | Command | Added information |
|---|---|---|
| 0 | Terminate command | Non |
| 1 | Release short term memory | Released frame No. |
| 2 | Release long term memory | Released frame No. |
| 3 | Move an image from short term memory to long term memory | Frame Nos. of short term memory and long term memory |
| 4 | Change the number of pictures for long term memory | Number of pictures for long term memory |
| 5 | Initialization | Non |
| 6 | Resend initialization | Initialized frame No. |

Fig. 26

| Code | Command | Added information | Processing position |
|---|---|---|---|
| A0 | Terminate command | Non | |
| A1 | Release short term memory | Released frame No. | After decoding |
| A2 | Release long term memory | Released frame No. | After decoding |
| A3 | Move an image from short term memory to long term memory | Frame Nos. of short term memory and long term memory | After decoding |
| A4 | Change the number of pictures for long term memory | Number of pictures for long term memory | After decoding |
| A5 | Initialization | Non | After decoding |
| A6 | Release short term memory | Released frame No. | Before decoding |
| A7 | Release long term memory | Released frame No. | Before decoding |
| A8 | Move an image from short term memory to long term memory | Frame Nos. of short term memory and long term memory | Before decoding |
| A9 | Change the number of pictures for long term memory | Number of pictures for long term memory | Before decoding |

Fig. 29

| Code | Command | Added information |
|---|---|---|
| 0 | Terminate command | Non |
| 1 | Release short term memory | Released frame No. |
| 2 | Release long term memory | Released frame No. |
| 3 | Move an image from short term memory to long term memory | Frame Nos. of short term memory and long term memory |
| 4 | Change the number of pictures for long term memory | Number of pictures for long term memory |
| B5 | Initialization | Initialized frame No. |

(a)

| Flag | Processing position |
|---|---|
| 0 | Before decoding |
| 1 | After decoding |

(b)

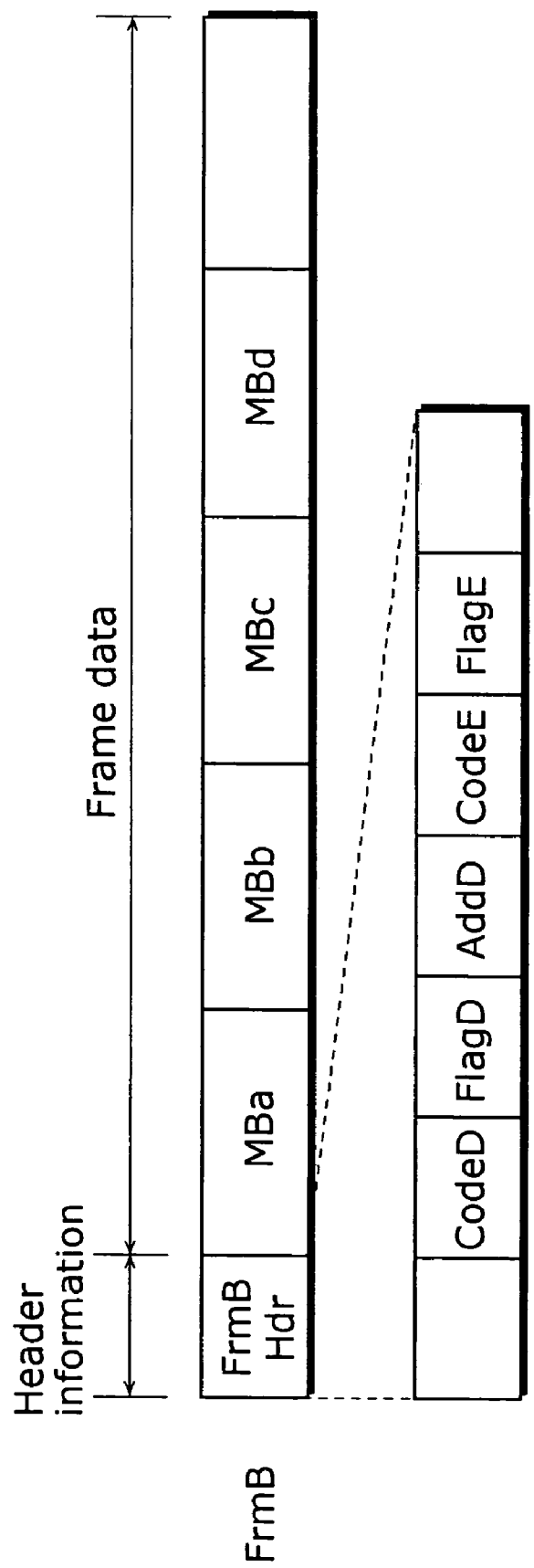

IMAGE ENCODING METHOD AND IMAGE DECODING METHOD

This application claims the benefit of prior-filed provisional application No. 60/377,656, filed May 6, 2002.

TECHNICAL FIELD

The present invention relates to an image coding method for compressing a moving picture signal efficiently utilizing correlation between pictures, an image decoding method for decoding the moving picture correctly and a program for compressing the moving picture by software.

BACKGROUND ART

In recent years, multimedia that integrates audio, video and other information relating to the audio and the video has become popular. Conventional information media, namely, a newspaper, a magazine, a TV, a radio, and a telephone are integrated into the multimedia. In general, multimedia relates and represents not only letters but also graphics, voice and particularly an image. To make conventional information media be multimedia, it is essential to represent the information in a digital form.

When information quantity of the each information media is estimated, the information quantity per letter is 1~2 bytes, while that of voice per second needs more than 64 kbits (quality of telephone conversation), and further, that of a moving picture per second needs more than 100 Mbits (standard TV broadcasting quality). Therefore, it is not realistic to utilize the enormous information of the information media as-is in the digital form. For example, a TV telephone has already been in practical use by ISDN (Integrated Service Digital Network) that has a transmission speed of 64 kbps~1.5 Mbps, but it is impossible to transmit videos of a TV and a camera directly through ISDN.

Thus, technology for compressing information is necessary. For example, in the case of a TV telephone, the moving picture compression technology of H.261 or H.263 standard standardized internationally by ITU-T (International Telecommunication Union Telecommunication Standardization Section) is used. Additionally, it is possible by the MPEG-1 standard to contain image information together with voice information in an ordinary musical CD (Compact Disk).

Here, MPEG (Moving Picture Experts Group) is an international standard for digital compression of a moving picture signal and MPEG-1 is a standard for compressing the moving picture signal to 1.5 Mbps, namely, about one-tenth of the information of a TV signal. Additionally, the transmission speed whose subject is MPEG-1 standard is mainly limited to about 1.5 Mbps; by MPEG-2 standardized to satisfy further demand for high image quality, the moving picture signal is compressed to 2~15 Mbps.

Further, in the present circumstances, by the working group (ISO/IEC JTC1/SC29/WG11) that has carried on the standardization of MPEG-1 and MPEG-2, MPEG-4 that has further higher compression ratio has been standardized. MPEG-4 not only makes it possible first to execute cording highly efficiently with a low bit rate, but also powerful error resistance technology is introduced. The technology can minimize subjective image quality degradation even if an error in a transmission channel occurs. Furthermore, ISO/IEC and ITU-T jointly carry on standardization activity of JVT (Joint Video Team) as a next generation screen coding method; at the present moment, what is called Joint Model 2 (JM2) is the latest.

Different from the conventional moving picture coding, JVT can select an arbitrary image (picture) out of plural images (pictures) as a preceding reference image. Here, a picture represents a frame or a field.

FIG. 1A is a diagram that explains the image coding that executes coding referring to a selected image out of plural reference images stored in a memory. FIG. 1B is a structure diagram that shows the structure of the memory that stores images.

As shown in FIG. 1B, the memory is made up of short term memory and long term memory. The short term memory memorizes several images coded/decoded immediately before and corresponds to reference images of so-called a P picture (Predictive Coded Picture) and a B picture (Bi-predictive Coded Picture) of MPEG-1 and MPEG-2. The long term memory is used to store an image signal longer than the short term memory.

Ordinarily, the short term memory is an FIFO (first in, first out) memory. In the case of storing an image over the upper limit of the memory, the oldest image in the short term memory is released and a new image is stored in the area. Consequently, ordinarily to refer to a reference image that has been released from the memory by the mechanism of FIFO, it is possible to refer to the reference image for a long time by moving the reference image in advance from the short term memory to the long term memory and storing the image in the long term memory. The long term memory is a method for clearly designating storage area; it is possible to refer to the picture stored in the area unless the same area is designated and overwritten.

FIG. 1A shows a predictive situation at the time of image coding; the image of the picture (frame) No. 2 refers to the image of the picture No. 0; and the image of the picture No. 1 refers to the image of the picture No. 0 or the picture No. 2. Similarly, the image of the picture No. 4 refers to the images of the picture Nos. 0 and 2; and the image of the picture No. 6 refers to the image of the picture No. 0. Further, the image of the picture No. 5 can refer to the images of the picture Nos. 0, 2, 4 and 6.

In FIG. 1A, the images of the picture Nos. 0, 6 and 12 are referred to after a relatively long time, while the images of the picture Nos. 2, 4 and 8 are referred to only by images a short time later. Consequently, as is shown in FIG. 1B, the memory area to store images is divided into the short term memory and the long term memory; and the images of the picture Nos. 0,6 and 12 can be stored in the memory that needs the long time storage.

Now, to use the memory shown in FIG. 1A effectively requires sophisticated memory management. Accordingly, a mechanism to control the memory is introduced in JVT.

Commands for controlling the memory are as follows:
1. The command for selecting images that can be referred to;
2. The command for releasing the memory area that stores the images that are useless as the reference images of the predictive coding in the short term memory; and
3. The command for moving the contents of the short term memory to the long term memory.

In coding and decoding an image, since the image that has a small prediction error in the unit of a block is selected out of the images that can be referred to, a signal that designates the reference images in the unit of a block is necessary. By electing in advance the images that can be referred to, it is possible to reduce the number of candidates of the reference images into an appropriate value and to cut down the number of bits of the reference image designation signal that is necessary in the unit of a block.

Additionally, in the case of moving images from the short term memory to the long term memory, since it is useless to store the images of the same contents in both of the short term memory and the long term memory, the images in the short term memory are released.

FIG. 2A and FIG. 2B are flowcharts that show a conventional image coding method and a conventional image decoding method.

FIG. 2A shows operations that an image coding device executes to release the memory area that stores the pictures that are never used as the reference images in the predictive coding. In FIG. 2A, for a start, the image coding device codes the inputted image (Step 100). After the coding, the image coding device examines whether there is an unnecessary area (the images that are not referred to in future coding) in the memory (Step 101) and judges whether a picture in the memory which is never used as reference exists or not (Step 102). When the picture in the memory which is never used as reference is judged to exist (Yes at Step 102), the command for releasing a picture in the memory which is never used as reference is coded as memory management information (Step 103), a picture in the memory which is never used as reference is released (an images in the memory are deleted) (Step 104) and the processing ends. On the other hand, in the case of the image coding device judging that there is no picture in the memory which is never used as reference (No at Step 102), the processing ends without executing the operations in Step 103 and Step 104.

Next, operations that an image decoding device executes to release the memory area that stores the images which are never used as reference in the predictive coding is explained based on the flowchart of FIG. 2B. For a start, the image decoding device decodes the memory management information (Step 110) and decodes an image signal from a coded signal (Step 111). The image decoding device judges whether a memory release command exists or not as a result of the examination (Step 112). If the memory release command exists (Yes at Step 112), the image decoding device judges whether there are images that should be released by the command or whether the memory has been already released (the images have already been deleted) (Step 113). If the image decoding device judges that the memory has already been released (Yes at Step 112), the image decoding device assumes that it is an ERROR because JVT prohibits transmitting the command for releasing the same image again after releasing the image from the memory and therefore to release again the memory that has already been released is the ERROR. On the other hand, if the image decoding device judges that the memory is not released (No at Step 113); it releases the memory (Step 114) and ends the processing. If it is judged that there is no memory release command (No at Step 112), the operations of Step 110 and Step 111 are not executed and the processing ends. By the way, Step 110 and Step 111 are in no particular order and may counterchange.

FIG. 3A and FIG. 3B are flowcharts that show another conventional image coding method and another conventional image decoding method.

FIG. 3A shows operations that the image coding device executes to move the images from the short term memory to the long term memory.

In FIG. 3A, for a start, the image coding device codes the inputted image (Step 120). After the coding, the image coding device examines whether there are images that should be moved to the long term memory (Step 121) and judges whether there are the images that should be moved or not (Step 122). If there are the images that should be moved (Yes at Step 122), the image coding device codes a command for indicating how the images are moved to the long term memory as the memory management information (Step 123), moves the images to the long term memory based on the command (Step 124) and ends the processing. On the other hand, in the case of the image coding device judging that there is no image that should be moved to the long term memory (No at Step 122), the image coding device does not execute the operations of Step 123 and Step 124 and ends the processing.

Next, the operations that the image decoding device executes to move the images from the short term memory to the long term memory are explained based on the flowchart of FIG. 3B. For a start, the image decoding device decodes the memory management information (Step 130). Next, the image decoding device decodes an image signal from a coded signal (Step 131). Then, the image decoding device judges whether there is a command for moving the images to the long term memory or not in the decoded memory management information (Step 132). If the image decoding device judges there is the command (Yes at Step 132), it judges next whether there are images that should be moved by the command or whether the images have already been moved (there is no image because the images are released after the move) (Step 133). JVT prohibits transmitting the command for moving the same image again to the long term memory after moving the image to the long term memory. Consequently, in the case of moving the image that has already been moved to the long term memory again to the long term memory, it is assumed to be the ERROR. Therefore, when the image decoding device judges that the image has already been moved (Yes at Step 133), the image decoding device assumes it to be the ERROR and when the image decoding device judges that the image is not moved, the image decoding device moves the image to the long term memory (Step 134) and ends the processing.

On the other hand, in the case of the image decoding device judging that there is no command for moving the image to the long term memory (No at Step 132), the image decoding device does not execute the operations of Step 133 and Step 134 and ends the processing. By the way, Step 130 and Step 131 are in no particular order and may counterchange.

FIG. 4A and FIG. 4B are flowcharts that show yet another conventional image coding method and yet another conventional image decoding method.

For a start, operations that the image coding device executes to select the image that can be referred to are explained based on the flowchart of FIG. 4A.

For a start, the image coding device selects reference images that are expected to have a high correlation with coded images (generally, reference images that are temporally close) as candidates of the reference images (Step 200). Next, the image coding device codes the designation information (a type of memory management information) that indicates the selected candidates of the reference images (Step 201), refers to and codes an appropriate reference image out of the selected candidates of the reference images in the unit of block (Step 202) and ends the processing. By the way, Step 201 and Step 202 are in no particular order and may counterchange.

Next, operations that the image decoding device executes to select the image that can be referred to are explained based on the flowchart of FIG. 4B.

For a start, the image decoding device decodes the designation information, a type of memory management information (Step 210), selects candidates of the reference images from the memory as a result (Step 211), selects an appropriate reference image out of the selected candidates of the reference images in the unit of block, decodes the appropriate reference image while referring to it (Step 212) and ends the processing.

Now, in the conventional image coding methods and the conventional image decoding methods, the image coding device codes and outputs the command for releasing images which are never used as reference from the memory and the command for moving images from the short term memory to the long term memory, and transmits the commands to the image decoding device, which decodes the commands. The number of this transmission is limited to only one picture and therefore in the case of the picture including the command being lost by a transmission error and the like, it is impossible to decode the image because the decoding device cannot decode the image placement in the memory correctly.

Furthermore, in coding and decoding an image, in the case of selecting a reference image, when the image coding device selects simply the temporally close images only as the reference image candidates, it is impossible to execute a most suitable coding considering the scalability (in an example of predictive structure in FIG. 1A, it is possible to decode an I picture (Intra Coded Picture) and a P picture (Predictive Coded Picture) even if a B picture (Bi-predictive Coded Picture) is not decoded or it is possible to decode other P pictures even if the P pictures of the picture Nos. 4, 10 and 16 are not decoded) for decoding an image. In other words, although the images that are temporally adjacent to the image of picture No. 6 are the images of picture Nos. 4 and 2, in reality, only the image of picture No. 0 can be referred to, and therefore, if the images of picture Nos. 4 and 2 are included in the candidates of the reference image, the efficiency for coding is not very good.

Further, in the conventional image coding methods, since it is prohibited to transmit the command for releasing the image which is never used as reference and the command for moving the images from the short term memory to the long term memory attaching to an image that is not stored in the memory, flexible transmission of the commands of memory management information is blocked. To prohibit transmitting the commands attaching to the image that is not stored in the memory has the following reason. Namely, the image that is not stored in the memory has the least significance; the possibility that it is not decoded by the scalability is high; the image decoding device cannot decode the image placement correctly because the commands attaching to the image that is not stored in this memory are not decoded; the reason to prohibit transmitting the commands attaching to the image that is not stored in the memory is to avoid the situation.

SUMMARY OF THE INVENTION

Accordingly, to solve the above-explained problem, it is an object of this invention to provide an image coding method and an image decoding method for restoring an image correctly even if part of memory management is lost by a transmission channel error and an image coding method and an image decoding method for selecting candidates of the reference images that can be referred to more appropriately and improving coding efficiency.

To solve this problem, the image coding method according to the present invention is an image coding method for coding a picture referring to a reference picture selected from plural reference pictures stored in a memory including:

a picture coding step for coding a picture referring to the selected reference picture; a management information coding step for coding memory management information for controlling and managing the reference, pictures stored in the memory attaching to the coded picture; and a management information recoding step for coding the memory management information again separately from the coding at the management information coding step.

As a result, since memory management information is coded and outputted plural times, even if the transmission channel error occurs when the memory management information is transmitted to the decoding device, the possibility that the picture is restored correctly becomes high because it is thinkable that any one of the memory management information that is transmitted plural times is transmitted and decoded.

Additionally, in the management information recoding step, information that identifies the coded picture to which the memory management information is attached in the management information coding step may be attached to the memory management information that is coded again.

As a result, in the case of the transmission channel error occurring when memory management information coded first attaching to a coded picture is transmitted, since a coded picture attached to memory management information is identified, it is possible to detect at which time the transmission channel error occurred.

Furthermore, in the management information coding step, when the memory management information is attached to a coded picture that is not stored in the memory, the memory management information may be also attached to a coded picture stored in the memory in the management information recoding step.

As a result, since the memory management information is attached to an important image that is decoded and stored in the memory, the decoding of the memory management information is executed with reliability and therefore the possibility that a picture is restored correctly becomes high.

Moreover, the image decoding method according to the present invention is an image decoding method for decoding a picture referring to a reference picture selected from plural reference pictures stored in a memory, the image decoding method including: a step for decoding memory management information for controlling and managing a reference picture stored in the memory; and a step for releasing the memory area when the memory area to be released has not been yet released, and executing no processing to the memory when the memory area to be released has been already released based on the decoded memory management information, in the case of releasing a picture in the memory which is never used as reference.

As a result, even if a decoding device receives memory management information that indicates to release a picture from memory plural times, the decoding device does not process it as an error and can decode a picture correctly.

Additionally, the image decoding method according to the present invention is an image decoding method for decoding a picture referring to a reference picture selected from plural reference pictures stored in memory, wherein the memory may include short term memory whose storage time of a reference picture is short and long term memory whose storage time of a reference picture can be longer than the storage time of the short term memory, and the image decoding method may include: a step for decoding memory management information for controlling and managing a reference picture stored in the memory; and a step for moving the reference picture from the short term memory to the long term memory when a reference picture of a move object exists in the short term memory and executing no move in the memory when a reference picture of a move object does not exist in the short term memory based on the decoded memory management information, in the case of moving the reference picture stored in the memory from the short term memory to the long term memory.

As a result, even if a decoding device receives memory management information plural times, the decoding device does not process it as an error and can decode a picture correctly.

Furthermore, an image coding method for coding a picture referring to a reference picture selected from plural reference pictures stored in a memory, the image coding method may include a step for coding a reference picture stored in the memory whose priority value is higher than a priority value of a coded picture as a candidate of a reference picture.

As a result, it is possible to select a candidate of a picture that can be referred to more appropriately and improve coding efficiency.

Moreover, the image coding method according to the present invention is an image coding method including: a step for coding a coded picture; a step for judging whether a reference picture that is not referred to after coding the coded picture exists in memory or not; a step for coding a command that indicates to release a picture in the memory which is never used as reference after decoding the coded picture by a decoding device that decodes coding data as a command for releasing a picture in the memory which is never used as reference for not being referred to when there is the reference picture that is not referred to; a step for releasing a picture in the memory which is never used as reference; and a step for coding a command that indicates to release a picture in the memory which is never used as reference before the below-mentioned other coded picture is decoded when another coded picture coded after the coded picture is coded.

As a result, even if the first command that indicates to release a picture in the memory which is never used as reference is dropped, the command transmitted next is executed before decoding of the picture and therefore it is possible to reduce the delay in executing the command.

Additionally, the image decoding method according to the present invention is an image decoding method including: a step for decoding memory management information for managing memory attaching to a decoded picture; a first judgment step for judging whether the memory management information is a command used before decoding that indicates to execute processing for managing memory before decoding the decoded picture; a second judgment step for judging whether processing for managing memory has been already done or not when the memory management information is judged to be the command used before decoding at the first judgment step; and a step for decoding the decoded picture when processing for managing memory is judged to be done by the second judgment step and decoding the decoded picture after processing for managing memory based on the memory management information when processing for managing memory is judged not to be done at the second judgment step.

As a result, even if the first command that indicates to release a picture in the memory which is never used as reference is dropped, the command transmitted next is executed before decoding of the picture and therefore it is possible to reduce the delay in executing the command.

Furthermore, the image coding method according to the present invention is an image coding method including: a step for coding a coded picture; a judgment step for judging whether all reference pictures in memory after the coded picture is coded are pictures that are not referred to; a step for coding an initialization command that is a command for releasing all reference pictures in the memory when all reference pictures in the memory are judged not to be referred to in the judgment step; an initialization step for releasing all reference pictures in the memory; and a step for coding an initialization resending command that is a command that indicates to release all reference pictures in memory based on added information that makes all reference pictures stored in the memory objects of release before the coded picture released at the time of coding the coded picture when another coded picture coded after the coded picture is coded.

As a result, when the initialization command is transmitted to the decoding device, even if the initialization command is dropped by the transmission channel error, it is possible to execute initialization in memory normally based on the added information of the initialization resending command.

Moreover, the image decoding method according to the present invention is an image decoding method including: a step for decoding memory management information that manages memory attaching to a decoded picture; a step for decoding the decoded picture; an initialization judgment step for judging whether there is an initialization step that is a command for releasing all reference pictures in memory in the memory management information; an initialization resending judgment step for judging whether there is an initialization resending judgment command that is a command for releasing all reference pictures in memory based on added information that indicates objects of release in order to release reference pictures stored in the memory before the other decoded picture that should be initialized and released when another decoding picture decoded before the decoded picture is decoded in the memory management information when the initialization command is not judged to exist in the memory management information in the initialization judgment step; an initialization completion judgment step for judging whether all reference pictures in memory are released when the memory management information is judged to be the initialization resending command in the initialization resending judgment step; and a release step for releasing reference pictures in memory based on the addition information when all reference pictures are judged not to be released in the initialization completion judgment step.

As a result, while the initialization command is transmitted to the decoding device, even if the initialization command has not been received at the decoding method by the transmission channel error, it is possible to execute initialization in memory correctly based on the added information of the initialization resending command.

Additionally, a recoding medium in which a data stream is recorded, the data stream being created by coding in the unit of slice with reference to a reference picture selected from plural reference pictures stored in memory, wherein the data stream may be created by coding information that designates an reference picture of an object to be released attaching to at least two slices in the case of releasing from memory reference pictures stored in the memory.

As a result, when the coding is executed in the unit of slice, even if the transmission channel error occurs when the memory management information is transmitted to the decoding device, the possibility that the picture is restored correctly in the unit of slice becomes high because it is thinkable that any one of the memory management information that is transmitted plural times is transmitted and decoded.

Furthermore, a recoding medium in which a data stream is recorded, the data stream being created by coding in the unit of slice with reference to a reference picture selected from plural reference pictures stored in memory, wherein the data stream may be created by coding information that designates an reference picture of an object to be released attaching to at least two slices in the case of releasing from memory reference pictures stored in the memory, further information that indicates that the slices has information that designates the reference picture of the object to be released may be coded by attached to the slices, and information that shows information that designates the reference picture of the object to be released is referred to when the reference picture of the object to be released is referred to in a slice that does not have information that designates the reference picture of the object to be released.

As a result, in the slice that does not have the information that designates the picture of the object to be released, since addition of the above-mentioned information can be omitted, the coding efficiency improves.

Note that the present invention can be realized not only as the image coding method and the image decoding method but also as the image coding device and the image decoding device using these methods, the recording medium in which the data stream, which is coded by the image coding method, is recorded, and a program that causes a computer to execute the steps in the image coding method and image decoding method. It is needless to say that such a program can be distributed through the recoding medium such as CD-ROM and the transmission medium such as Internet.

Further Information about Technical Background to this Application

Japanese patent application No. 2002-110424 filed on Apr. 12, 2002, Japanese patent application No. 2002-190955 dated on Jun. 28, 2002, Japanese patent application No. 2003-49711 filed on Feb. 26, 2003 and U.S. provisional patent application No. 60/377,656 filed on May 6, 2002 are incorporated herein by reference.

BRIEF DESCRIPTION OF DRAWINGS

FIG. 1A is a diagram that explains the image coding that executes coding referring to a selected image out of plural reference images stored in memory, and FIG. 1B is a structure diagram that shows the structure of the memory that stores images.

FIG. 15 is a corresponding diagram that shows the command of the memory management information in the present invention.

FIG. 22 shows the commands of the memory management information used in the eighth embodiment of the present invention.

FIG. 26 is a correspondence diagram that shows a relationship between the memory management information and the commands that are used in the ninth embodiment of the present invention.

FIG. 29A is a correspondence diagram that shows the contents of the commands and the added information, and FIG. 29B is a correspondence diagram that shows the execution timings of the commands.

FIG. 30 is a schematic diagram that shows the commands of the memory management information in the header information of a coded signal.

DETAILED DESCRIPTION OF THE INVENTION

The present embodiments of the present invention will be explained below with reference to the figures.

(The First Embodiment)

For a start, the first embodiment is explained.

Figure 5:
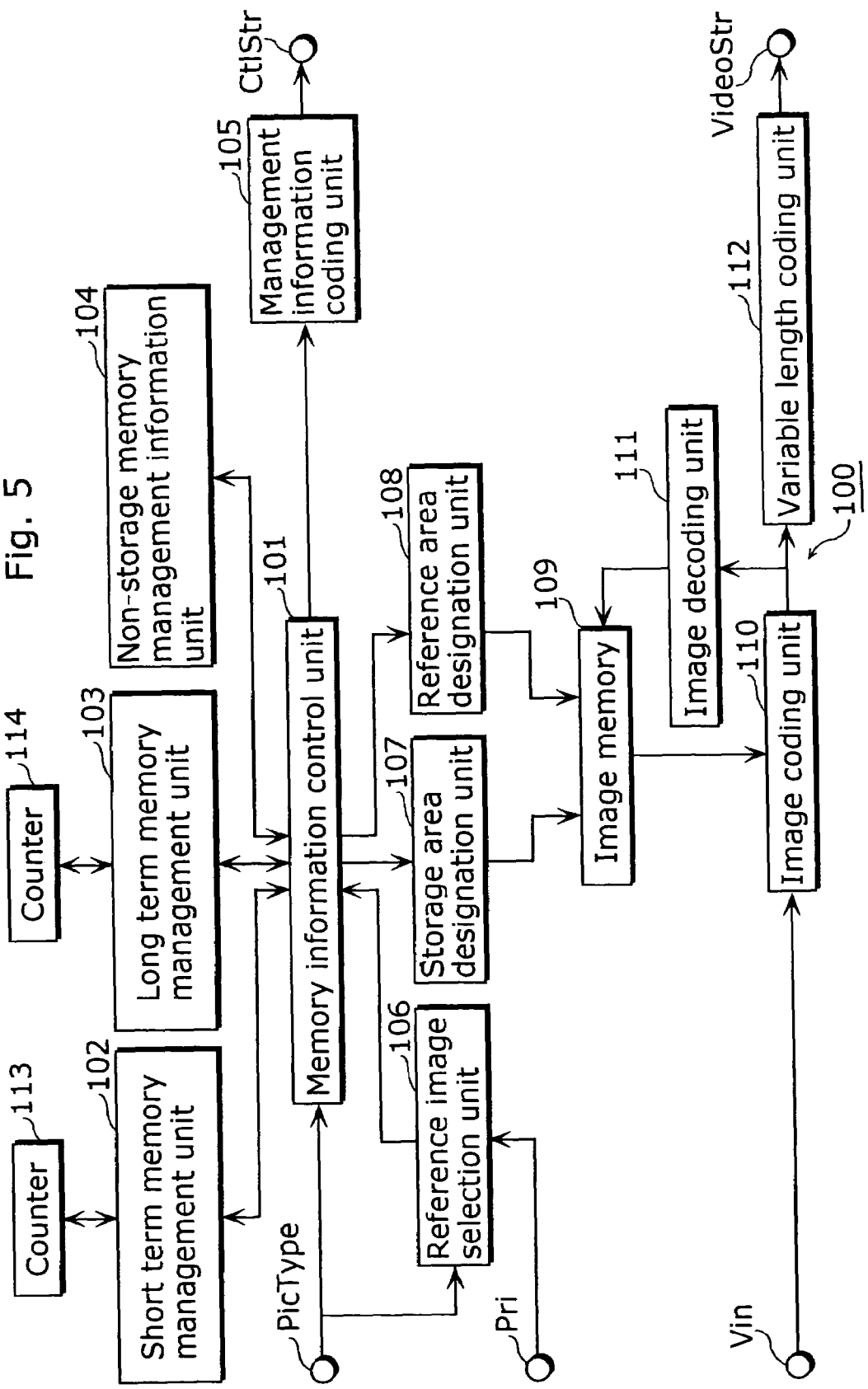
FIG. 5 is a block diagram that shows the structure of an image coding device of the present invention.

FIG. 5 is a block diagram that shows the structure of an image coding device of the first embodiment to realize an image coding method.

The image coding device 100 includes a memory information control unit 101, a short term memory management unit 102, a long term memory management unit 103, a non-storage memory management information unit 104, a management information coding unit 105, a reference image selection unit 106, a storage area designation unit 107, a reference area designation unit 108, an image memory 109, an image decoding unit 111, an image coding unit 110, a variable length coding unit 112, a counter 113 and a counter 114.

The reference image selection unit 106 selects candidates of the reference images from a priority designation signal Pri and picture type information PicType that are inputted from the outside and informs accordingly to the memory information control unit 101.

The memory information control unit 101 judges whether either or both of a preceding image (picture) and a following image can be referred to by the picture type information PicType and instructs the reference area designation unit 108 to output the corresponding reference image from the image memory 109 to the image coding unit 110.

The image coding unit 110 refers to the reference image outputted from the image memory 109 and codes the inputted image signal Vin. The variable length coding unit 112 further executes the variable length coding and outputs an image coding stream VideoStr. The output of the image coding unit 110 is again decoded to be a decoded image by the image decoding unit 111 and is stored in the image memory 109 as the reference image.

At this time, the memory position where the decoded image can be stored in the image memory 109 is designated as follows. The memory information control unit 101 inquires the short term memory management unit 102, specifies the memory position where the image was released in the short term memory and instructs the image memory 109 in order that the storage area designation unit 107 records the decoded image at the memory position.

The short term memory management unit 102 informs the memory information control unit 101 of the command for detecting unnecessary images (that are not referred to) in the short term memory and deleting them (releasing the memory). Moreover, the long term memory management unit 103 informs the memory information control unit 101 of the command for moving the images in the short term memory to the long term memory.

On the other hand, to prevent the memory management information from being damaged because part of the memory management information stream CtlStr is lost by the transmission channel error, the counter 113 for the short term memory and the counter 114 for the long term memory measure the number of codings of the command for releasing the images which are never used as reference and the command for moving the images in the short term memory to the long term memory. The transmission of the above-mentioned commands plural times becomes possible according to need.

Additionally, the non-storage memory management information unit 104 manages whether the command for releasing the images which are never used as reference and the command for moving the images in the short term memory to the long term memory are coded by attached to the image that has low priority value and is hard to be decoded. In the case of the above-mentioned commands being coded by attached to the image that has low priority value, the non-storage memory management information unit 104 instructs the memory information control unit 101 to code the commands again attaching to the image that has the higher priority value.

Figure 2:
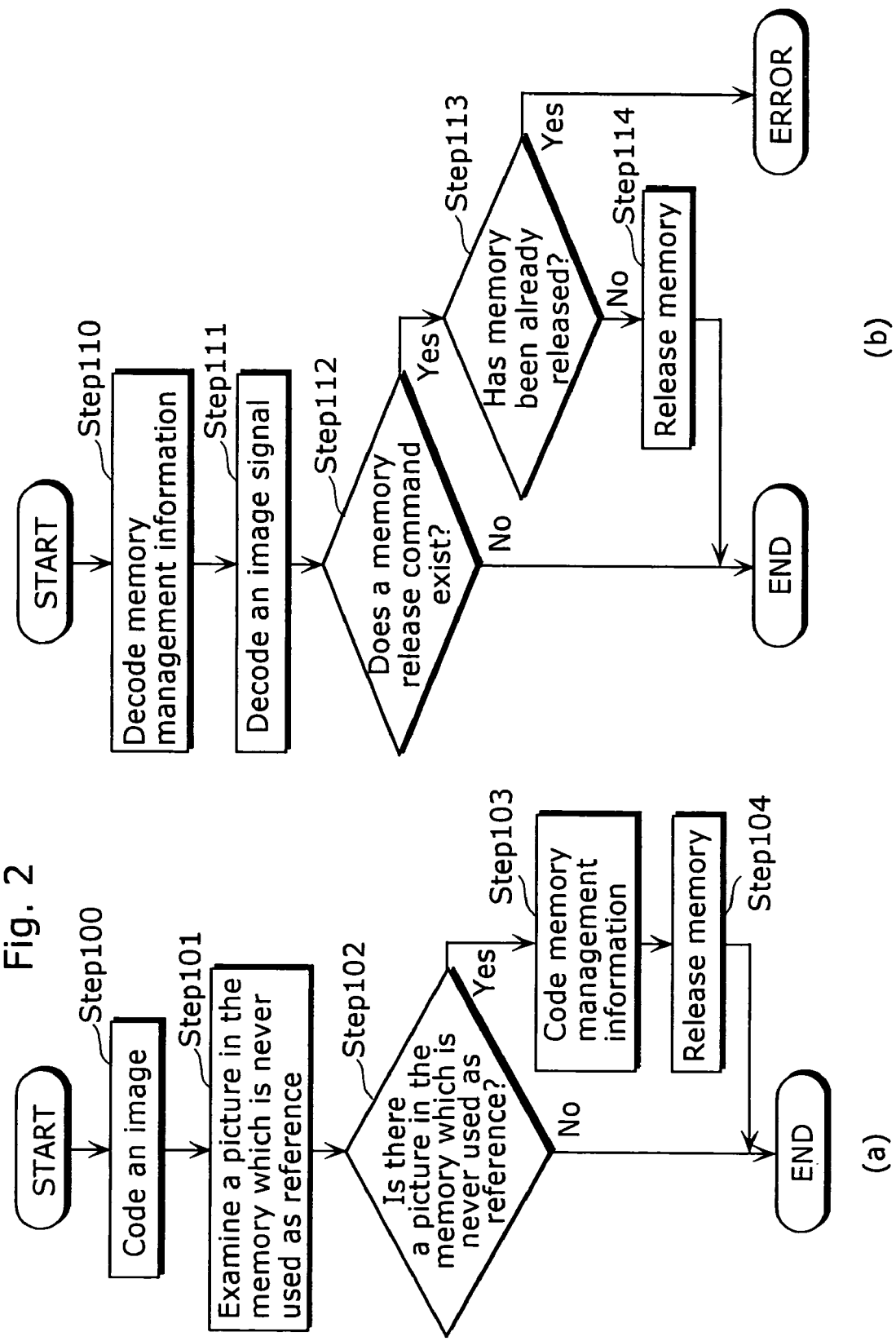
FIG. 2A is a flowchart that shows a conventional image coding method.
FIG. 2B is a flowchart that shows a conventional image decoding method.
Figure 6:
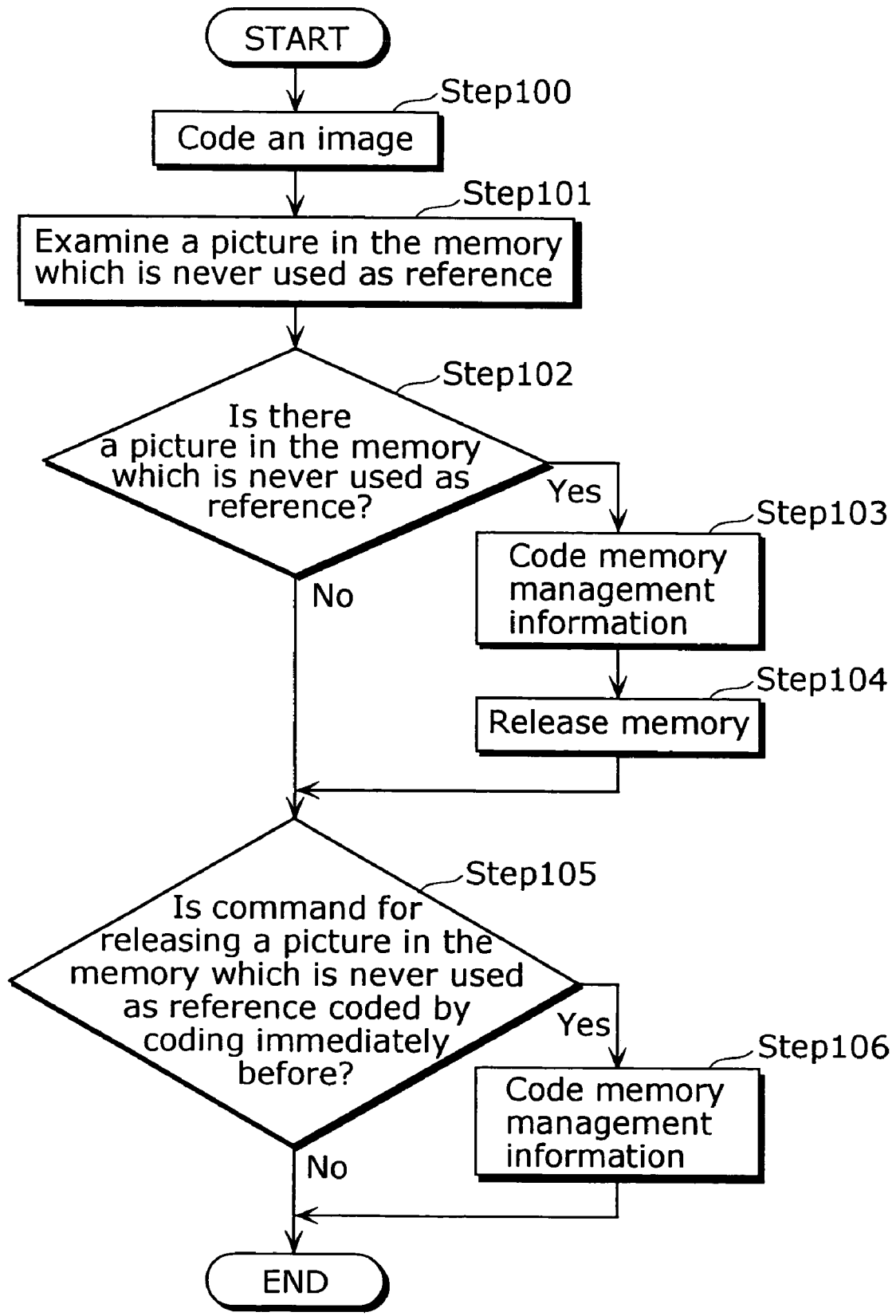
FIG. 6 is a flowchart that shows the image coding method according to the first embodiment of the present invention.

Next, an image coding method according to the first embodiment of the present invention is explained. FIG. 6 is a flowchart that shows the image coding method according to the first embodiment and shows the operations that the image coding device 100 shown in FIG. 5 executes. By the way, in the FIG. 6, the same operations as FIG. 2A are given the same numbers.

The characteristic of the image coding method shown in FIG. 6 is, in the case of an image (a picture) which is never used as reference as the reference image for the predictive coding existing in the memory, repeatedly coding the command of the memory managing information for releasing the memory area that stores the image (for deleting the image). In this way, by coding the command of the memory management information repeatedly, even if one command of the memory management information is lost by the transmission channel error, it is possible to restore the management information of the image stored in the memory by the other command of the memory management information and therefore the possibility that the image is restored correctly despite of the transmission channel error becomes high.

In FIG. 6, for a start, the inputted image is coded (Step 100). After the coding, whether there is unnecessary area (the images that are not referred to in future coding) in the memory is examined (Step 101) and whether a picture in the memory which is never used as reference exists or not is judged (Step 102). When the picture in the memory which is never used as reference is judged to exist (Yes at Step 102), the management information coding unit 105 codes the command for releasing a picture in the memory which is never used as reference as memory management information (Step 103) and releases a picture in the memory which is never used as reference (Step 104). In the case of there being no picture in the memory which is never used as reference existing (No at Step 102), the operations in Step 103 and Step 104 are not executed.

Next, the memory information control unit 101 judges whether the command for releasing a picture in the memory which is never used as reference is coded as the memory management information attaching to the coding of the image coded immediately before (the image before the coding object) (Step 105). When the command is not coded (No at Step 105) the processing ends. When the command is coded (Yes at Step 105), the management information coding unit 105 codes the command for releasing a picture in the memory which is never used as reference again as the memory management information (Step 106) and the processing ends.

In this way, when the command for releasing a picture in the memory which is never used as reference (the command of memory management information) is coded by the coding of the image immediately before, the command of memory management information is coded again. The coded memory management information attaching to the coding of the image immediately before and the memory management information that is coded again are outputted from the image coding device respectively, are transmitted to the image decoding device, which decodes the two kinds of memory management information.

In addition, in the case of the command for releasing a picture in the memory which is never used as reference being coded by attached to the coded signal of the image coded immediately before in Step 105, the command is coded again. But the case of attaching to the image several images before instead of the case of attaching to the image immediately before is acceptable. Further, it is also acceptable to code the above-mentioned command repeatedly as the memory management information and to transmit the command attaching to plural images.

Furthermore, it is sufficient to transmit the above-mentioned command for releasing a picture in the memory which is never used as reference plural times; when the command is coded again and transmitted, it is not always necessary to transmit the command attaching to the coded signal of the image.

Moreover, in the case of transmitting the command of the memory management information again, it is acceptable that the command to be transmitted again is not in the same stream as the coded picture but is transmitted, for example, as a different stream or is recorded in a different area of storage media.

As described above, by transmitting the command (of the memory management information) for releasing a picture in the memory which is never used as reference (of the memory management information) plural times, in the case of the transmission channel error occurring, any one of the commands that are transmitted plural times is thought to be transmitted and to be decoded, and therefore, the possibility that the image is decoded correctly becomes high.

(The Second Embodiment)

Next, the second embodiment of the present invention is explained.

Figure 7:
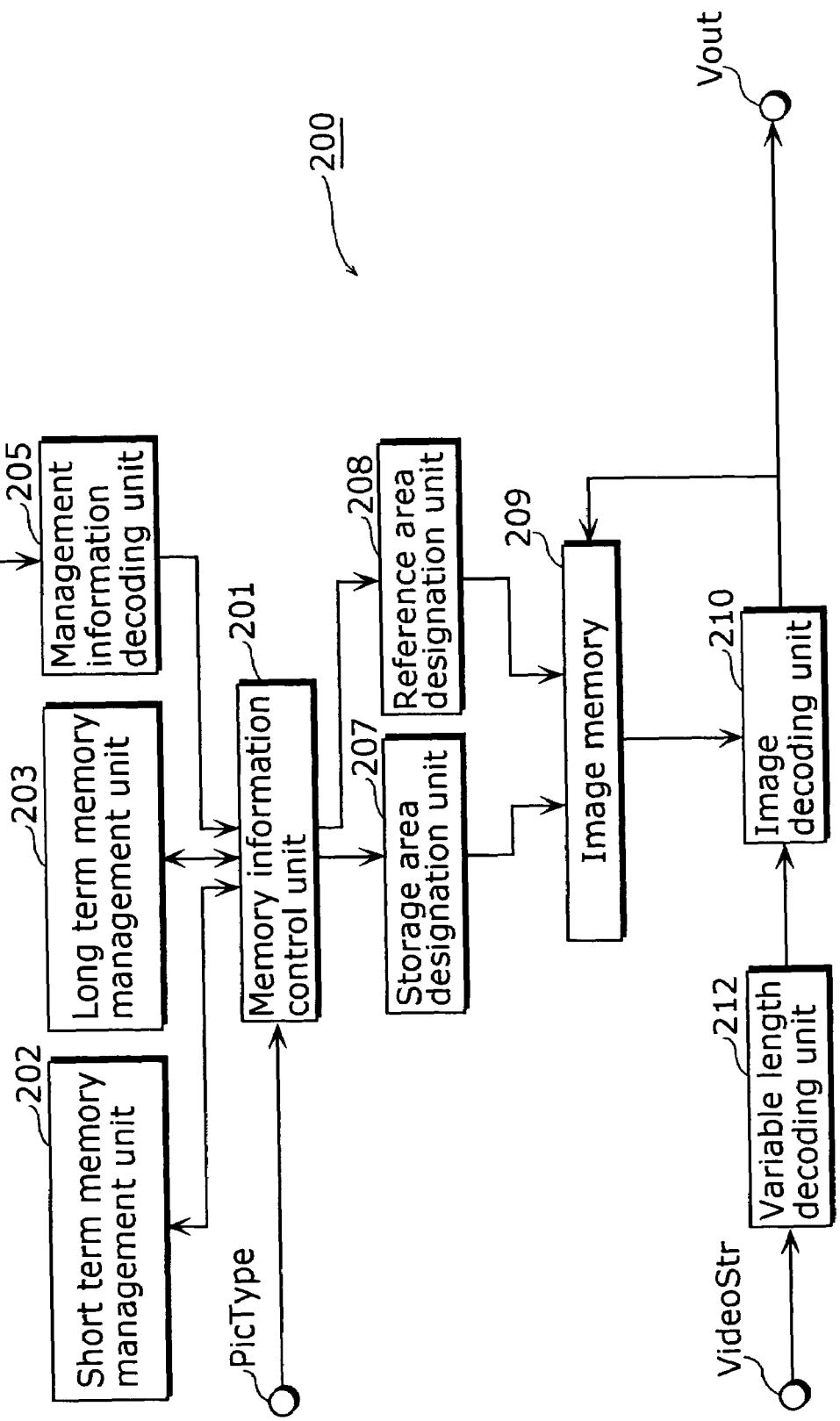
FIG. 7 is a block diagram that shows the structure of an image decoding device of the present invention.

FIG. 7 is a block diagram that shows the structure of an image decoding device according to the second embodiment to realize an image decoding method.

The image decoding device 200 includes a memory information control unit 201, a short term memory management unit 202, a long term memory management unit 203, a management information decoding unit 205, a storage area designation unit 207, a reference area designation unit 208, an image memory 209, an image decoding unit 210 and a variable length coding unit 212.

The memory information control unit 201 judges whether either or both of a preceding image and a following image to the coding object can be referred to by the picture type information PicType and instructs the reference area designation unit 208 to output the corresponding reference image from the image memory 209 to the image decoding unit 210.

The variable length decoding unit 212 decodes the coded stream VideoStr; the image decoding unit 210 further decodes VideoStr, outputs as a decoded image signal Vout and stores Vout as the reference image in the image memory 209.

At this time, the memory position where the decoded image can be stored in the image memory 209 is designated as follows. The memory information control unit 201 inquires the short term memory management unit 202, specifies the memory position where the image was released, and instructs the image memory 209 in order that the storage area designation unit 207 records the decoded image at the memory position.

The management information decoding unit 205 decodes the memory management information stream CtlStr, informs the short term memory management unit 202 of the information of the unnecessary images (that are not referred to) in the short term memory through the memory information control unit 201, and informs the long term memory management unit 203 of the command for moving the images in the short term memory to the long term memory.

Figure 8:
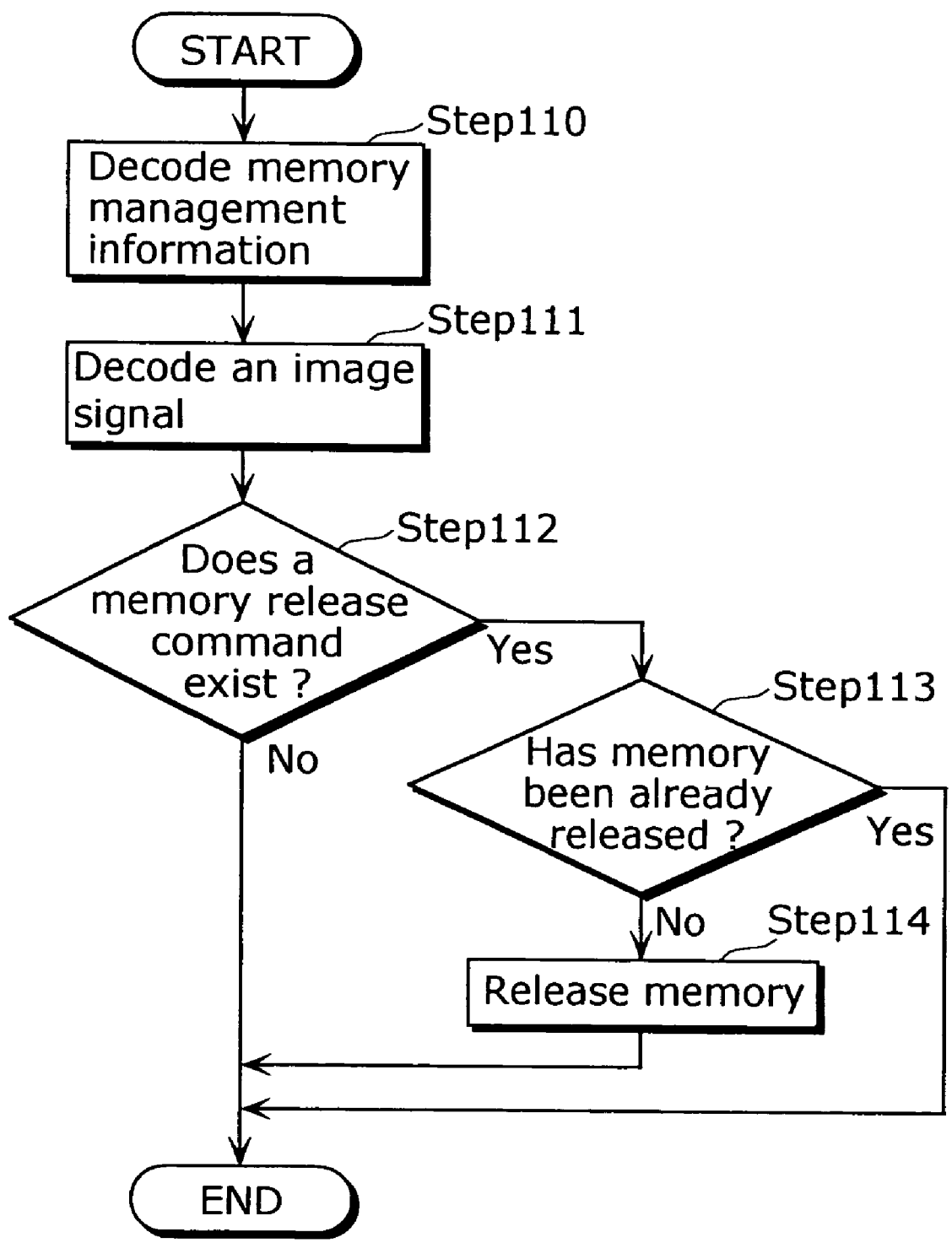
FIG. 8 is a flowchart that shows the image decoding method according to the second embodiment of the present invention.

Next, an image decoding method according to the second embodiment of the present invention is explained. FIG. 8 is a flowchart that shows the image decoding method according to the second embodiment and shows the operations that the image decoding device 200 shown in FIG. 7 executes. By the way, in the FIG. 8, the same operations as FIG. 2B are given the same numbers.

In the case of the image coding device transmitting the command for releasing a picture in the memory which is never used as reference plural times, unless the command is lost by the transmission channel error, the image decoding device receives the command for releasing the area of the same image in the memory plural times. Consequently, it is necessary to realize the image decoding method by which, even if the image decoding device receives the command for releasing again the memory area that has been already released, the image decoding device does not process the command as an error but judges on the contrary that the command is correctly received. The present embodiment realizes such an image decoding method.

In FIG. 8, for a start, the management information decoding unit 205 decodes the memory management information (Step 110). Next, the image signal is decoded from the coded signal (Step 111). Then, the memory information control unit 201 judges whether there is the command for releasing the memory in the decoded memory management information or not (Step 112). When there is the command for releasing the memory (Yes at Step 112), whether there is an image that should be released by the command or the memory has been already released (the image has been already deleted) is judged (Step 113). When the memory has been already released (Yes at Step 113) the processing ends without further processing. When the memory has not been released, the memory is released (Step 114), and the processing ends. On the other hand, when there is no command for releasing the memory (No at Step 112), the processing ends without executing the operations in Step 113 and Step 114. By the way, Step 110 and Step 111 are in no particular order and may counterchange.

By the operations described above, even if the command for releasing the area of the same image in the memory is coded and transmitted plural times by the image coding method of the first embodiment and the image decoding device 200 receives the command plural time, the image decoding device 200 does not process the command as an error and therefore the image decoding method for decoding correctly is realized.

In addition, it is sufficient to transmit the above-mentioned command for releasing a picture in the memory which is never used as reference plural times; when the command is coded again and transmitted, it is not always necessary to transmit the command attaching to the coded signal of the image.

Moreover, in the case of transmitting the command of the memory management information again, it is acceptable that the command to be transmitted again is not in the same stream as the coded picture but is transmitted, for example, as a different stream or is recorded in a different area of the storage media.

(The Third Embodiment)

Figure 3:
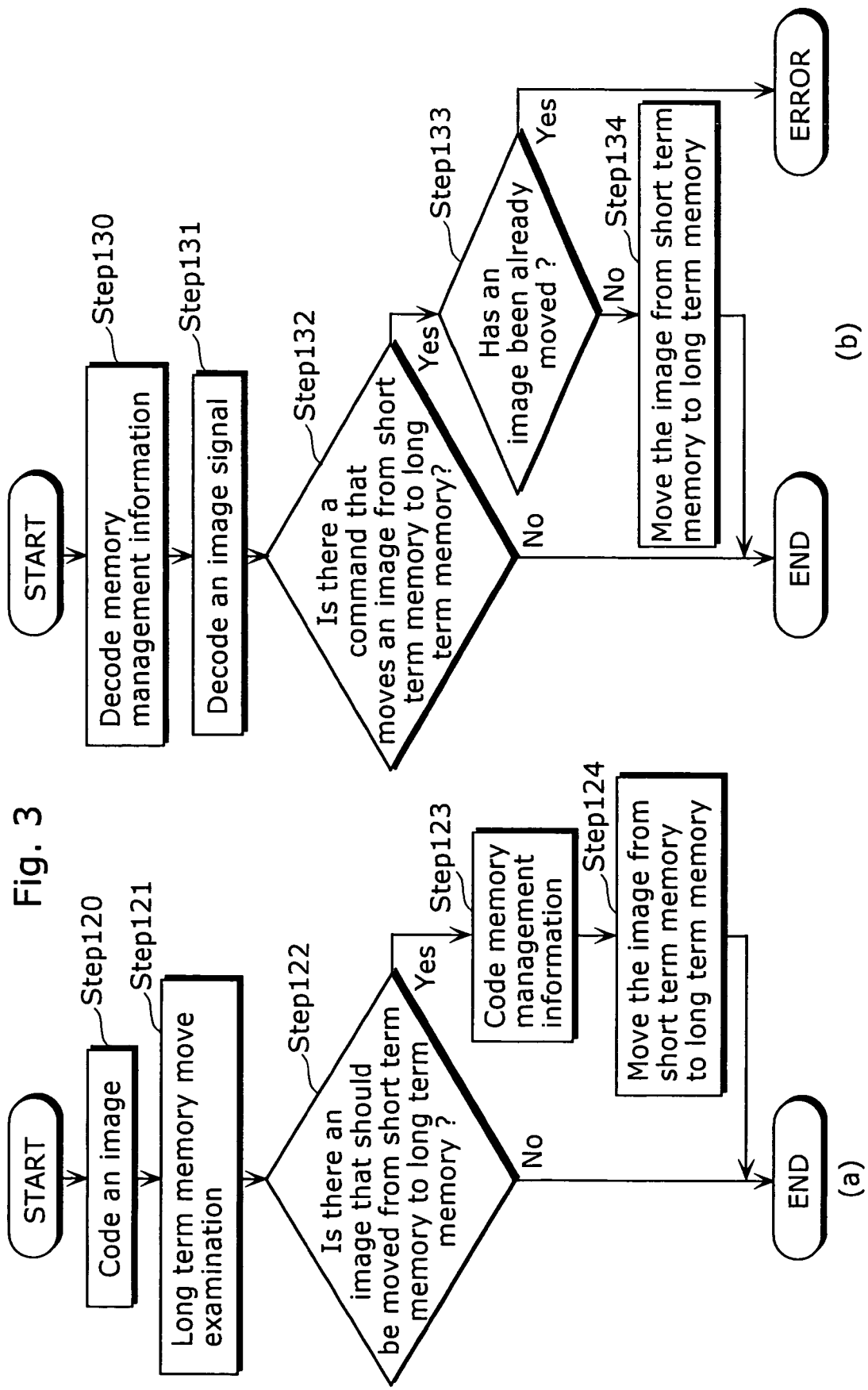
FIG. 3A is another flowchart that shows a conventional image coding method.
FIG. 3B is another flowchart that shows a conventional image decoding method.
Figure 4:
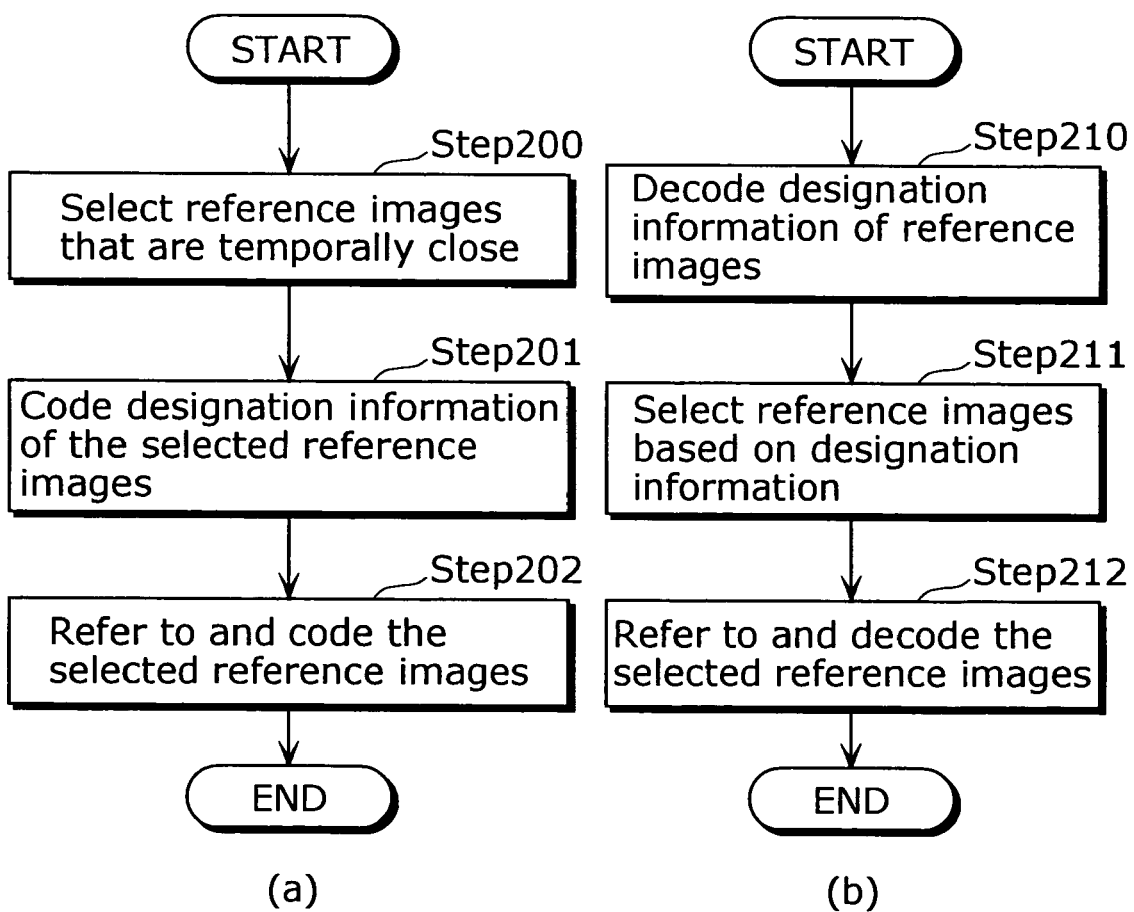
FIG. 4A is yet another flowchart that shows a conventional image coding method.
FIG. 4B is yet another flowchart that shows a conventional image decoding method.
Figure 9:
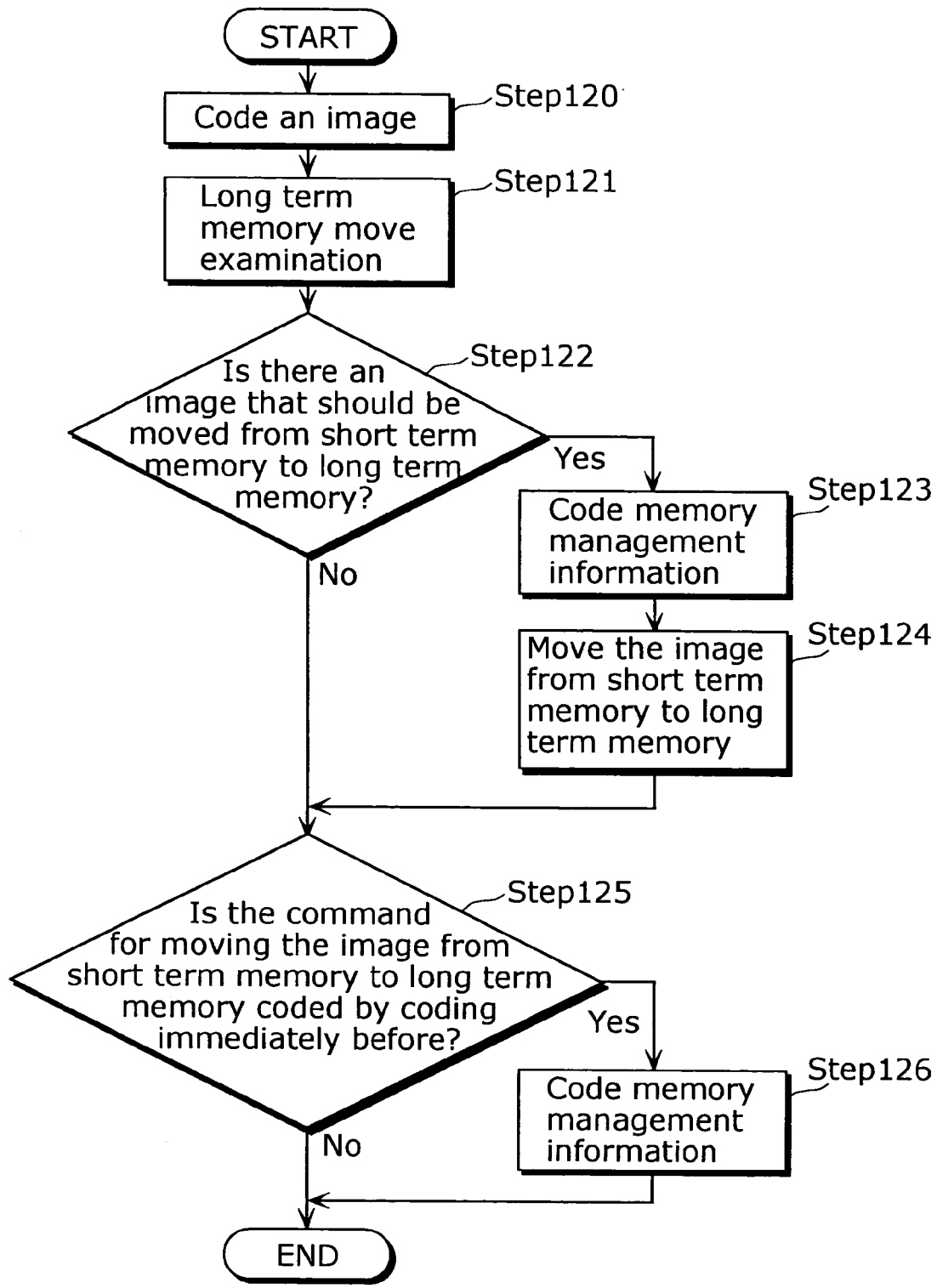
FIG. 9 is a flowchart that shows the image coding method according to the third embodiment of the present invention.

Next, the image coding method according to the third embodiment is explained. FIG. 9 is a flowchart that shows the image coding method according to the third embodiment and shows the operations that the image coding device 100 executes. FIG. 9, the same operations as FIG. 3A are given the same numbers.

The characteristic of the present embodiment is, in the case of an image that should be moved from the short term memory to the long term memory existing in the memory, repeatedly coding the command of the memory managing information for moving the image. By coding the command of the memory management information repeatedly, even if one command of the memory management information is lost by the transmission channel error, it is possible to restore the management information of the image stored in the memory by the other command of the memory management information and therefore the possibility that the image is restored correctly despite of the transmission channel error becomes high.

In FIG. 9, for a start, an inputted image is coded (Step 120). After the coding, whether there is an image that should be moved to the long term memory is examined (Step 121). Then, the memory information control unit 101 judges whether there is an image that should be moved to the long term memory or not (Step 122). When there is an image that should be moved (Yes at Step 122), the management information coding unit 105 codes a command for showing how the image is moved to the long term memory as the memory management information (Step 123). Then, the image is moved to the long term memory based on the command (Step 124).

Next, the memory information control unit 101 judges whether or not the command for moving the image to the long term memory is coded as the memory management information attaching the coding of the image coded immediately before (the image before the coding object) (Step 125). When the command is not coded (No at Step 125), the processing ends. When the command is coded (Yes at Step 125), the management information coding unit 105 codes the command for moving the image again as the memory management information (Step 126) and the processing ends.

In this way, when the command (of memory management information) for moving the image to the long term memory is coded by the coding of the image immediately before, the command of memory management information is coded again. The coded memory management information attaching to the coding of the image immediately before and the memory management information that is coded again are outputted from the image coding device respectively, and are transmitted to the image decoding device, which decodes the two kinds of memory management information.

In addition, in Step 125, in the case of the command for moving the image to the long term memory being coded by attached to the coded signal of the image coded immediately before, the command is coded again. But the case of attaching to the image several images before instead of the case of attaching to the image immediately before is acceptable. Further, it is also acceptable to code the above-mentioned command repeatedly as the memory management and to transmit the command attaching to plural images.

Furthermore, it is sufficient to transmit the above-mentioned command for moving the image to the long term memory plural times; when the command is coded again and transmitted, it is not always necessary to transmit the command attaching to the coded signal of the image.

Moreover, in the case of transmitting the command of the memory management information again, it is acceptable that the command to be transmitted again is not in the same stream as the coded picture but is transmitted, for example, as a different stream or is recorded in a different area of the storage media.

As described above, by transmitting the command for moving the image to the long term memory plural times, in the case of the transmission channel error occurring, any one of the commands that are transmitted plural times is thought to be transmitted and to be decoded, and therefore, the possibility that the image is decoded correctly becomes high.

(The Fourth Embodiment)

Next, an image decoding method according to the fourth embodiment is explained.

In the case of the image coding device transmitting the command for moving an image to the long term memory plural times, unless the command is lost by the transmission channel error, the image decoding device receives the command for moving the same image area to the long term memory plural times. Consequently, it is necessary to realize the image decoding method by which, even if the image decoding device receives the command for moving the image that has been already moved again, the image decoding device does not process the command as an error but judges on the contrary that the command is correctly received. The characteristic of the image decoding method according to the present embodiment realizes such an image decoding method.

Figure 10:
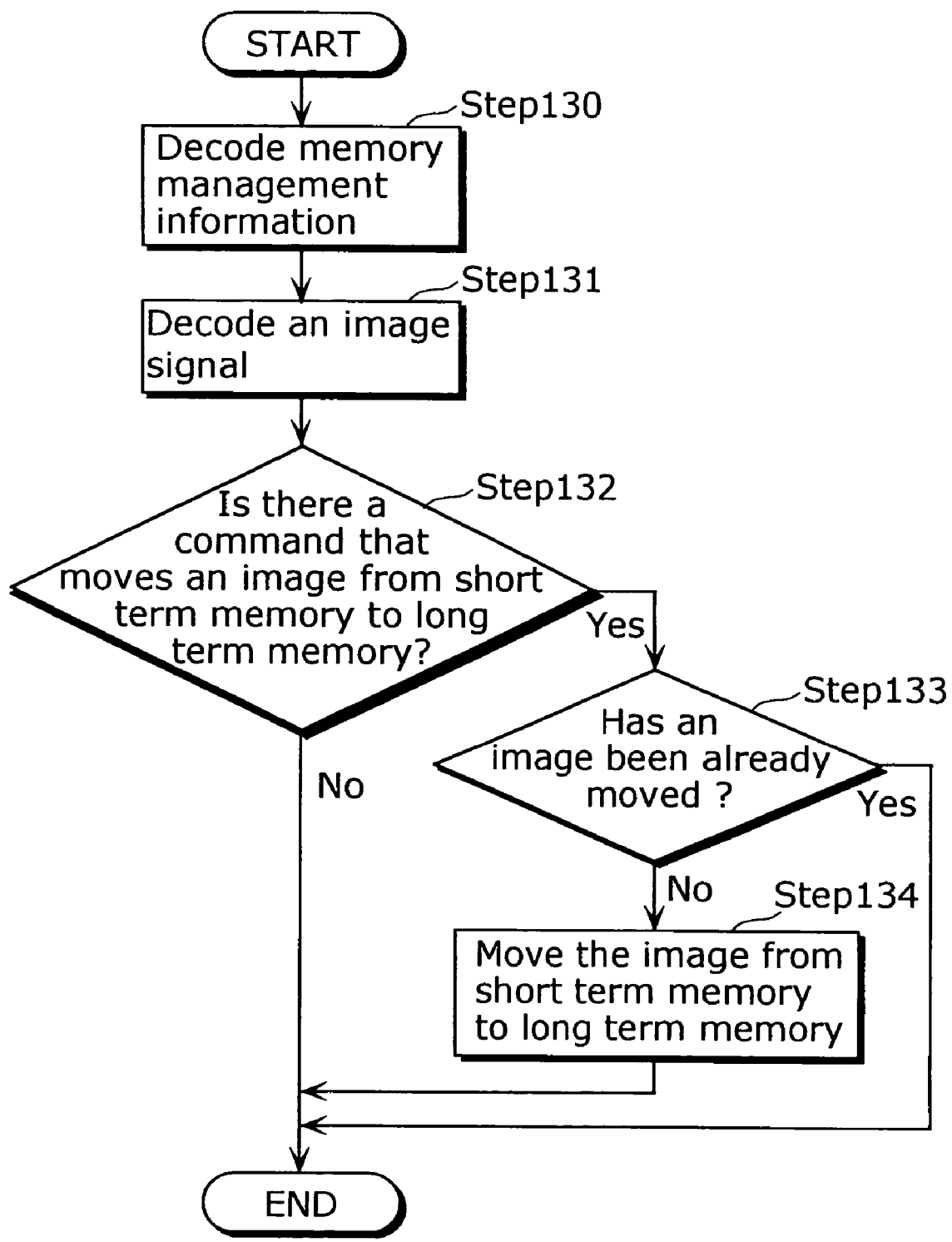
FIG. 10 is a flowchart that shows the image decoding method according to the fourth embodiment of the present invention.

FIG. 10 is a flowchart that shows the image decoding method according to the fourth embodiment and shows the operations that the image decoding device 200 shown in FIG. 7 executes. FIG. 10, the same operations as FIG. 3B are given the same numbers.

In FIG. 10, for a start, the management information decoding unit 205 decodes the memory management information (Step 130). Next, the image signal is decoded from the coded signal (Step 131).

Then, the memory information control unit 201 judges whether or not there is the command for moving an image to the long term memory in the decoded memory management information (Step 132). When there is the command for moving the image to the long term memory (Yes at Step 132), whether there is an image that should be moved by the command or the image has been already moved (the image no longer exists because it was released after the move) is judged (Step 133). When the image has been already moved (Yes at Step 133) the processing ends without further processing. If not so, the image is moved to the long term memory (Step 114), and the processing ends.

On the other hand, when there is no command for moving the image to the long term memory (No at Step 112), the processing ends without executing the operations in Step 133 and Step 134. By the way, Step 130 and Step 131 are in no particular order and may counterchange.

By the operations described above, even if the command for moving the image to the long term memory is coded and transmitted plural times by the image coding method of the third embodiment, the image decoding method for decoding correctly is realized.

In addition, it is sufficient to transmit the above-mentioned command for moving the image to the long term memory plural times; when the command is coded again and transmitted, it is not always necessary to transmit the command attaching to the coded signal of the image.

Moreover, in the case of transmitting the command of the memory management information again, it is acceptable that the command to be transmitted again is not in the same stream as the coded picture but is transmitted, for example, as a different stream or is recorded in a different area of the storage media.

(The Fifth Embodiment)

Figure 11:
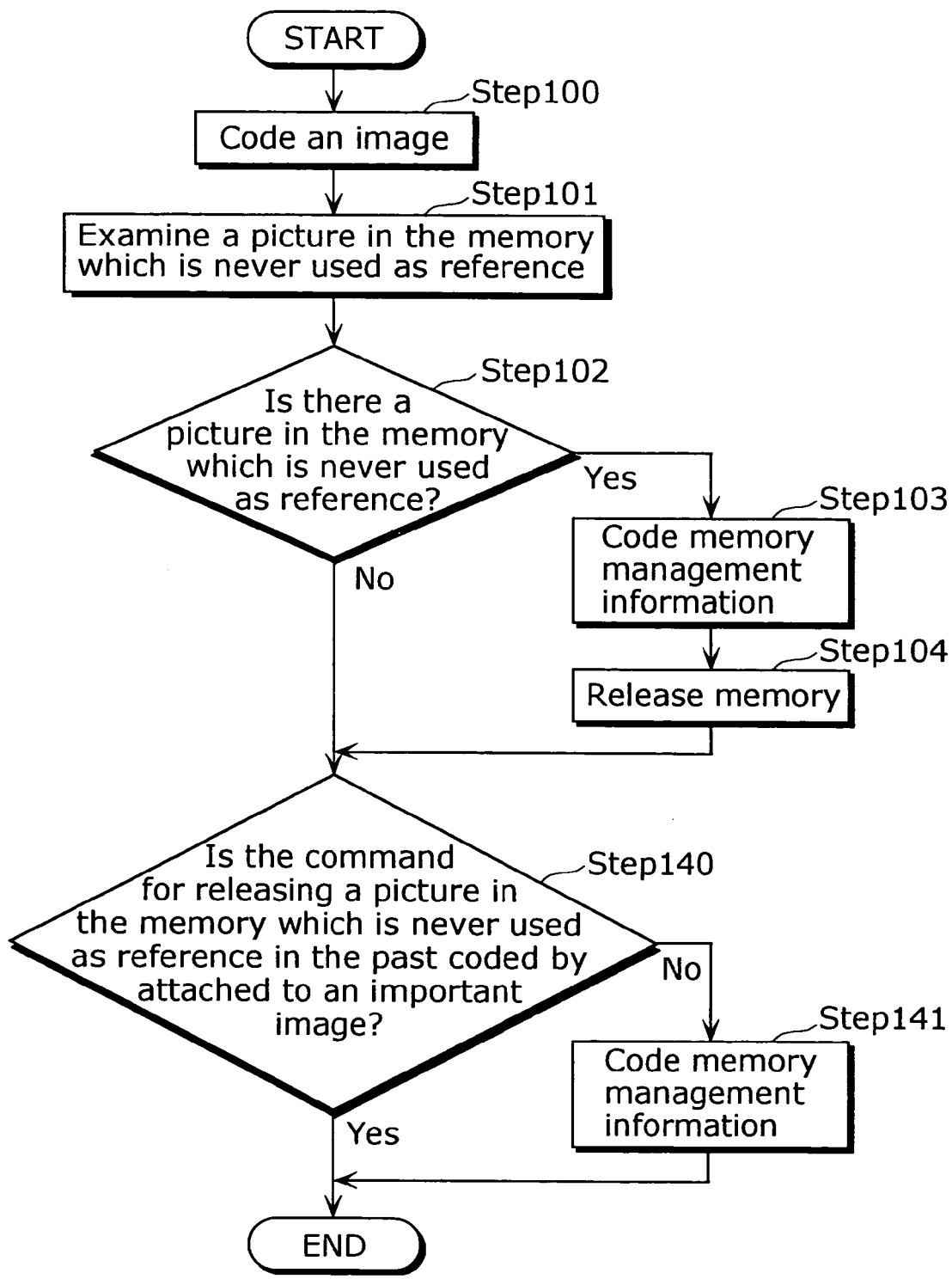
FIG. 11 is a flowchart that shows the image coding method according to the fifth embodiment of the present invention.

Next, the image coding method according to the fifth embodiment is explained. FIG. 11 is a flowchart that shows the image coding method according to the fifth embodiment and shows the operations that the image coding device 100 shown in FIG. 5 executes. FIG. 11, the same operations as FIG. 6 are given the same numbers.

The characteristic of the present embodiment shown in FIG. 11 is, in the case of an image which is never used as reference existing in the memory, repeatedly coding the command of the memory management information for releasing the image and transmitting the command at least once attaching to an important image that is stored in the memory. In the case of repeatedly coding the command of the memory management information, if the command of the memory management information is transmitted attaching to an image that does not have a high priority value, the command of the memory management information cannot be acquired when all the images that do not have a high priority value are not decoded.

For example, in FIG. 1A, since the image of the picture No. 4 becomes unnecessary after the image of the picture No. 5 is coded, it is possible to code the command for releasing the memory area where the image of the picture No. 4 exists, attaching to the image of the picture No. 5.

However, besides coding the command for releasing the memory area where the image of the picture No. 4 exists, attaching to the image of the picture No. 5, if the command is coded by attached to the image of the picture No. 7, in either case, the above-mentioned command is coded by attached to the B pictures that have the lowest priority value (whose image degradation is small in the case of not being decoded). These B pictures may not be decoded and therefore the command for releasing the memory area where the image of the picture No. 4 exists is not decoded. As a result, the management information in the memory is not reproduced correctly. Consequently, it is necessary to code the command for releasing the image area at least once attaching to the image that has a high priority value, is decoded without fail, and is stored in the memory.

In FIG. 11, for a start, the inputted image is coded (Step 100). After the coding, whether there is unnecessary area (the images that are not referred to in future coding) in the memory is examined (Step 101) and whether a picture in the memory which is never used as reference exists or not is judged (Step 102). When a picture in the memory which is never used as reference exists (Yes at Step 102), the management information coding unit 105 codes the command for releasing a picture in the memory which is never used as reference as memory management information (Step 103) and releases a picture in the memory which is never used as reference (Step 104). In the case of no picture in the memory which is never used as reference existing (No at Step 102), the operations in Step 103 and Step 104 are not executed.

Next, the memory information control unit 101 judges whether or not the command for releasing a picture in the memory which is never used as reference that was coded in the past is coded by attached to an important image (that is decoded and is stored) (Step 140). When the command is coded b y attached to the important image (Yes at Step 140), the processing ends. When the command is not coded by attached to the important image (No at Step 140), the management information coding unit 105 codes the command for releasing a picture in the memory which is never used as reference again as the memory management information (Step 141). Then, the processing ends.

As a result, the command for releasing a picture in the memory which is never used as reference again is coded by attached to the important image.

As described above, the above-mentioned command attaches to the important image that is decoded and is stored in the memory, and therefore, the possibility that the image is restored correctly when the transmission channel error occurs becomes high.

In addition, it is sufficient to transmit the above-mentioned command for releasing a picture in the memory which is never used as reference plural times; when the command is coded again and transmitted, it is not always necessary to transmit the command attaching to the coded signal of the image.

Moreover, in the case of transmitting the command of the memory management information again, it is acceptable that the command to be transmitted again is not in the same stream as the coded picture but is transmitted, for example, as a different stream or is recorded in a different area of the storage media.

(The Sixth Embodiment)

Figure 12:
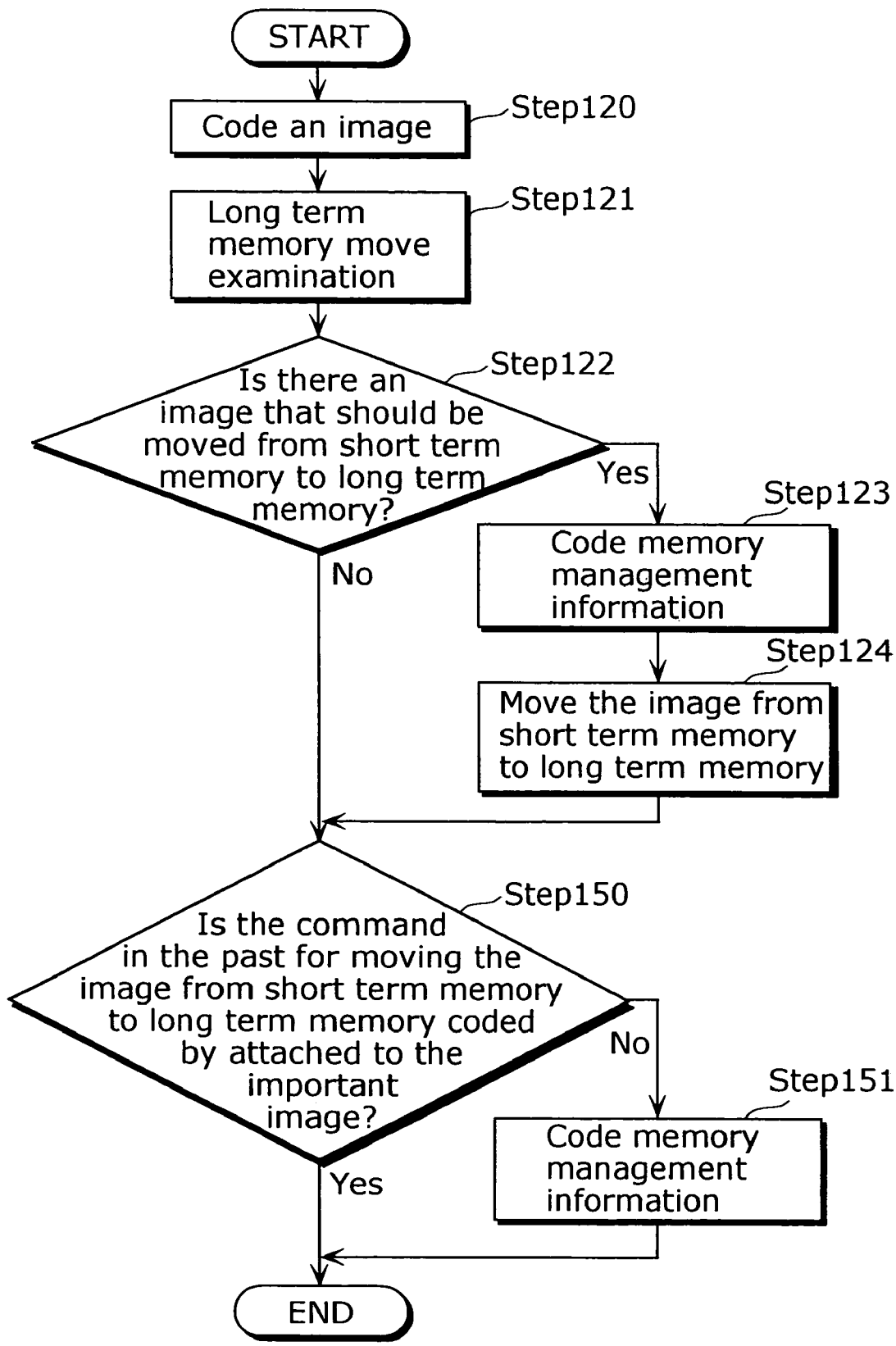
FIG. 12 is a flowchart that shows the image coding method according to the sixth embodiment of the present invention.

Next, the image coding method according to the sixth embodiment is explained. FIG. 12 is a flowchart that shows the image coding method according to the sixth embodiment. FIG. 12 shows the operations that the image coding device 100 shown in FIG. 5 executes. FIG. 12, the same operations as FIG. 5 are given the same numbers.

The characteristic of the present embodiment shown in FIG. 12 is repeatedly coding the command of the memory management information for moving an image to the long term memory and transmitting the command at least once attaching to an important image (that is decoded and is stored in the memory). In the case of repeatedly coding the command of the memory management information for moving the image to the long term memory, if the command of the memory management information is transmitted attaching to an image that does not have a high priority value, the command of the memory management information cannot be acquired when all the images that do not have a high priority value are not decoded.

In FIG. 12, for a start, an inputted image is coded (Step 120). After the coding, whether there is an image that should be moved to the long term memory is examined (Step 121) and whether there is an image that should be moved is judged (Step 122).

When there is an image that should be moved (Yes at Step 122), the management information coding unit 105 codes a command for showing how the image is moved to the long term memory as the memory management information (Step 123). Then, the image is moved to the long term memory based on the command (Step 124).

Next, the memory information control unit 101 judges whether the command, which was coded in the past, for moving the image to the long term memory is coded or not attaching to the important image (that is decoded and is stored in the memory) (Step 150). When the command is attached to the important image (Yes at Step 150) the processing ends. When the command attaches to the important image (No at Step 150), the management information coding unit 105 codes the command for moving the image to the long term memory again as the memory management information (Step 151). Then the processing ends.

By so doing, the command for moving the image to the long term memory attaches to the important image and is coded.

As is described above, since the above-mentioned command attaches to the important image that is decoded and is stored in the memory, the command is decoded and therefore the possibility to decode the image correctly when the transmission channel error occurs becomes high.

In addition, it is sufficient to transmit the above-mentioned command for moving the image to the long term memory plural times; when the command is coded again and transmitted, it is not always necessary to transmit the command attaching to the coded signal of the image.

Moreover, in the case of transmitting the command of the memory management information again, it is acceptable that the command to be transmitted again is not in the same stream as the coded picture but is transmitted, for example, as a different stream or is recorded in a different area of the storage media.

(The Seventh Embodiment)

The image coding method according to the seventh embodiment is explained.

The characteristic of the present embodiment is an image coding method for executing the coding referring to the reference image selected depending on the priority value of the image.

Figure 13:
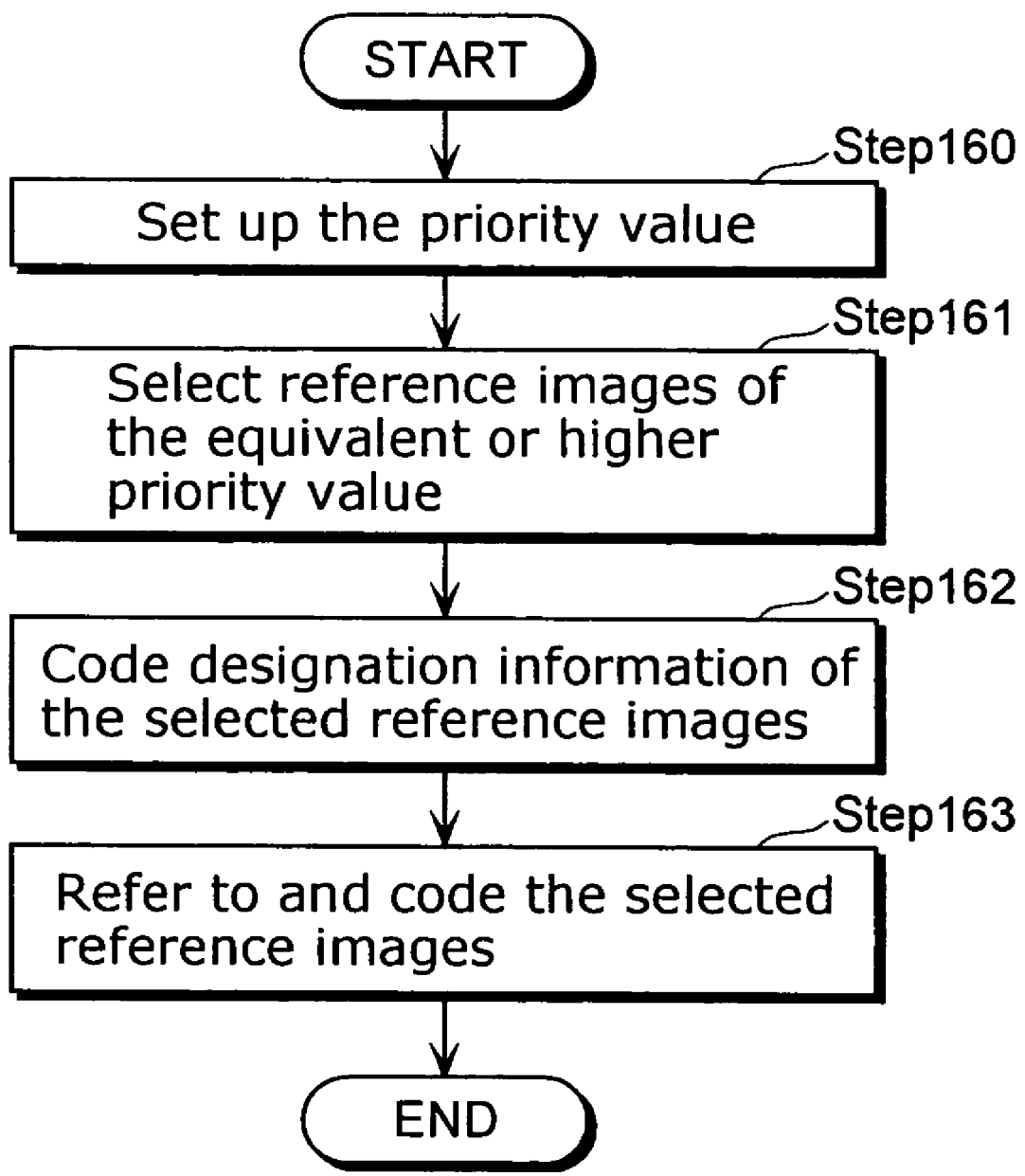
FIG. 13 is a flowchart that shows the image coding method according to the seventh embodiment of the present invention.

FIG. 13 is a flowchart that shows the image coding method according to the seventh embodiment of the present invention. FIG. 13 shows the operations that the image coding device 100 shown in FIG. 5 executes.

In FIG. 13, for a start, the priority value of each image that is the coding object is set up (Step 160). For example, the priority value of an I picture and a P picture is high, while that of a B picture is low. Additionally, even among same P pictures, the priority value of the P picture that is referred to by many images is high, while that of the P picture that is not referred to much is low.

Next, pictures that have the equivalent or higher priority value to the coding object image are selected among the reference images in the memory and are made candidates of the reference images (Step 161). For example, the B picture can refer to the I picture and the P picture, while the P picture excludes the P picture that has the low priority value from the candidates of the reference image.

Next, designation information (a type of the memory management information) that shows the selected candidates of the reference images is coded (Step 162); among the selected candidates of the reference images, the appropriate reference images are referred to and is coded in the unit of block (Step 163). By the way, Step 162 and Step 163 are in no particular order and may counterchange.

By so doing, the images that have lower priority value than the coding object image are not included among the candidates of the reference images.

As is described above, since the images that have lower priority value than the coding object image are not included among the candidates of the reference images, in the case of generating a stream that can realize the scalability, the images that cannot be referred to are excluded from the candidates of the reference images and therefore the coding efficiency improves.

Figure 14:
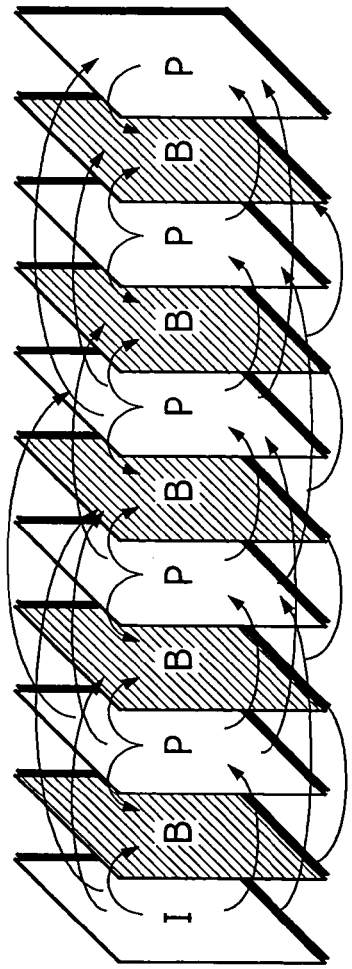
FIG. 14A is an explanatory diagram that shows the relationship among the picture No. and the stored picture No. of the image and the transmission order.
FIG. 14B is a diagram that shows a relationship among the picture No. to be decoded, the picture No. to be stored, and the picture No. to be released.
FIG. 14C is a diagram that shows another relationship among the picture No. to be decoded, the picture No. to be stored, and the picture No. to be released.

Here, the image coding method executed depending on the priority value of the set images, as is described above, is explained concretely with reference to FIG. 14.

FIG. 14A is an explanatory diagram that shows the relationship among the numbers given to each frame (picture (frame) No.), the numbers by which each frame is stored in the memory (stored picture (frame) No.), and the numbers that shows the order by which each frame is transmitted (transmission order).

In FIG. 14A, since the I picture of the picture No. 0 does not refer to other pictures, the I picture of the picture No. 0 is stored in the memory and its stored picture No. is 0. Next, since the P picture of the picture No. 2 that refers to the I picture of the picture No. 0 is stored in the memory, the stored picture No. on the P picture of the picture No. 2 is 1. Then, since the B picture of the picture No. 1 that refers to the I picture of the picture No. 0 and the P picture of the picture No. 2 is stored in the memory, the stored picture No. on the B picture of the picture No. 1 is 2. The order by which each picture is transmitted is that by which each picture is stored. By the similar procedures, the relationship among the picture No., the stored picture No., and the transmission order is decided.

Next, an example of the relationship among the picture numbers that are decoded, the picture numbers that are stored in the memory, and the picture numbers that are released is explained using FIG. 14B.

FIG. 14B is a diagram that shows a relationship among the picture No. (frame No.) to be decoded, the picture No. (frame No.) to be stored, and the picture No. (frame No.) to be released. In addition, here, the maximum number of the pictures that can be stored in the memory is 5. The pictures are stored in the memory depending on the transmission order.

Furthermore, for example, when the P picture of the picture No. 4 is decoded, since the stored picture No. of the P picture of the picture No. 4 is 3; the pictures of the picture Nos. 0, 1, and 2 are stored in the memory. When the P picture of the decoding picture No. 3 is decoded, as shown in FIG. 14B, the pictures of the picture Nos. 4, 1, 2, and 0 are stored. Here, since the B picture of the picture No. 1 is not referred to by any picture after the picture of the picture No. 3 is decoded, as shown in FIG. 14A, the B picture of the picture No. 1 is released at the time the picture of the picture No. 3 is decoded.

Similarly, when the B picture of the decoding picture No. 5 is decoded, shown in FIG. 14B, the pictures of the picture Nos. 6, 3, 4, 2, and 0 are stored. Here, since the B picture of the picture No. 3 is not referred to by any picture after the picture of the picture No. 5 is decoded, the B picture of the picture No. 3 is released at the time the picture of the picture No. 5 is decoded.

Further, when the P picture of the decoding picture No. 8 is decoded, as shown in FIG. 14B, the pictures of the picture Nos. 5, 6, 4, 2, and 0 are stored. Here, since the memory can store only a maximum of five frames, in order to refer the P picture of the picture No. 8 later, one of pictures of the picture Nos. 5, 6, 4, 2, and 0 must be released to secure the memory to memorize the P picture of the picture No. 8. Consequently, as the standard to select the frame to be released in FIG. 14B, when the P picture whose picture No. is a even number is decoded, the temporally oldest picture, the I picture of the picture No. 0 in this case is released at the time the P picture of the picture No. 8 is decoded.

Similarly, when the B picture of the decoding picture No. 7 is decoded, as shown in FIG. 14B, the pictures of the picture Nos. 8, 5, 6, 4, and 2 are stored. Here, since the B picture of the picture No. 5 is not referred to by any picture after the picture of the B picture No. 7 is decoded, the B picture of the picture No. 5 is released at the time the B picture of the picture No. 7 is decoded.

Further, the P picture of the decoding picture No. 10 is decoded, as shown in FIG. 14B, the pictures of the picture Nos. 7, 8, 6, 4, and 2 are stored. Here, since the memory can store only the maximum of five frames, in order to refer to the P picture of the picture No. 10 later, one of pictures of the picture Nos. 7, 8, 6, 4, and 2 must be released to secure the memory to memorize the P picture of the picture No. 10. Consequently, as the standard to select the frame to be released in FIG. 14B, when the P picture whose picture No. is a even number is decoded, the temporally oldest picture, the picture of the picture No. 2 is released at the time the P picture of the picture No. 10 is decoded.

In this way, when a picture is released, the command of the memory management information for releasing the picture is coded by attached to the coded signal of the decoding picture, and transmitted.

In the example shown in FIG. 14B, the example in which an image (a picture) which is never used as reference exists and the command of the memory management information for releasing the image is transmitted once is described. In this way, when the command of the memory management information for releasing the image is transmitted once, there is possibility that the command of management information that is transmitted attaching to the B picture cannot be executed. Because the possibility that the B picture is used as a reference image to code/decode the P picture is low; the possibility that the data of the P picture are discarded first, when the adequate memory capacity and transmission capacity are not secured, high. As a result, there is possibility that the command of the memory management information that is transmitted attaching to the B picture is not executed.

To solve this problem, an example of repeatedly coding and transmitting the command of the memory management information for releasing the image is explained. FIG. 14C is explained concretely below.

FIG. 14C is a diagram that shows another relationship among the picture No. (frame No.) to be decoded, the picture No. (frame No.) to be stored, and the picture No. (frame No.) to be released.

FIG. 14C shows that the command for releasing the picture of the picture No. to be released attaches to the coded signal of the picture of the decoding picture No.

As shown in FIG. 14C, when the B picture of the picture No. 3 is decoded, the pictures of the picture Nos. 4, 1, 2, and 0 are stored. Here, the B picture of the picture No. 1 is not referred to by any picture after the picture of the picture No. 3 is decoded as shown in FIG. 14A. Consequently, at the time the picture of the picture No. 3 is decoded, the B picture of the picture No. 1 is released and the command of the memory management information for releasing the B picture of the picture No. 1 attaches to the picture of the picture No. 3.

Figure 25:
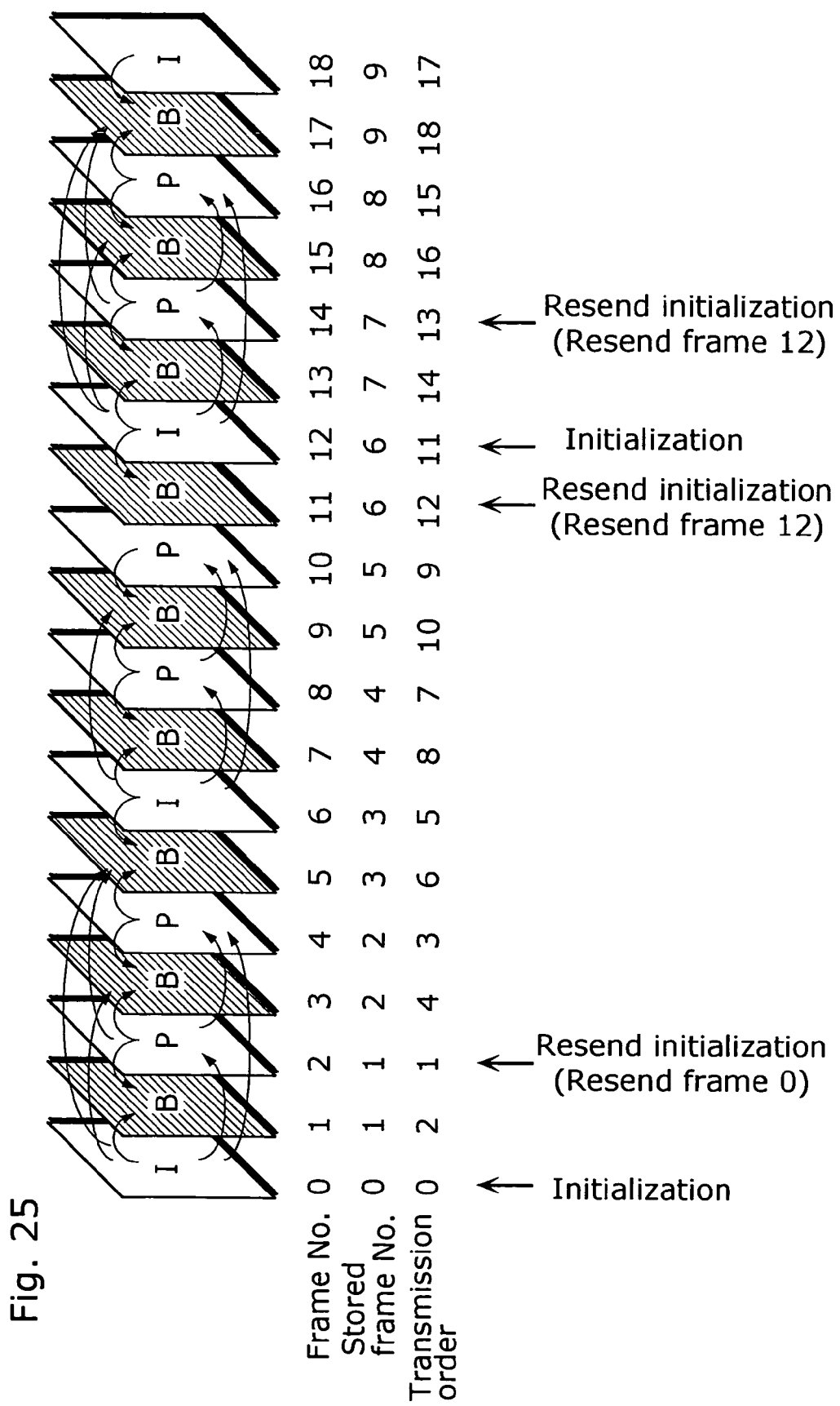
FIG. 25 is an explanatory diagram that shows another relationship among the picture No. and the stored picture No. of each frame and the transmission order.

However, since the picture of the picture No. 3 is the B picture, as is described above, its level of importance is low compared with the I picture and the P picture in the point of reproducing the image and it is highly probable that the B picture is discarded at the time of the transmission, and therefore, there is possibility that the command of the memory management information that is transmitted attaching to the B picture of the picture No. 3 is not executed (the case of the frame being stored as shown in FIG. 25).

Then, the command of the memory management information for releasing the picture of the picture No. 1 attached to the picture of the picture No. 3 is attached to the P picture of the picture No. 6 that is decoded next and has the higher priority value than the B picture of the picture No. 3 in the point of reproducing the image. (Refer to FIG. 14C).

Similarly, the command of the memory management information (for releasing the picture of the picture No. 3) attached to the B picture of the picture No. 5 is attached to the P picture of the picture No. 8; the command of the memory management information (for releasing the picture of the picture No. 5) attached to the B picture of the picture No. 7 is attached to the P picture of the picture No. 10. By the way, since the picture of the picture No. 8 is the P picture, the command of the memory management information attached to the picture No. 8 is not attached to the B picture of the picture No. 7, as shown in FIG. 14C, but it is acceptable to do so.

Up to this point, as shown in FIG. 14C, the same command of the memory management information as the command of the memory management information first attached to the B picture is repeatedly attached to the picture that has the higher priority value than the B picture in the point of reproducing the image and is stored or transmitted later than the B picture to which the command of the memory management information is first attached. By so doing, even if the B picture to which the command of the memory management information is first attached is dropped, the command of the memory management information can be normally executed.

In addition, as explained using FIG. 14C, in the case of attaching the command of the memory management information to the B picture and further attaching the command of the memory management information repeatedly to the P picture, the set priority value is used. Note that the set up of the priority value is not limited to what is shown in the present embodiment.

In addition, in the present embodiment, whether each image is transmitted or not is decided depending on the priority value of each image; the priority value is not coded by attached to each image like the memory management information shown in the above-mentioned embodiments. As a result, the decoding processing of the data coded by the present embodiment is not different from the conventional method.

(The Eighth Embodiment)

Next, the eighth embodiment is explained.

The characteristic of the present embodiment is to code and transmit plural times the command (of the memory management information) for releasing all the images (pictures) in the memory and initializing the memory area.

The memory command information shown in the above-mentioned each embodiment is given as code information shown in FIG. 15.

FIG. 15 is a corresponding diagram that shows the command of the memory management information and shows the code No. (Code in FIG. 15), the contents of the command (the command in FIG. 15) and its added information (the added information in FIG. 15).

For example, the command for releasing a picture in the memory which is never used as reference in the short term memory (short term memory releasing) is given as the code information Code 1 and the picture No. (frame No.) to be released is added as the added information.

Figure 17:
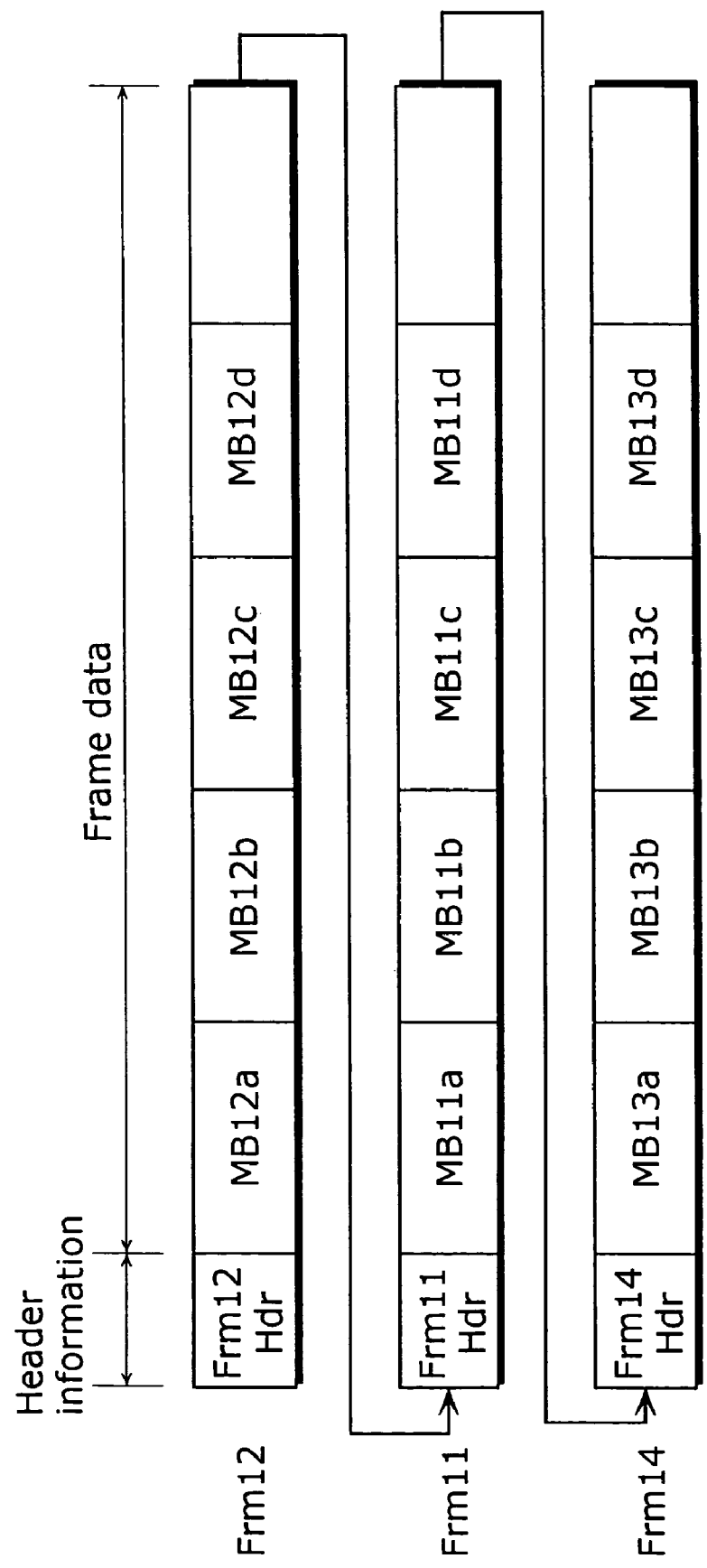
FIG. 17 is a schematic diagram that shows the relationship between the header information and the frame data in the coded signal of each picture.

Furthermore, the code information is given as header information shown in FIG. 17.

FIG. 17 is a schematic diagram that shows the relationship between the header information and the frame data in the coded signal of each picture. In FIG. 17, each coded signal shows the coded signals of Frm12, Frm11, and Frm14 that are explained later. Each coded signal includes the frame header that has the header information and frame data on the coding of the image. For example, the coded signal of the frame Frm12 includes the frame header Frm12Hdr and the frame data made up of each data MB12a, MB12b, MB12c, MB12d and the like.

Figure 18:
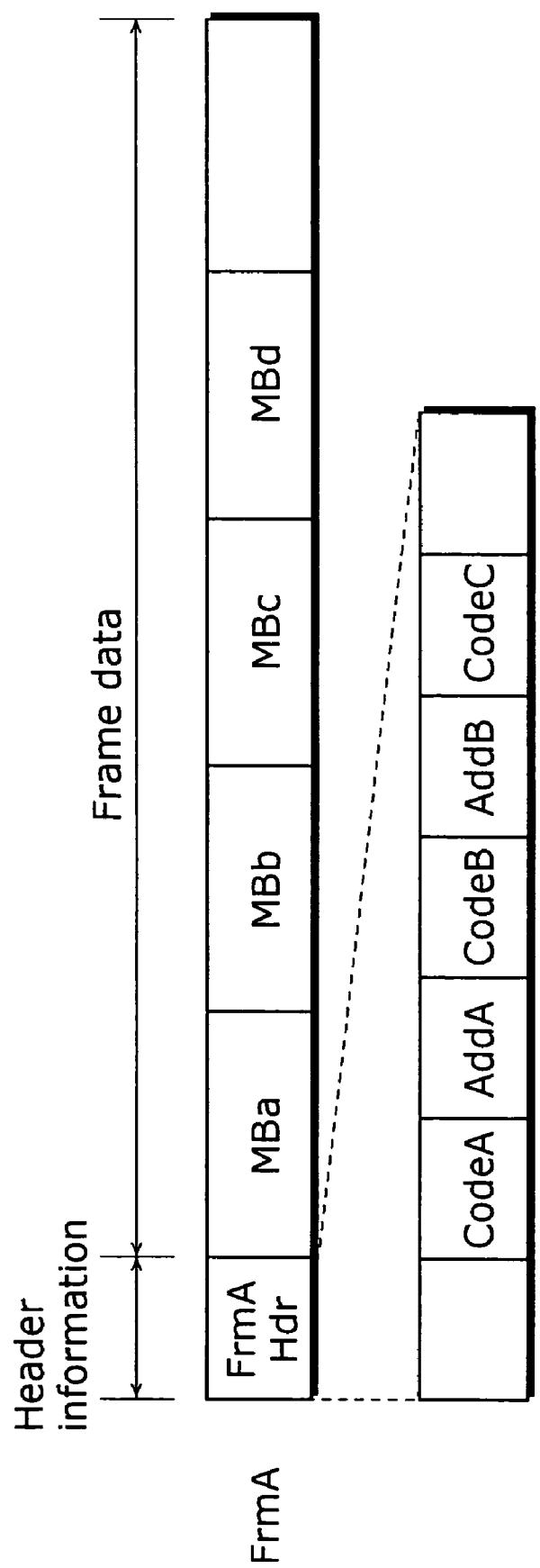
FIG. 18 is a schematic diagram that shows the commands of the memory management information in the header information of the coded signals.

Details of this coded signal are shown in the schematic diagram of FIG. 18.

FIG. 18 is a schematic diagram that shows the commands of the memory management information in the header information of the coded signals.

As shown in FIG. 18, the coded signal of the frame FrmA includes the frame header FrmAHdr and the frame data made up of each data MBa, MBb, MBc, MBd, and the like. Then, the code information Code A of the command, the added information AddA of the code information Code A, the code information Code B of the command that should be executed next to the command of the code information Code A, and the added information AddB of the code information Code B are added to the frame header FrmAHdr in this order. If there is no added information like the code information Code C, only the code information is added.

Figure 16:
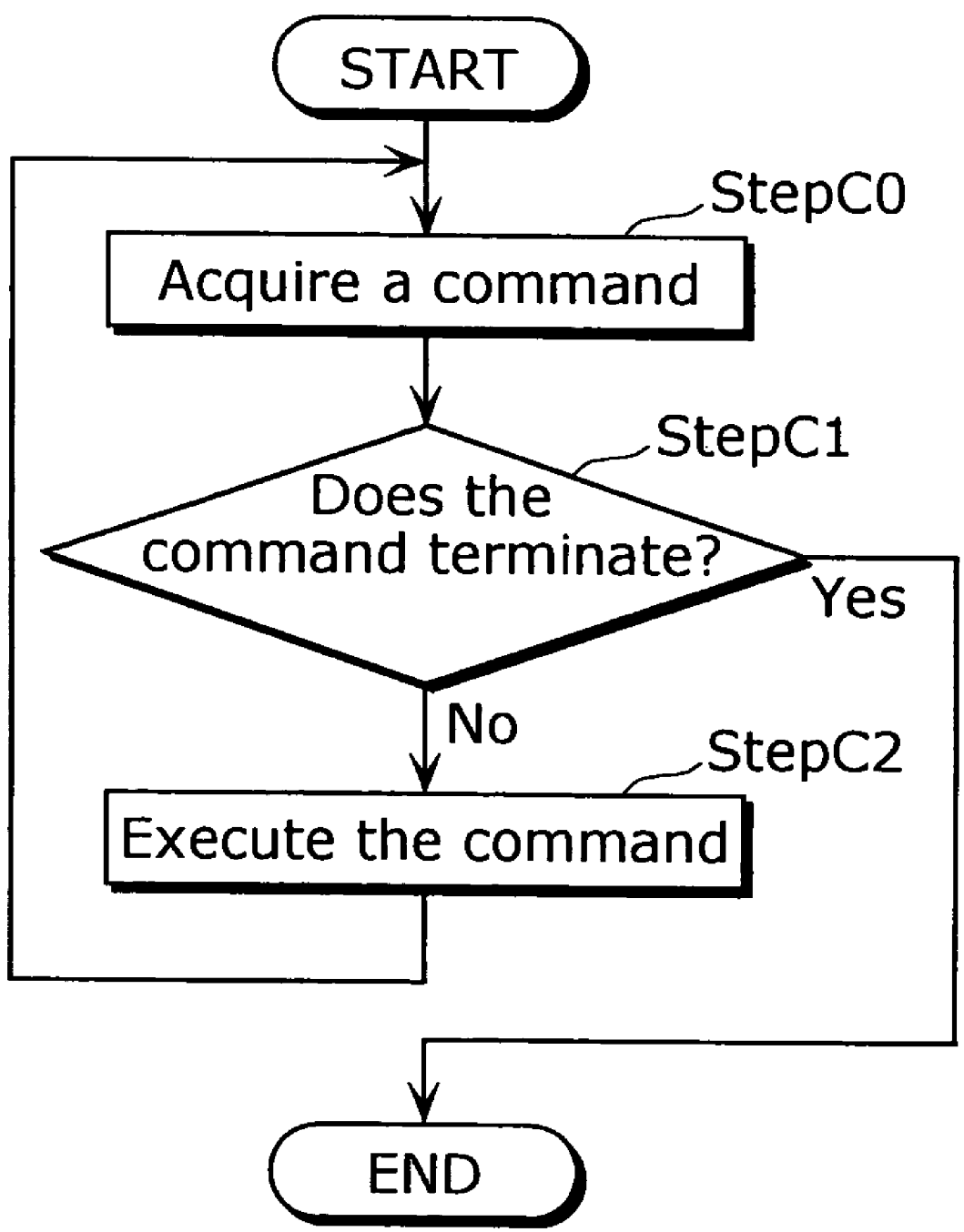
FIG. 16 is a flowchart that shows the procedure for executing the command in the eighth embodiment of the present invention.

Next, the procedure for executing the command is shown in FIG. 16.

FIG. 16 is a flowchart that shows the procedure for executing the command.

In FIG. 16, for a start, a command is acquired (Step C0), and whether the acquisition of the command ends or not is judged (Step C1). When the acquisition of the command does not end and the command is acquired (No at Step C1), the acquired command is executed (Step C2); return to Step C0 and this operation is repeated. On the other hand, when the acquisition of the comnnad ends and the command is not acquired (Yes at Step C1), the processing for executing the command ends. This procedure is executed to each frame. By the way, in the case of the command information being transmitted in the unit of slice made up of plural macro blocks, the command is executed by the same procedure as the above.

Incidentally, in the first embodiment, the command of the memory management information for releasing the image which is never used as reference (releasing the memory) is explained. Further, the first embodiment shows that by coding repeatedly the command of the memory management information for releasing the image which is never used as reference, even if one command of the memory management information is lost by the transmission channel error, the management information of the image stored in the memory can be restored by the other command of the memory management information and the possibility that the image is correctly restored becomes high.

Here, out of the code information shown in FIG. 15, the initialization command Code 5 for releasing all the information in the memory is considered.

When the initializing command Code 5 is transmitted only once and if this initialization command Code 5 is lost by the transmission channel error, the processing of the memory management and like that are normally executed after the initialization is affected. There, similarly to the first embodiment, the case of repeatedly coding and transmitting the initialization command Code 5 is explained using FIG. 19.

Figure 19:
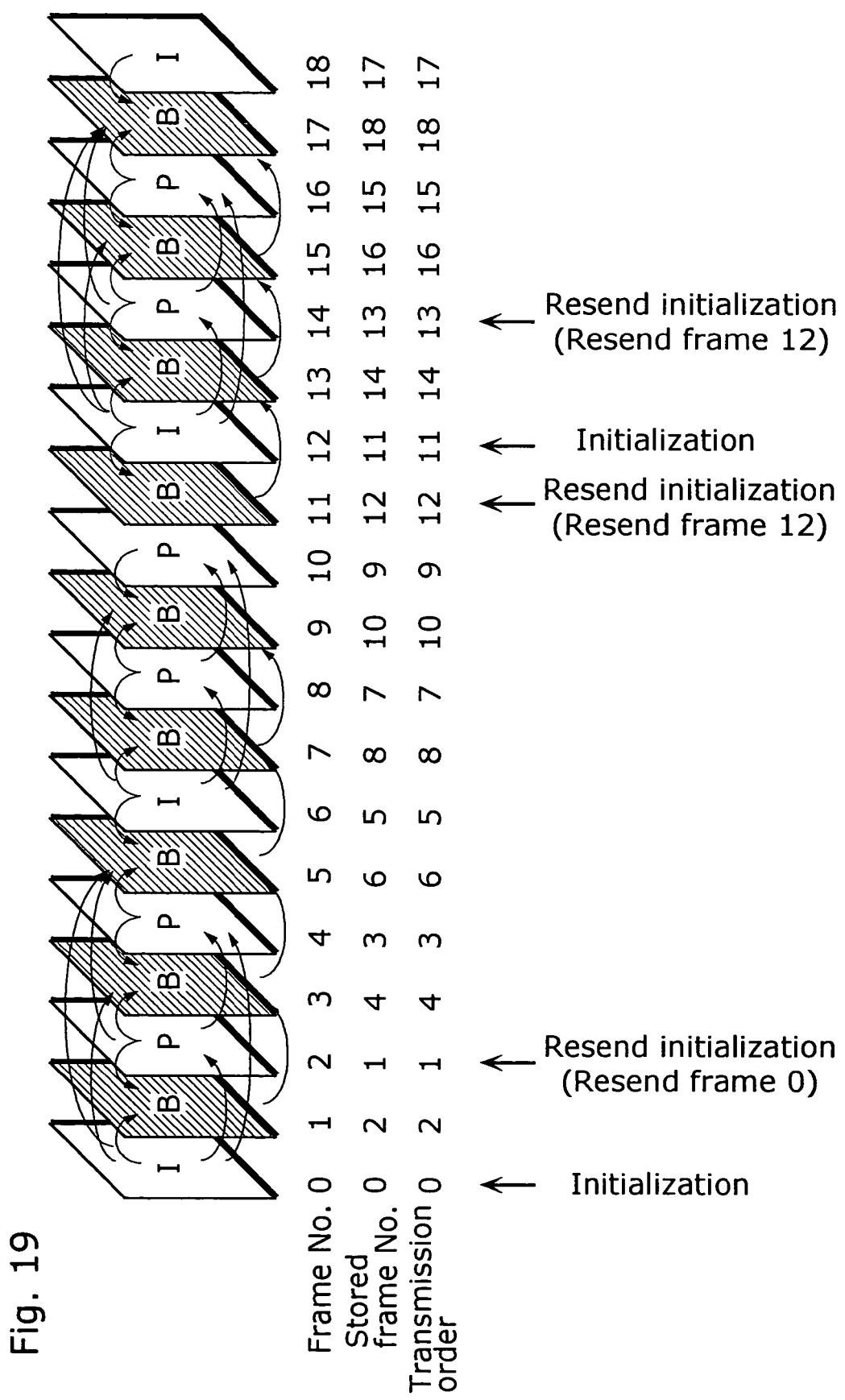
FIG. 19 is an explanatory diagram that shows a relationship among the picture No. and the stored picture No. of each frame and the transmission order.

FIG. 19 is an explanatory diagram that shows a relationship among the numbers given to each frame (picture (frame) No.), the numbers by which each frame is stored in the memory (stored picture (frame) No.), and the numbers that shows the order by which each frame is transmitted (transmission order).

FIG. 19 is explained concretely below. For a start, since the I picture of the picture No. 0 does not refer to other pictures, the I picture of the picture No. 0 is stored in the memory and its stored picture No. is 0. Next, since the P picture of the picture No. 2 that refers to the I picture of the picture No. 0 is stored in the memory, the stored picture No. on the P picture of the picture No. 2 is 1. Then, since the B picture of the picture No. 1 that refers to the I picture of the picture No. 0 and the P picture of the picture No. 2 is stored in the memory, the stored picture No. on the B picture of the picture No. 1 is 2. The order by which each picture is transmitted is that by which each picture is stored. By the similar procedures, the relationship among the picture No., the stored picture No., and the transmission order is decided.

When the I picture of the picture No. 12 shown in FIG. 19 is coded, the initialization command Code 5 shown in FIG. 15 is transmitted. Since the stored picture No. of the I picture of the picture No. 12 is 11, by this initialization command Code 5, all the pictures whose stored picture No. is 10 or less can be released in the memory.

Figure 20:
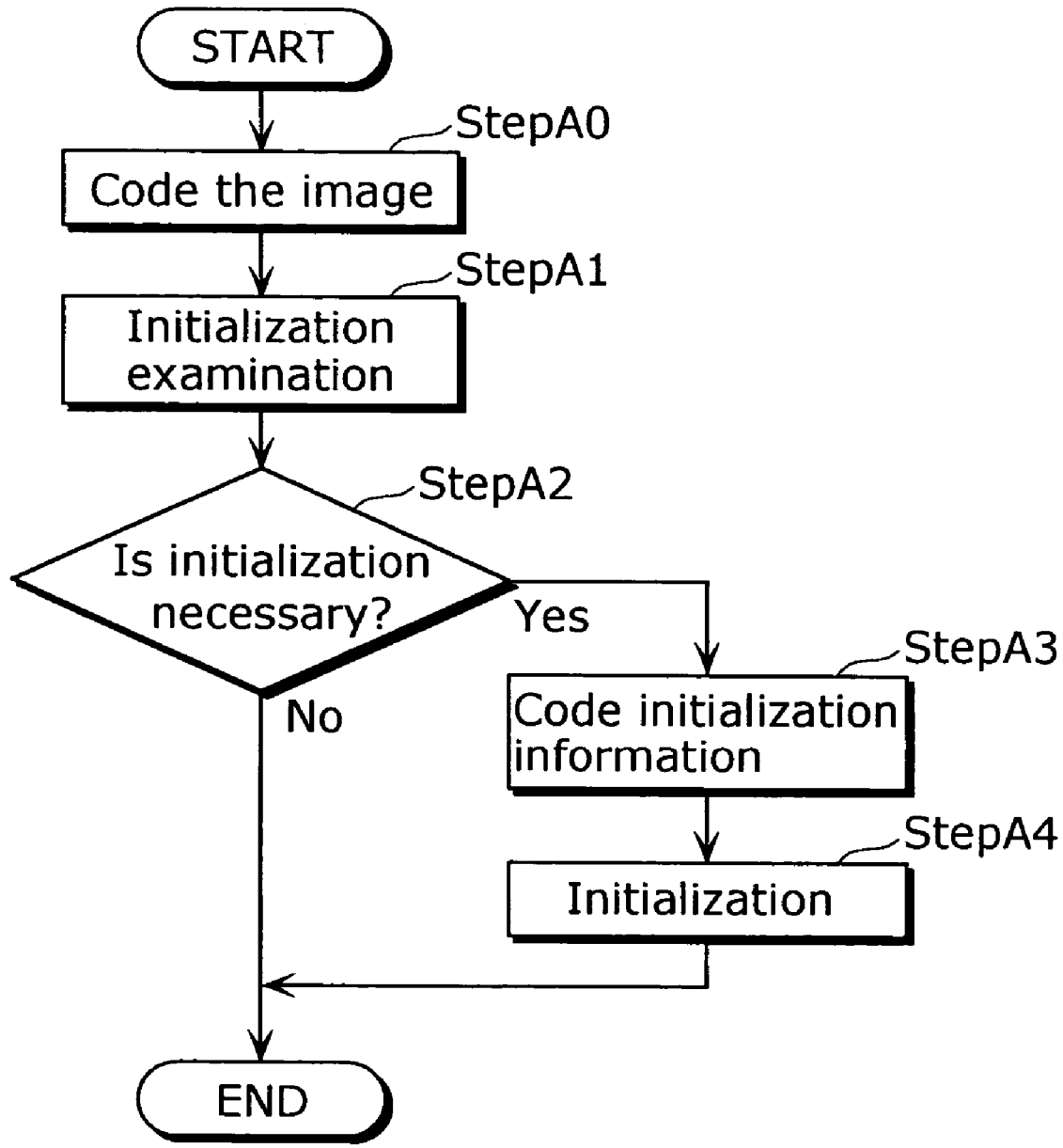
FIG. 20 is a flowchart that shows the method for coding the initialization command.

Here, the method for coding the initialization command Code 5 is explained using FIG. 20.

FIG. 20 is a flowchart that shows the method for coding the initialization command Code 5 and shows the operations that the image coding device 100 shown in FIG. 5 executes.

For a start, an inputted image is coded (Step A0). After the coding, whether all the images that can be referred to in the memory are unnecessary or not (whether any of them is not referred to in the future coding) is examined (for initialization) (Step A1); whether the pictures stored in the memory are not referred to in future and it is better to initialize them is judged (Step A2).

If it is better to initialize them (Yes at Step A2), the initialization command Code 5 that initializes the memory area is coded as the memory management information (Step A3); the initialization is executed (Step A4); the processing ends. On the other hand, when the initialization is not necessary (No at Step A2), the processing ends without executing the operations of Step A3 and Step A4.

Figure 21:
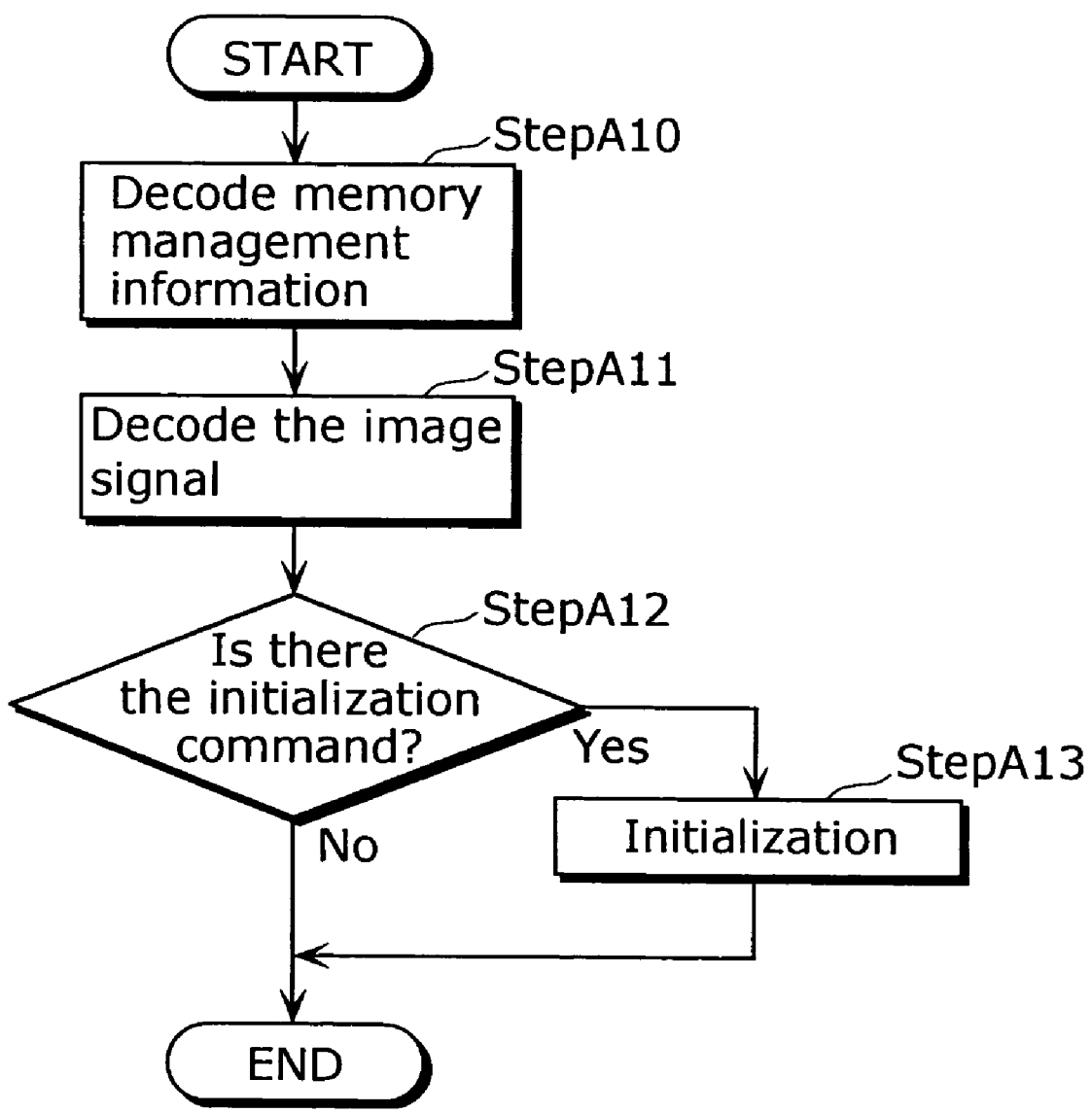
FIG. 21 is a flowchart that shows the method for decoding the coded initialization command.

Next, a method for decoding the coded initialization command Code 5 is explained using FIG. 21.

FIG. 21 is a flowchart that shows the method for decoding the coded initialization command Code 5 and shows the operations that the image decoding device 200 shown in FIG. 7 executes.

For a start, the memory management information is decoded (Step A10); the image signal is decoded from the coded signal (Step A11). Next, whether there is the initialization command Code 5 in the decoded memory management information is judged (Step A12), if there is the initialization command Code 5 (Yes at Step A12), all the pictures memorized in the memory are released and initialized (Step A13) and the processing ends. However, the decoded image (at Step A11) is not released.

On the other hand, if there is no initialization command Code 5 in the memory management information (No at Step A12), the processing ends.

The method for initializing the memory is explained concretely below using FIG. 19. The same initialization command Code 5 as the initialization command given to the I picture of the picture No. 12 is given to the B picture of the picture No. 11.

When shown in FIG. 17, the initialization command Code 5 is given to the frame header Frm12Hdr of the frame Frm12 (picture No. 12) and the frame header Frm11Hdr of the frame Frm12 (picture No. 11). Since the initialization command Code 5 does not have the added information as shown in FIG. 15, the initialization command Code 5 releases all the pictures stored in the memory at the time it is decoded.

Therefore, when the initialization command Code 5 given to the I picture of picture No. 12 (the stored picture No. 11) is lost by the transmission channel error and the initialization command Code 5 given to the B picture of picture No. 11 (the stored picture No. 12) is executed, all the pictures are released by the picture decoded before the stored picture No. 11. In other words, even the I picture of picture No. 12 (the stored picture No. 11) that should not be released by nature is released.

As just described, when the same initialization command Code 5 as the initialization command given to the I picture of the picture No. 12 is given to the B picture of the picture No. 11, one picture (the I picture of the picture No. 12) is dropped. On the other hand, when the same initialization command Code 5 as the initialization command given to the I picture of the picture No. 12 (the stored picture No. 11) is given to the P picture of the picture No. 14 (the stored picture No. 13), the initialization command Code 5 given to the I picture of the picture No. 12 is lost by the transmission channel error, and the initialization command Code 5 given to the P picture of the picture No. 14 is executed, two pictures (the B picture of the picture No. 11 and the I picture of the picture No. 12) are dropped.

Note that when the initialization command Code 5 is repeatedly coded and the initialization command that is transmitted first and the initialization command that is transmitted subsequently are executed without the transmission channel error, the similar problem to the above occurs because the initialization is executed by the initialization command that is transmitted first and further the initialization is executed again by the initialization command that is transmitted subsequently.

A method for solving such a problem in the initialization is explained.

FIG. 22 shows the commands of the memory management information used to solve the problem of initializing the memory.

FIG. 22 is different from FIG. 15 in that the initialization resending command Code 6 is newly added to the former. Furthermore, this initialization resending command Code 6 has the initialized picture (frame) No. (the number of the frame to which the initialization command Code 5 that initializes the memory area is attached) as added information.

The flow of the processing of the image coding using this initialization resending command Code 6 is explained below using FIG. 23.

Figure 23:
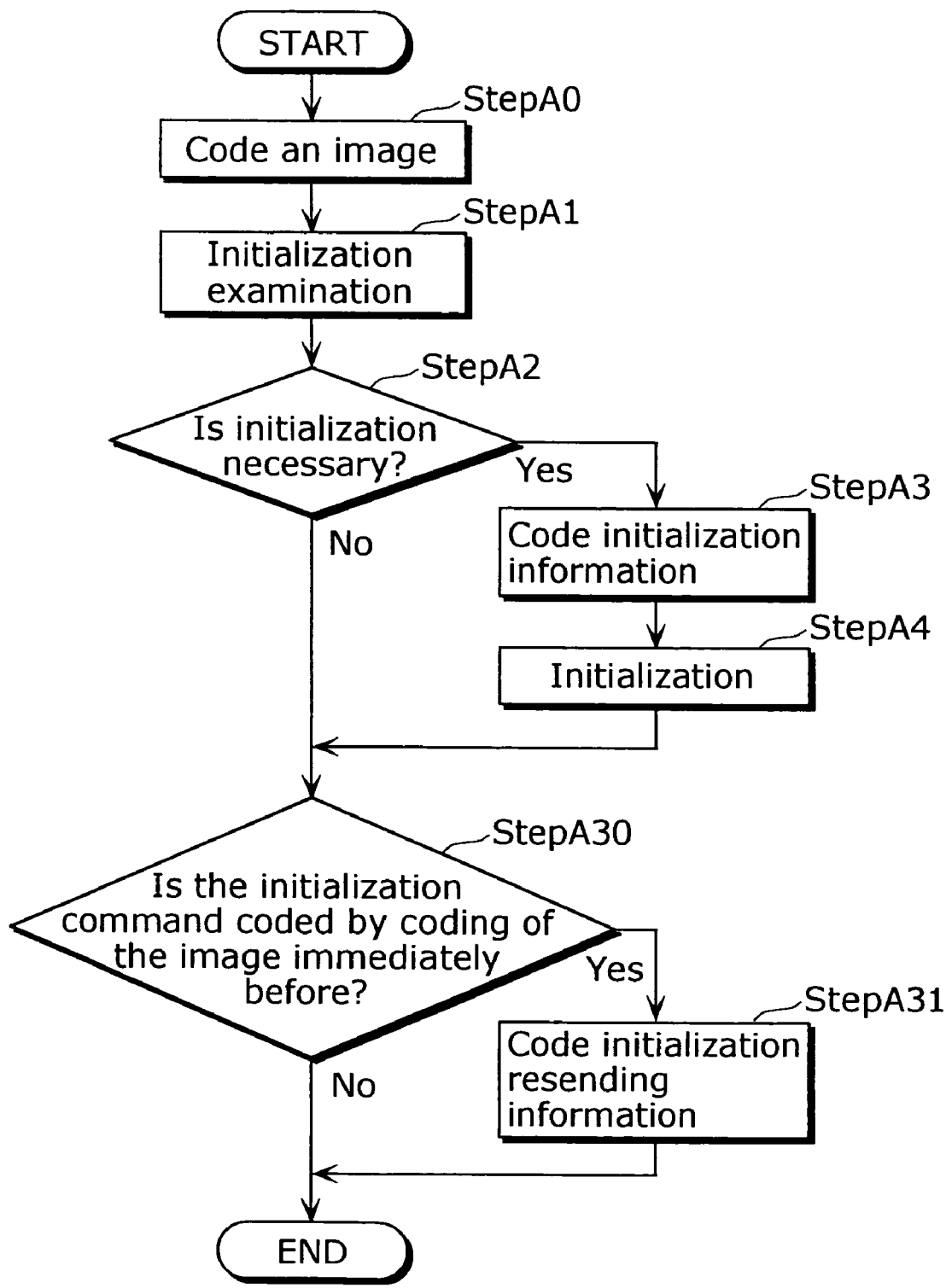
FIG. 23 is a flowchart that shows the image coding method using the initialization resending command in the present invention.

FIG. 23 is a flowchart that shows the image coding method using the initialization resending command Code 6 and shows the operations that the image coding device 100 shown in FIG. 5 executes. FIG. 23, the same operations as FIG. 20 are given the same numbers.

For a start, the inputted image is coded (Step A0). After the coding, whether all the images in the memory are unnecessary or not (whether any of them is not referred to in the future coding) is examined (for initialization) (Step A1), the memory information control unit 101 judges whether the initialization is necessary (Step A2). When the initialization is necessary (Yes at Step A2), the management information coding unit 105 codes the initialization command Code 5 as the memory management information (Step A3) and executes the initialization (Step A4). When the initialization is not necessary (No at Step A2), the operations of Step A3 and Step A4 are not executed.

Next, the memory information control unit 101 judges whether the initialization command Code 5 that initializes the memory area is coded as the memory management information attaching to the image coded immediately before (the image before the coding object) (Step A30); when the initialization command Code 5 is coded (Yes at Step A30), the management information coding unit 105 codes the initialization resending command Code 6 that initializes the memory area as the memory management information (Step A31); the processing ends.

Moreover, when the initialization command Code 5 that initializes the memory area is not coded as the memory management information attaching to the image coded immediately before (the image before the coding object) (No at Step A30), the processing ends.

By the way, in the method shown in FIG. 23, in the case of coding the initialization command Code 5 that initializes the memory area being coded by attached to the coded signal of the image coded immediately before, the initialization resending command Code 6 is coded again; it is acceptable that in the case of the initialization command Code 5 being coded by attached to the coded signal of the image coded not immediately before but several images before, the initialization resending command Code 6 is coded. Additionally, it is also acceptable to code the initialization resending command Code 6 that initializes the memory area repeatedly as the memory management information attaching to plural images.

More specifically, as shown in FIG. 19, in the case of coding the initialization command Code 5 attaching to the coding of the I picture of the picture No. 12, it is acceptable to code the initialization resending command Code 6 attaching to the coding of the B picture of the picture No. 11 and additionally, it is also acceptable to code the initialization resending command Code 6 attaching to the P picture of the picture No. 14.

In the case of the former, when shown in FIG. 17, the initialization command Code 5 is given to the frame header Frm12Hdr of the frame Frm12; further the initialization resending command Code 6 is given to the frame header Frm11Hdr of the frame Frm11. Moreover, in the case of the latter, the initialization command Code 5 is given to the frame header Frm12Hdr of the frame Frm12; the initialization resending command Code 6 is given to the frame header Frm14Hdr of the frame Frm14.

Further, it is acceptable to code the initialization resending command Code 6 attaching to the coding of the B picture of the picture No. 11 and together to code the initialization resending command Code 6 attaching to the coding of the P picture of the picture No. 14. In this case, when shown in FIG. 17, the initialization command Code 5 is given to the frame header Frm12Hdr of the frame Frm12 and the initialization resending command Code 6 is given to the frame header Frm11Hdr of the frame Frm11 and the frame header Frm14Hdr of the frame Frm14.

Figure 24:
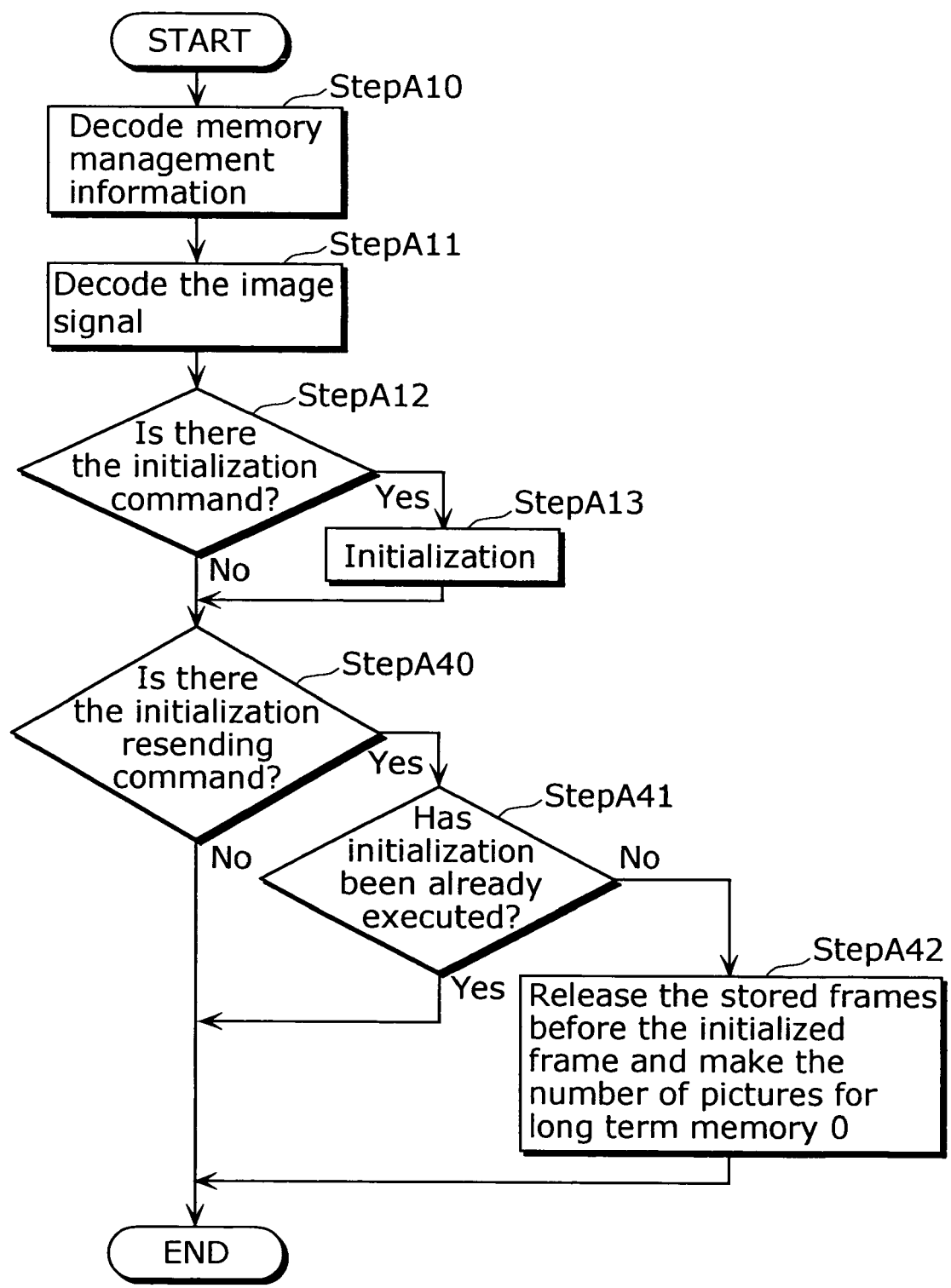
FIG. 24 is a flowchart that shows a method for decoding the coded initialization resending command in the present invention.

Next, the processing for decoding the data in which the initialization resending command Code6 is coded is explained using FIG. 24. FIG. 24 is a flowchart that shows a method for decoding the coded initialization resending command Code 6 and shows the operations of the image decoding device 200 shown in FIG. 7. FIG. 24, the same operations as FIG. 21 are given the same numbers.

For a start, the management information decoding unit decodes the memory management information (Step A10). Then, the image signal is decoded from the coded signal (Step A11).

Whether there is the initialization command Code 5 in the decoded memory management information is judged (Step A12), when there is the initialization command Code 5 (Yes at Step A12), all the picture in the memory are released and initialized (Step A13); when there is no initialization command Code 5 (No at Step 12), the initialization is not executed.

Next, the memory information control unit 101 judges whether there is the initialization resending command Code 6 in the memory management information (Step A40). When there is no initialization resending command Code 6 (No at Step A40), the processing ends; when there is the initialization resending command Code 6 (Yes at Step A40), whether the initialization is executed is examined (Step A41). When the initialization is executed (Yes at Step A41) the processing ends. When the initialization is not executed (No at Step A40), based on the added information of the initialization resending command Code 6, the storage frame (the frame stored in the memory for reference image at the time of coding an initialization frame) before the initialization frame (the frame to which the initialization command Code 5 that initializes the memory area is attached) is released; further the number of pictures for long term memory is made 0 (Step A42); the processing ends. In addition, when the long term frame is not used, there is no need to cause the number of pictures for long term memory to be 0.

Consequently, as shown in FIG. 19, in the case of the picture of the picture No. 12 attached to the initialization command Code 5 being coded and the picture of the picture No. 14 attached to the initialization resending command Code 6 being coded, all the pictures whose stored picture No. is 10 or less and that are stored in the memory are released by the initialization command Code 5 when the initialization command Code 5 is not lost by the transmission channel error or by the initialization resending command Code 6 when the initialization command Code 5 is lost by the transmission channel error.

In this way, when the initialization command Code 5 is repeatedly coded and transmitted, from the second time onward, the initialization resending command Code 6, to which the initialization No., the added information is added, is coded and transmitted, and therefore, based on the added information, the storage frames before the initialization frame (the frames stored in the memory for reference image at the time the initialization frame first attached to the initialization command Code 5 is coded) are released. As a result, the above-described problem that a necessary image (picture) is dropped can be solved.

By the way, in the case of giving the stored picture No. like FIG. 25, which is different from FIG. 19, the above-explained initialization resending command Code 6 is still effective.

A concrete explanation is made below.

FIG. 25 is an explanatory diagram that shows another relationship among the numbers given to each frame (picture (frame) No.), the numbers by which each frame is stored in the memory (stored picture (frame) No.), and the numbers that shows the order by which each frame is transmitted (transmission order).

The method for giving these numbers is explained. For a start, since the I picture of the picture No. 0 does not refer to other pictures, the I picture of the picture No. 0 is stored in the memory and its stored picture No. is 0. Next, since the P picture of the picture No. 2 that refers to the I picture of the picture No. 0 is stored in the memory, the stored picture No. on the P picture of the picture No. 2 is 1. Then, although the B picture of the picture No. 1 that refers to the I picture of the picture No. 0 and the P picture of the picture No. 2 is stored in the memory, since this B picture is not referred to by other pictures, its stored picture No. is 1, same as the stored picture No. of the P picture of the picture No. 2 that is stored immediately before. The order by which each picture is transmitted is that by which each picture is stored. By the similar procedures, the relationship among the picture No., the stored picture No., and the transmission order is decided.

As shown in FIG. 25, when the I picture of the picture No. 12 is coded, it is transmitted attaching to the initialization command Code 5 shown in FIG. 15. Since the stored picture No. of the I picture of the picture No. 12 is 6, it is possible to release all the pictures whose stored picture No. is 5 or less by this initialization command Code 5.

Here, the case of repeated coding the initialization command Code 5, more specifically, the case of giving the same initialization command Code 5 as the initialization command Code 5 given to the I picture of the picture No. 12 to the P picture of the picture No. 14 is explained.

As shown in FIG. 15, since the initialization command Code 5 does not have added information, it releases all the pictures stored in the memory for reference image at the time it is decoded. Consequently, when the initialization command Code 5 given to the I picture of the picture No. 12 (the stored picture No. 6) is lost by the transmission channel error and the initialization command Code 5 given to the P picture of the picture No. 14 (the stored picture No. 7) is executed, all the pictures whose stored picture No. is 6 or less and that are stored in the memory are released. In other words, even the I picture of the picture No. 12 (the stored picture No. 6) that should not be released by nature is released.

However, by attaching the initialization resending command Code 6 instead of the initialization command Code 5 to the P picture of the picture No. 14, all the pictures whose stored picture No. is 5 or less that are stored in the memory are released by the initialization command Code 5 in the case of the initialization command Code 5 not being lost by the transmission channel error or by the initialization resending command Code 6 in the case of the initialization command Code 5 being lost by the transmission channel error.

In other words, since the initialized frame No. (in this case, the picture No. 12) is added to the initialization resending command Code 6 as the added information, the storage frames before the initialization frame (the storage frames whose stored picture No. is 5 or less and that are stored in the memory for reference image at the time the initialization frame is stored) are released.

As is described, by the initialization resending command Code 6 that has the added information, even if the initialization command Code 5 is lost by the transmission channel error, the possibility that the initialization is executed normally becomes high. In addition, it is acceptable to substitute the initialization command Code 5 with the initialization resending command Code 6 shown in the present embodiment that has the picture No. of the picture to which the initialization resending command Code 6 is attached as added information and to realize Code 5 and Code 6 shown in FIG. 22 as one command. This is because when the initialization is resent to resend the initialization information, the number of the frame to which the initialization command Code 5 is attached is designated; the picture No. to resend the said frame is not used. At this time, it is acceptable to invalidate the initialization command Code 5.

Note that in the case of realizing the initialization resending command Code 6 and the initialization command Code 5 shown in the above-mentioned embodiments by one command like this, it is acceptable that the initialization resending command Code 6 that has a special value that is not used in the initialization resending command Code 6 shown in the above-mentioned embodiments is made to be the command that has the same function as the initialization command Code 5 that is sent first.

Moreover, as explained in the above-mentioned each embodiment, when the memory management information such as the command for releasing a picture in the memory which is never used as reference and the initialization command is transmitted again, as shown in FIG. 17 and FIG. 18, it is acceptable to transmit the header information including the memory management information separately from the frame data instead of transmitting the memory management information included in the header information added to the frame data on the coding of the image. In other words, it is acceptable that the command to be transmitted again is not in the same stream as the coded picture but is transmitted, for example, as a different stream. Additionally, it is also acceptable to record the command in a different area of storage media.

Further, in the present embodiment, when the initialization command Code 5 is resent, the picture No. of the picture to which the initialization command Code 5 is first attached (the initialized frame No.) is added to the initialization resending command Code 6 as added information but when the command of the memory management information such as the command for releasing the memory area and the command for designating the object picture to be moved from the short term memory to the long term memory is resent as shown in the above-mentioned each embodiment, it is naturally acceptable that the picture No. of the coded object picture transmitted attaching first to the command (the information for identifying the picture) is included as a parameter and is transmitted. By so doing, it is possible to detect which picture was transmitted when the transmission channel error occurred.

(The Ninth Embodiment)

Next, an image coding method and an image decoding method according to the ninth embodiment are explained.

The characteristic of the present embodiment is, when the memory management information is transmitted plural times, to change the timing of the processing based on the memory management information transmitted at the second time and later.

When the data obtained by repeatedly coding the memory management information is decoded as shown in the above-mentioned embodiments, before processing the memory management information that is repeatedly transmitted, the image signal to which the memory management information is attached is decoded without fail. As a concrete example, the case of transmitting the command for releasing a picture in the memory which is never used as reference plural times that is explained in the second embodiment is explained again using FIG. 19.

The picture of the picture No. 12 shown in FIG. 19 is attached to the command of Code 1 shown in FIG. 22 and is coded and further the picture of the picture No. 11 is attached to the command of Code 1 and is coded. At this time, the decoding is executed following FIG. 8. As a start, the Code 1 attaching to the picture of the picture No. 12 is decoded (Step 110). Next, the picture of the picture No. 12 is decoded (Step 111). Here, when the Code 1 that should be attached to the picture of the picture No. 12 by nature is dropped during the transmission (No at Step 112), the processing on this frame ends.

In the order of transmission, the picture of the picture No. 11 is processed to be decoded next to the picture of the picture No. 12.

For a start, the Code 1 that is coded by attached to the picture of the picture No. 11 is decoded (Step 110). Next, the picture of the picture No. 11 is decoded (Step 111). When this Code 1 is not dropped during the transmission and is transmitted, the Code 1, the command for releasing the memory, exists in the decoded memory management information (Yes at Step 112), which leads to the next processing (Step 113).

Here, since the memory is not released when the picture of the picture No. 12 that is decoded before decoding of the picture of the picture No. 11 is decoded (No at Step 113), the processing for releasing the memory is executed (Step 114).

As shown in the above-mentioned concrete example, owing to transmitting the command for releasing a picture in the memory which is never used as reference, the command that should be executed by nature to the picture (the picture No. 12) to which the first command is not executed, is executed after the decoding processing of the picture signal of the picture (the picture No. 11) that is transmitted later; a delay of executing the command occurs.

Figure 27:
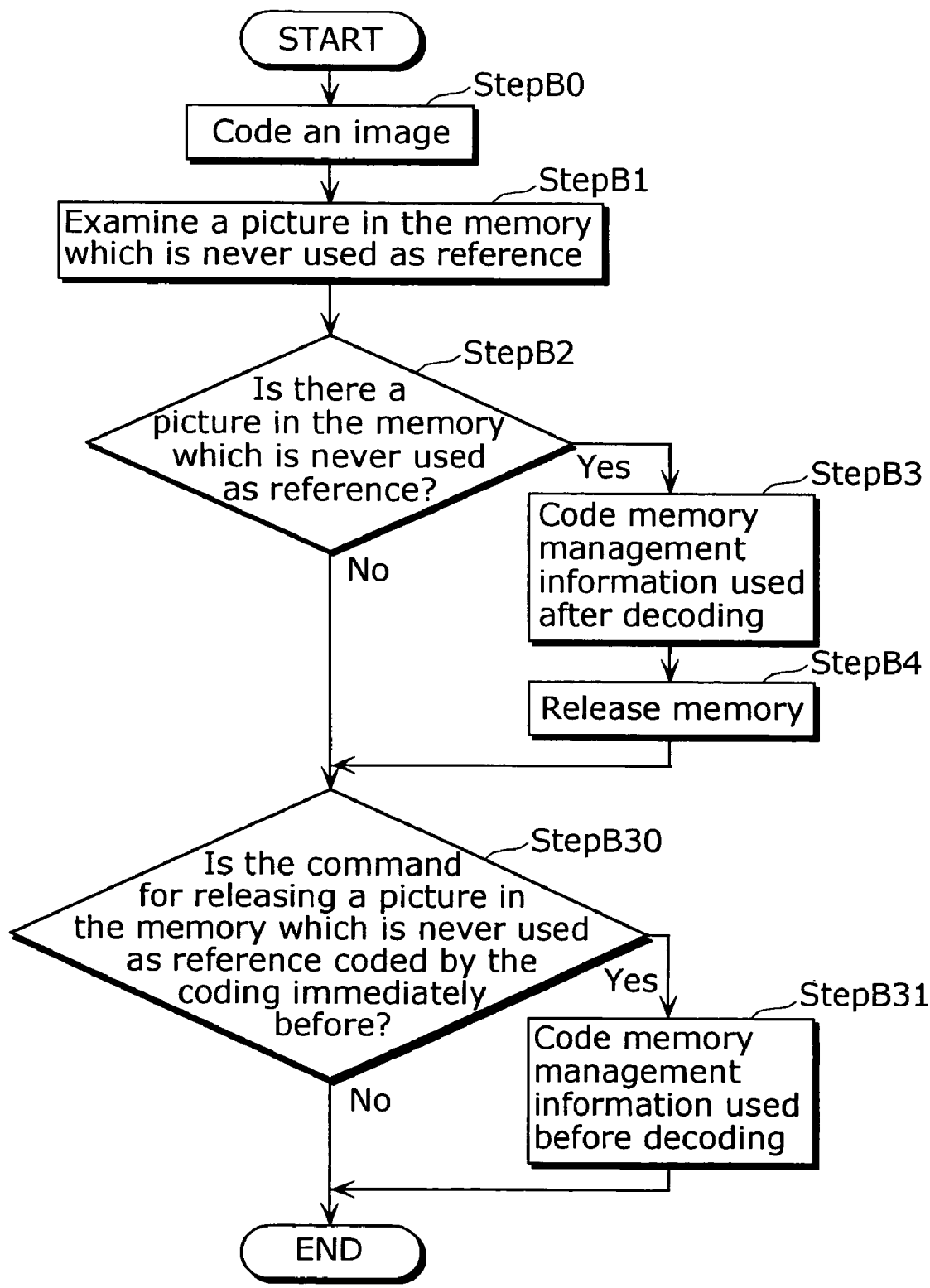
FIG. 27 is a flowchart that shows an image coding method in the ninth embodiment of the present invention.
Figure 28:
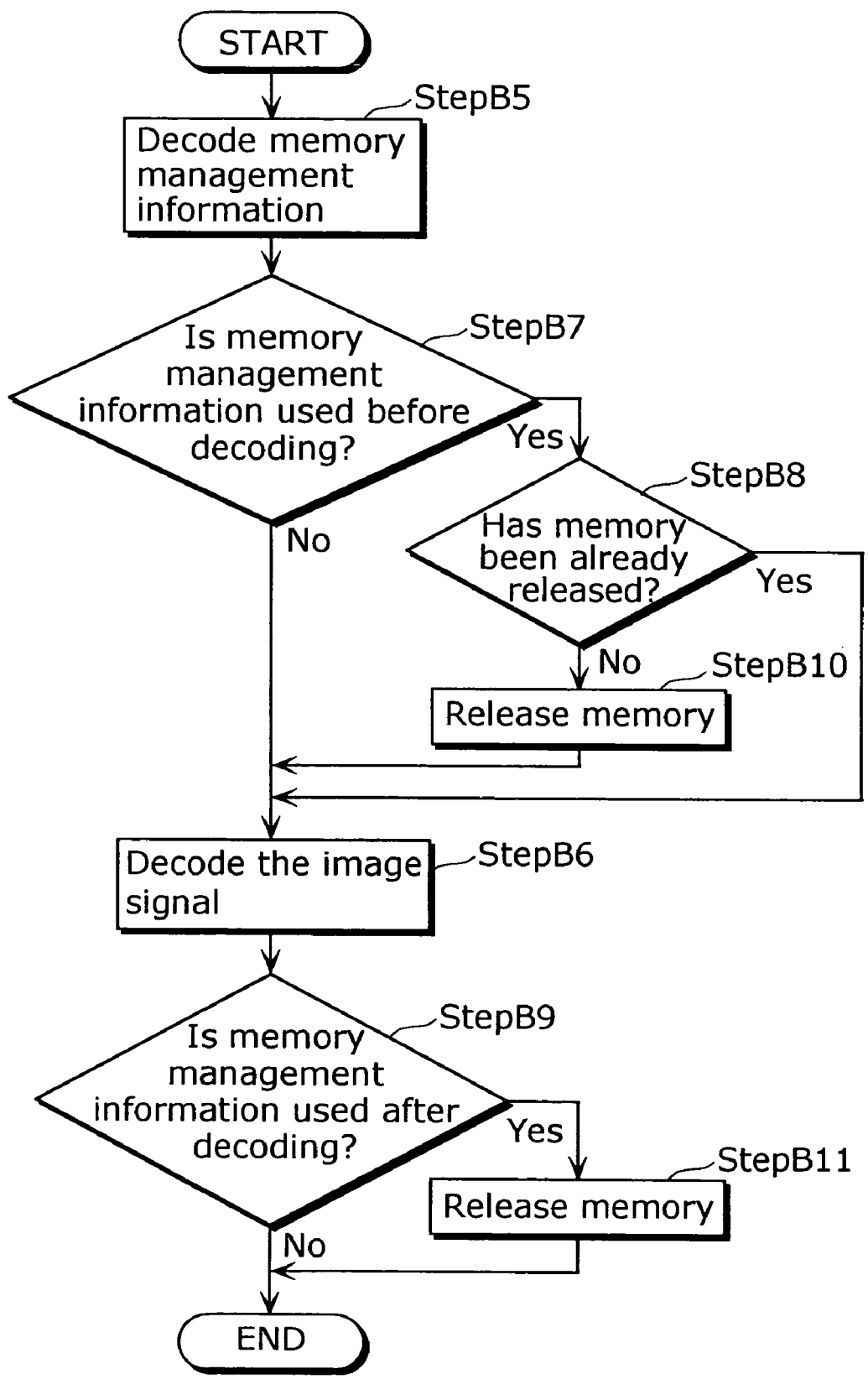
FIG. 28 is a flowchart that shows an image decoding method in the ninth embodiment in the present invention.

Consequently, in the present embodiment, a method for solving the problem is explained using FIG. 26, FIG. 27, and FIG. 28.

FIG. 26 is a correspondence diagram that shows a relationship between the memory management information and the commands that are used in the present embodiment.

In FIG. 26, the Code shows the number of the command; the command shows the contents of the command; the added information shows the added information added to the command; the processing position shows the timing for executing the commands.

FIG. 26 is different from FIG. 15 in that in the former, Code A1~Code A4 are the commands that are executed after the decoding processing of the image, while Code A6~Code A9 that correspond to Code A1~Code A4 are the commands that are executed before the decoding processing of the image.

Then, in the case of sending the memory management information repeatedly, the commands of memory management information that are coded first are the commands (Code A1~Code A4) whose processing positions are after the decoding (executed after the decoding of the image); the commands that are coded repeatedly (after the second time) are the commands (Code A6~Code A9) whose processing positions are before the decoding.

Herewith, in the case of the memory management information sent first being dropped, the command that should be executed by the memory management information that is sent first by nature is executed early and it is possible to make the problem such as the delay hard to occur.

Hereinafter, processing procedures using the commands in FIG. 26 are explained using FIG. 27 and FIG. 28.

FIG. 27 is a flowchart that shows an image coding method in the present embodiment and shows the operations of the image coding device 100 shown in FIG. 5.

In FIG. 27, for a start, an image is coded (Step B0). After the coding, the unnecessary area (the images that are not referred to in future coding) is examined (Step B1); whether there is the unnecessary area is judged (Step B2). When there is a picture in the memory which is never used as reference (Yes at Step B2), the command for releasing a picture in the memory which is never used as reference is set to be executed after the decoding of the image signal; the memory management information used after the decoding is coded (Step B3), a picture in the memory which is never used as reference is released (Step B4). On the other hand, when there is no picture in the memory which is never used as reference (No at Step B2), the operations of Step B3 and Step B4 are not executed.

Next, the memory information control unit 101 judges whether the command for releasing a picture in the memory which is never used as reference attaching to the coding of the image coded immediately before (the image before the coded object) is coded as the memory management information (Step B30). If not coded (No at Step B30), the processing ends. If coded (Yes at Step B30), the management information coding unit 105 executes the command for releasing a picture in the memory which is never used as reference before the decoding of the image signal and codes the memory management information used before the decoding (Step B31) and the processing ends.

Note that in the case of the command for releasing a picture in the memory which is never used as reference being coded by attached to the coded signal coded immediately before in Step B30, the command is coded again but the case of attaching to the image before several images is acceptable instead of the case of attaching to the image immediately before. Further, it is acceptable that the above-mentioned command is repeatedly coded as the memory management information and is transmitted attaching to plural images.

Next, procedures for decoding the data coded following the procedures in FIG. 27 are explained using FIG. 28 and FIG. 19.

FIG. 28 is a flowchart that shows an image decoding method in the present embodiment and shows the operations that the image decoding device 200 shown in FIG. 7.

In the following explanation, in FIG. 19, the picture of the picture No. 12 is coded by attached to the command of the Code A1 shown in FIG. 26 and further the picture of the picture No. 11 is coded by attached to the command of the Code A6. When shown in FIG. 17, the Code A1 is given to the frame header Frm12Hdr of the frame Frm12 of the picture No. 12, while the Code A6 is given to the frame header Frm11Hdr of the frame Frm11 of the picture No. 11.

By the way, unless the command is lost by the transmission channel error, the image decoding device receives the command for releasing the same image area in the memory plural times. Consequently, in the image decoding method that the image decoding device executes, even if the image decoding device receives the command for releasing the image that has been already released, the image decoding device does not processes the command as an error but must judge on the contrary that the command is correctly received.

For a start, the decoding processing on the picture of the picture No. 12 is explained.

In FIG. 28, for a start, the memory management information of the picture of the picture No. 12 is decoded (Step B5); whether this memory management information is the memory management information used before the decoding, is examined (Step B7). Here, since this memory management information (Code A1) is the memory management information used after the decoding (No at Step B7), the image signal of the picture of the picture No. 12 is decoded. Then, as is described before, since the memory management information (Code A1) is the memory management information used after the decoding (Yes at Step B9), the memory is released (Step B11), and the processing on the memory management information of the picture of the picture No. 12 ends.

On the other hand, when the Code A1 of the memory management information is dropped, the memory management information is not judged to be the memory management information used before the decoding at Step B7 (No at Step B7), and additionally, the memory management information is not judged to be the memory management information used after the decoding (No at Step B9), only the image signal of the picture of the picture No. 12 is decoded (Step B6), the processing on the memory manage information of the picture of the picture No. 12 ends.

Next, the decoding processing of the frame of the picture No. 11 is explained using FIG. 28.

For a start, the memory management information of the picture No. 11 is decoded (Step B5); whether this memory management information is the memory management information used before the decoding, is examined (Step B7). Here, since the Code A6 is the memory management information used before the decoding (Yes at Step B7), whether the memory is released or not is examined (Step B8). In the processing of the picture of the picture No. 12, since the memory has been already released if the Code A1 is executed (Yes at Step B8), the processing for releasing the memory (Step B10) is not executed, and the picture of the picture No. 11 is decoded (Step B6). Then, whether the memory management information is used after the decoding, is judged (Step B9), but since the Code A6 is the memory management information used before the decoding (No at Step B9), the processing on the memory management information of the picture of the picture No. 11 ends.

However, because of a drop of a packet during the transmission and the like, the memory management information of the picture of the picture No. 12 is dropped, in the processing on the picture of the picture No. 12, when the memory is not released, in the processing on the picture of the picture No. 11, the memory is judged not to be released (No at Step B8), the memory is released at the next step (Step B6). Then, since the Code A6 is the memory management information used before the decoding (No at Step B9), the processing on the memory management information of the picture of the picture No. 11 ends.

In this way, for what is resent, executing the command before the decoding of the image signal, even if the command sent first is dropped, it is possible to reduce the delay of executing the command.

In addition, as a concrete example, the case of the memory management information being the Code A1 and the Code A6 is explained, but the same can be realized with the similar processing in the case of the Code A2 and the Code A7 being used and the same can be also realized by the similar processing in the case of the Code A3 and the Code A8 being used and in the case of the Code A4 and the Cod A9 being used.

Furthermore, it is possible to use as a pair the initialization command Code A5 shown in FIG. 26 as the memory management information used after the decoding and the initialization resending command Code 6 shown in FIG. 22 as the memory management information used before the decoding, respectively.

Moreover, in the case of a piece of the memory management information used after the decoding and plural pieces of the memory management information used before the decoding being given to one frame as the header information, it is good to process the plural pieces of the memory management information used before the decoding before the memory management information used after the decoding.

In other words, it is good to give the memory management information used before the decoding to the head part of the header information shown in FIG. 17 and code the said memory management information.

Additionally, by combining the commands shown in FIG. 29A and FIG. 29B and making whether the memory management information is the memory management information used before the decoding or the memory management information used after the decoding, other information, it is acceptable to realize the commands shown in the above-mentioned embodiments.

FIG. 29A is a correspondence diagram that shows the contents of the commands and the added information. FIG. 29B is a correspondence diagram that shows the execution timings (the processing positions) of the commands.

FIG. 30 is a schematic diagram that shows the commands of the memory management information in the header information of a coded signal.

In FIG. 30, the coded signal of the frame FrmB has the frame header FrmBHdr, the frame data such as MBa and MBb; the frame header FrmBHdr has the code information Code D and the like as the header information.

At this time, as shown in FIG. 30 for example, it is good that the frame header FrmBHdr of the frame FrmB includes, from the beginning, the code information Code D of the command, Flag D that shows the processing position, and the added information AddD that shows the added information of the command. When there is no added information, as shown in FIG. 30, it is good that Code E of the command and Flag E that shows the processing position are added to the frame header FrmBHdr. Since immediately after the Code that shows the command is not Add that shows added information but Flag that shows the processing position, it is possible to optimize the processing of Step B7 and Step B9 shown in FIG. 28.

Additionally, to distinguish whether the executing timing of the command is before or after the decoding of the image signal, using a new command for showing the processing position, it is acceptable that the commands that are located before the position in the header frame of the command that shows the processing position are executed after the decoding, while the commands that are located after the position in the header frame of the command that shows the processing position are executed before the decoding. By so doing, when there are plural commands, the executing timing (the processing position) of each command can be shown by one command, compared with the case of transmitting a Flag that shows the processing position for every command, the information to be transmitted is reduced and the coding efficiency is improved.

Figure 31:
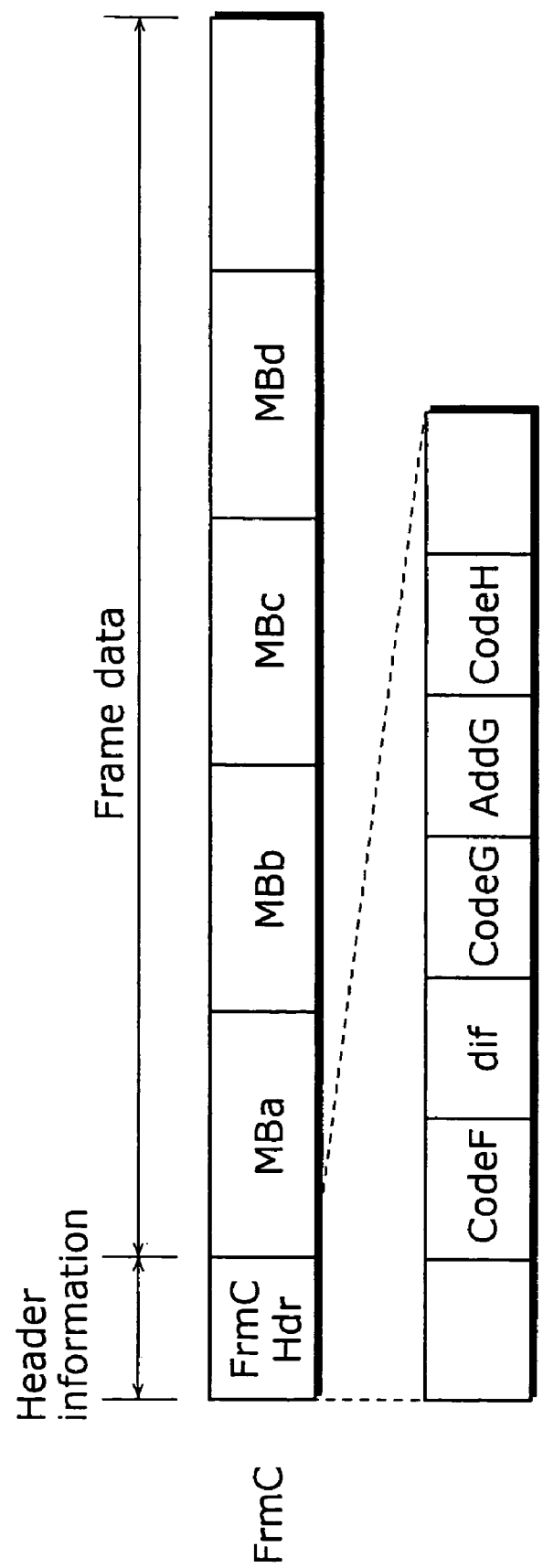
FIG. 31 is a schematic diagram that shows the commands of the memory management information in the header information of another coded signal.

A concrete example is explained using FIG. 31.

FIG. 31 is a schematic diagram that shows the commands of the memory management information in the header information of another coded signal.

In FIG. 31, the coded signal of the frame FrmC has the frame header FrmCHdr and the frame data such as MBa and MBb; in the frame header FrmCHdr, as the header information, from the beginning in order, the command Code F, the command dif, the command Code G, the added information AddG, and the command Code H are located.

Then, whether the command dif that shows the processing position is in the frame header FrmCHdr is judged, it is acceptable that the command Code F that is before the command dif that shows the processing position is executed after the decoding of the frame FrmC, while the command Code G and the command Code H that are after the command dif are executed before the decoding of the frame FrmC. In this case, if there is not the command dif that shows the processing position, all the commands in the frame header FrmCHdr are executed after the decoding processing of the frame FrmC.

By the way, as explained in the above-mentioned each embodiment, when the memory management information such as the command for releasing a picture in the memory which is never used as reference and the initialization command is transmitted again, it is acceptable to transmit the header information including the memory management information separately from the coded signal of the image instead of transmitting the memory management information included in the header information added to the coded signal of the image. In other words, it is acceptable that the command to be transmitted again is not in the same stream as the coded picture but is transmitted, for example, as a different stream. Additionally, it is also acceptable to record the command in a different area of storage media.

(The Tenth Embodiment)

Next, the tenth embodiment of the present invention is explained.

In the present embodiment, the unit to which the coding is executed is different from that of the above-mentioned each embodiment. In other words, in the first embodiment, when the command for releasing a picture in the memory which is never used as reference is transmitted plural times, the memory management information stream CtlStr and the image coding stream VideoStr that correspond to the above-mentioned command and are shown in FIG. 5 are coded in the unit of an image (a picture) but in the present embodiment, it is acceptable to code one frame in the unit of a slice like a stream structure shown in FIG. 32.

Figure 32:
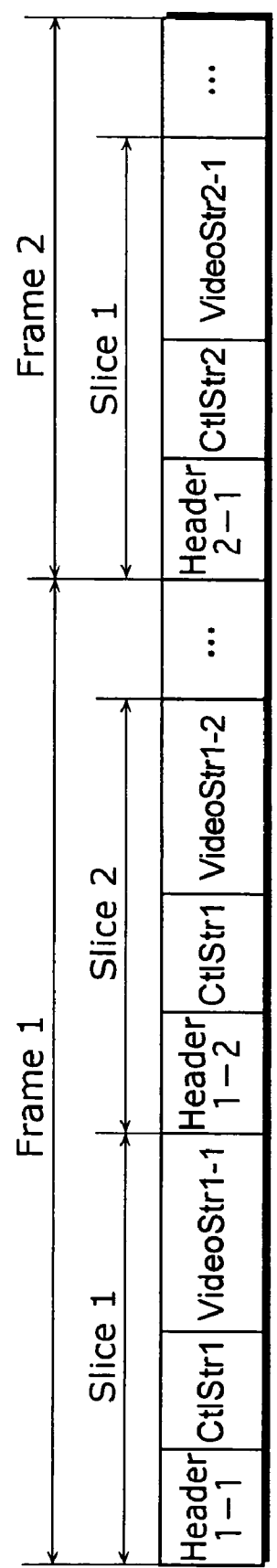
FIG. 32 is a schematic diagram that shows the data stream structure coded in the unit of slice.

Coding in the unit of a slice is, as slice 1 of frame 1 in FIG. 32 has header 1—1, CtlStr 1, and VideoStr 1—1 and slice 2 of the frame 1 in FIG. 32 has header 1-2, CtlStr 1, and VideoStr 1-2, coding the header, the memory management information stream CtlStr, and the image coding stream VideoStr for every slice of each frame. After coding, the image coding device outputs data stream. In addition, the slice is a synchronization return unit, a strip-shaped area made up of one or plural blocks, and the plural slices construct a picture. Furthermore, a picture is a basic coding unit that corresponds to one image; a block is a basic unit of coding/decoding.

Figure 33:
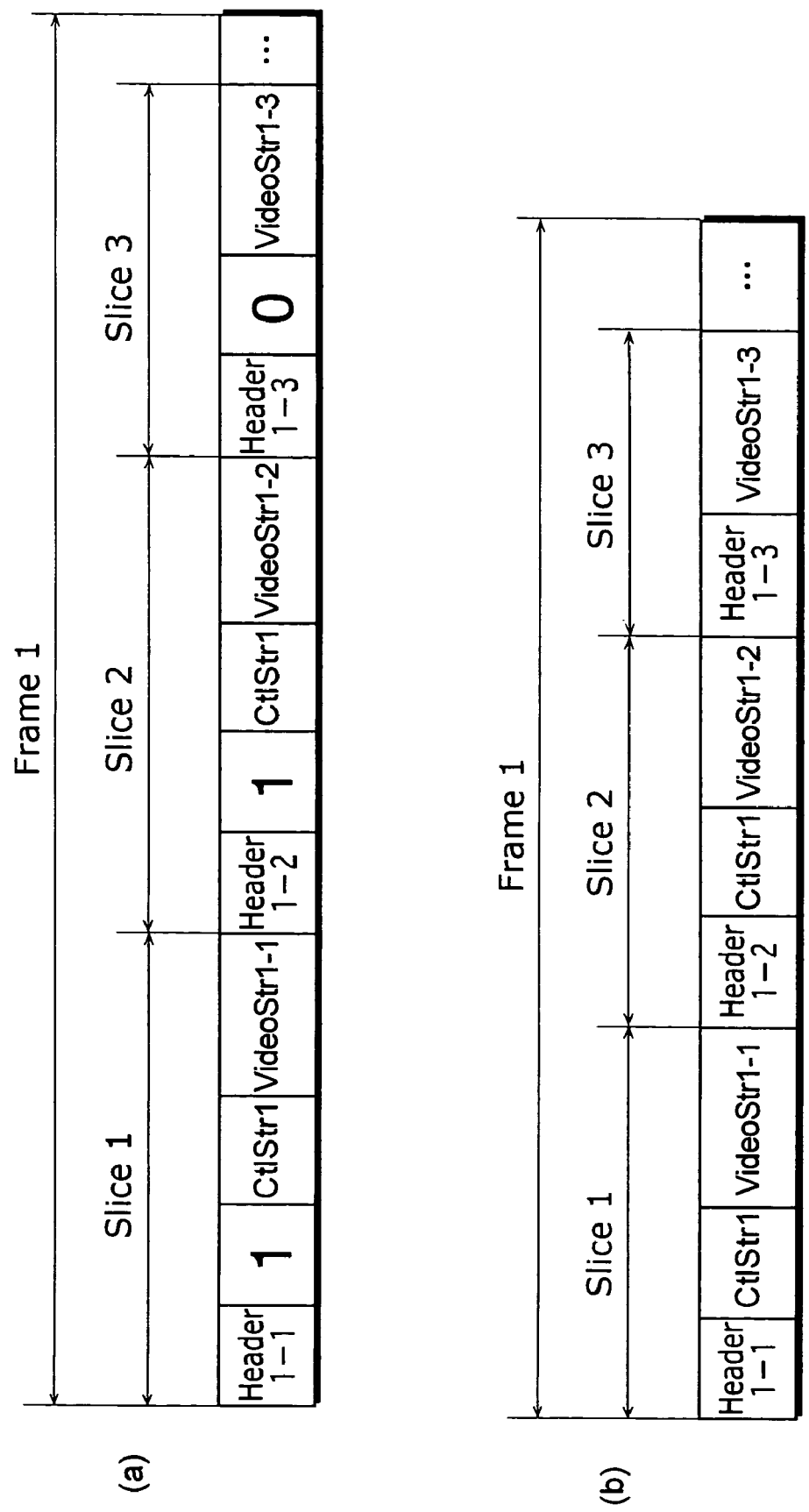
FIG. 33A and FIG. 33B are schematic diagrams that show the data stream structures coded in the unit of slice.

Moreover, as described above, the contents when the memory management information stream CtlStr is transmitted plural times are the same information within the same frame. Being the same information, the addition of this memory management stream CtlStr in the unit of a slice can be omitted. For example, the information that shows whether the plural times of transmission are omitted or not in the said slice is added to the header of the slice; "0" is added to the header of the slice when the plural times of transmission of the above-mentioned command are omitted; "1" is added to the header of the slice when the above-mentioned command is transmitted (not omitted) in the said slice. Concretely, an example is shown in FIG. 33A and explained below. Each of the headers and the video coding streams VideoStr of slice 1~slice 3 in frame 1 is different. On the other hand, the slice 1 and the slice 2 have the same memory management information stream CtlStr 1, each of the slice 1 and slice 2 has the information "1" that shows that the same memory management information stream is coded in the plural slices in the same frame. Additionally, the slice 3 has the information "0" that shows that the memory management information stream CtlStr 1 is omitted. By so doing, when transmitting of the command plural times is omitted in the said slice, by referring to the memory management information stream CtlStr in the slice where the above-mentioned "1" is shown like the first slice and the like, it is possible to omit the addition of the memory management information stream CtlStr and reduce the number of bits.

In other words, the above-mentioned information "0" that shows that the memory management stream CtlStr 1 is omitted is, in the slice that does not have the information that designates the picture of the object to be released (slice 3), when the information that designates the picture of the object to be released is referred to, the information that shows that the information that designates the picture of the object to be released is referred to.

The method like this for enabling the omission of the addition of the memory management information stream CtlStr is effective because the possibility that the memory management information stream is dropped plural times during the transmission process is low.

Further, when the presence or absence of the memory management information stream CtlStr can be judged without the information that shows that the memory management information stream CtlStr is omitted, it is acceptable that this information is omitted as shown in FIG. 33B. For example, when the head of the memory management information stream CtlStr can be distinguished from the head of the image coding stream VideoStr, the judgment whether there is the information that shows whether the memory management information stream CtlStr 1 is coded can be confirmed by whether there is the predetermined information in the predetermined place from the head in each slice.

The method like this for enabling the omission of the addition of the memory management information stream CtlStr is effective because the number of coding the memory management information stream is cut down and the number of bits is reduced.

Up to this point, coding is explained but similarly decoding of one frame can be executed in the unit of a slice. In the second embodiment, when the command for releasing a picture in the memory which is never used as reference is transmitted plural times, the image decoding device 200 shown in FIG. 7 divides the stream structure that has the memory management information stream CtlStr and the image coding stream VideoStr that correspond the above-mentioned commands and are shown in FIG. 32, and inputs each stream in the unit of a image (picture), but it is acceptable to input each stream in the unit of a slice.

Note that in the coding and the decoding in other embodiments, it is acceptable to code and decode one frame similarly in the unit of a slice.

Furthermore, the image coding methods and the image decoding methods shown in the first embodiment~the tenth embodiment can be implemented in mobile communication devices such as a cell phone and a car navigation system and picture-taking devices such as a digital video camera and a digital still camera by semiconductors such as LSI (large scale integration). Moreover, three types of implementations can be conceived: a sending/receiving terminal implemented with both an encoder and a decoder; a sending terminal implemented with an encoder only; and a receiving terminal implemented with a decoder only.

(The Eleventh Embodiment)

Next, the eleventh embodiment of the present invention is explained.

In the present embodiment, if a program for realizing the structure of the image coding methods or the image decoding methods as shown in the first embodiment the tenth embodiment is recorded on a memory medium such as a flexible disk, it becomes possible to perform the processing as shown in these embodiments easily in an independent computer system.

Figure 34A:
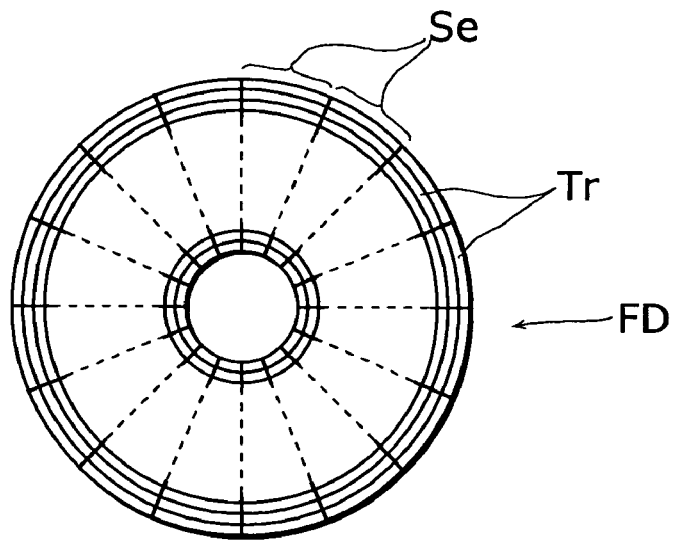
FIGS. 34A, 34B and 34C are explanatory diagrams about a record medium to store a program to realize the image coding method or the image decoding method of the first embodiment~the tenth embodiment of the present invention by a computer system.
Figure 34B:
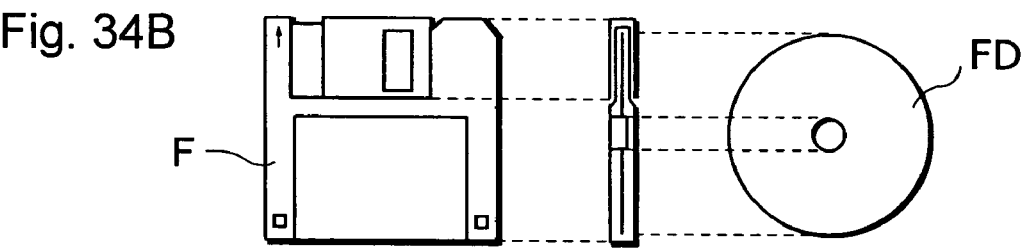
Figure 34C:
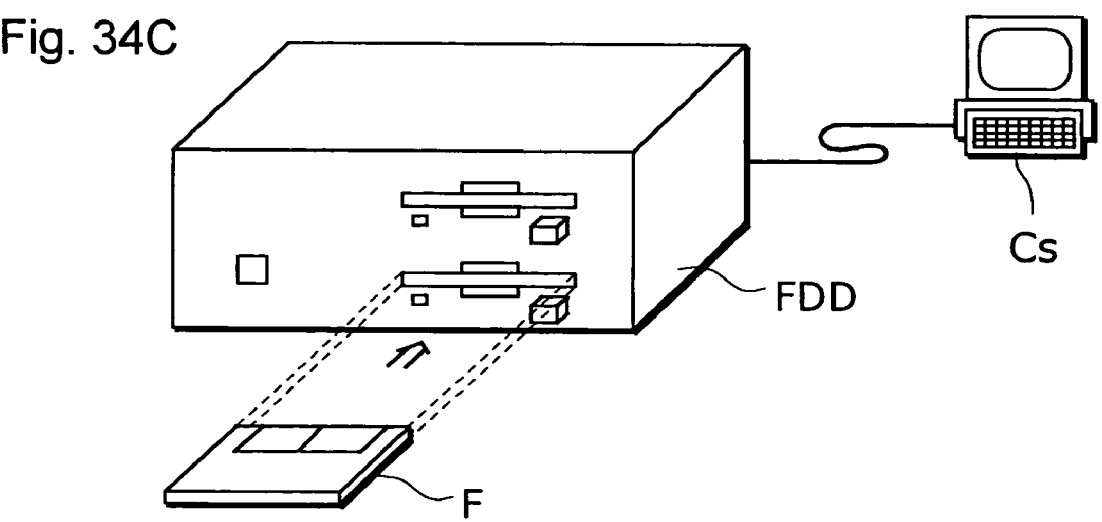

FIGS. 34A, 34B and 34C are explanatory diagrams that show the case where the processing is performed in a computer system using a flexible disk that stores the image coding method or the image decoding method of the first embodiment the tenth embodiment.

FIG. 34B shows a flexible disk and the front view and the cross-sectional view of the appearance of the flexible disk, and FIG. 34A shows an example of a physical format of a flexible disk as a recording medium itself. A flexible disk FD 1 is contained in a case F, a plurality of tracks Tr are formed concentrically on the surface of the disk in the radius direction from the periphery, and each track is divided into 16 sectors Se in the angular direction. Therefore, as for the flexible disk storing the above-mentioned program, the image coding method as the program is recorded in an area allocated for it on the flexible disk FD 1.

FIG. 34C shows the structure for recording and reading out the program on and from the flexible disk FD 1. When the program is recorded on the flexible disk FD 1, the computer system Cs writes in the image coding method or the image decoding method as a program through a flexible disk drive FDD. When the image coding method is constructed in the computer system by the program on the flexible disk FD1, the program is read out from the flexible disk drive FDD via the flexible disk FD1 and transferred to the computer system Cs.

The above explanation is made on the assumption that a recording medium is a flexible disk, but the same processing can also be performed using an optical disk. In addition, the recording medium is not limited to a flexible disk and an optical disk, but any other medium such as an IC card and a ROM cassette capable of recording a program can be used.

Furthermore, the image coding methods and the image decoding methods shown in the above-mentioned embodiments can be implemented in mobile communication devices such as a cell phone and a car navigation system and picture-taking devices such as a digital video camera and a digital still camera by semiconductors such as LSI (large scale integration). Moreover, three types of implementations can be conceived: a sending/receiving terminal implemented with both an encoder and a decoder; a sending terminal implemented with an encoder only; and a receiving terminal implemented with a decoder only.

Here, the applications of the image coding method and the image decoding method as shown in the first embodiment the tenth embodiment, and the system that uses the methods are explained.

Figure 35:
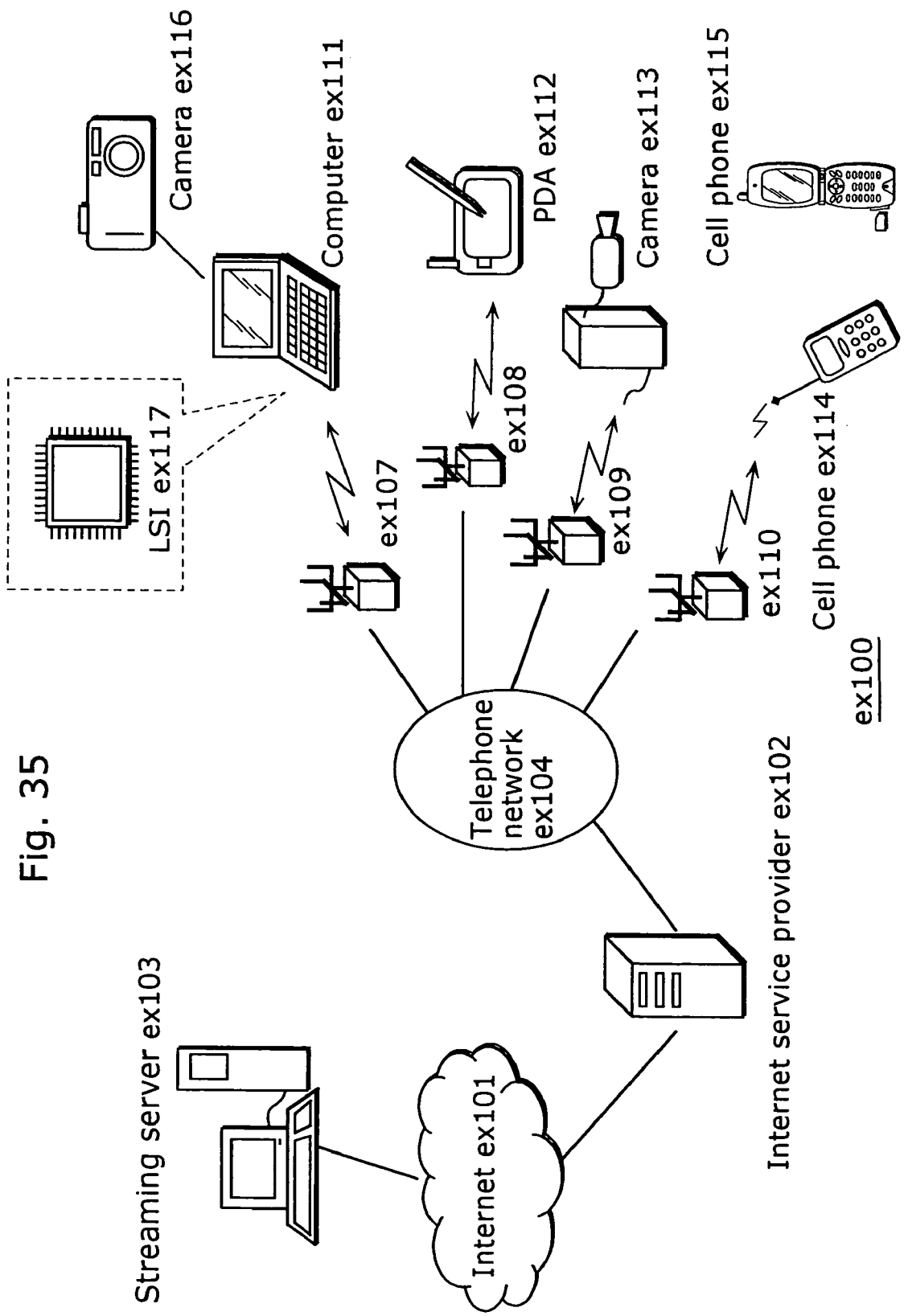
FIG. 35 is a block diagram that shows the overall configuration of a content supply system using the image coding method and the image decoding method according to the present invention.

FIG. 35 is a block diagram that shows the overall configuration of a content supply system ex100 for realizing content distribution service. The area for providing communication service is divided into cells of desired size, and cell sites ex107~ex110 which are fixed wireless stations are placed in respective cells.

This content supply system ex100 is connected to devices such as a computer ex111, a PDA (Personal Digital Assistant) ex112, a camera ex113, a cell phone ex114 and a cell phone with a camera ex115 through the Internet ex101, an Internet service provider ex102, a telephone network ex104 and cell sites ex107~ex110.

However, the content supply system ex100 is not limited to the configuration as shown in FIG. 35, and may be connected to a combination of any of them. Also, each device may be connected directly to the telephone network ex104, not through the cell sites ex107~ex110.

The camera ex113 is a device such as a digital video camera capable of shooting video (moving pictures). The cell phone ex114 may be a cell phone of a PDC (Personal Digital Communication) system, a CDMA (Code Division Multiple Access) system, a W-CDMA (Wideband-Code Division Multiple Access) system or a GSM (Global System for Mobile Communications) system, a PHS (Personal Handyphone System) or the like.

A streaming server ex103 is connected to the camera ex113 through the telephone network ex104 and the cell site ex109, which enables live distribution or the like using the camera ex113 based on the coded data transmitted from the user. Either the camera ex113 or the server for transmitting the data may code the data. Additionally, the picture data shot by a camera ex116 may be transmitted to the streaming server ex103 through the computer ex111. The camera ex116 is a device such as a digital camera capable of shooting still and moving pictures. In this case, either the camera ex116 or the computer ex111 may code the picture data. An LSI ex117 included in the computer ex111 or the camera ex116 actually performs coding processing. Software for coding and decoding images may be integrated into any type of storage medium (such as a CD-ROM, a flexible disk and a hard disk) that is a recording medium which is readable by the computer ex111 or the like. Further, a cell phone with a camera ex115 may transmit the moving picture data. This moving picture data is the data coded by the LSI included in the cell phone ex115.

The content supply system ex100 codes contents (such as a music live video) shot by users using the camera ex113, the camera ex116 or the like in the same manner as the above-mentioned embodiments and transmits them to the streaming server ex103, while the streaming server ex103 makes stream distribution of the content data to the clients at their request. The clients include the computer ex111, the PDA ex112, the camera ex113, the cell phone ex114 and the like capable of decoding the above-mentioned coded data. In the content supply system ex100, the clients can thus receive and reproduce the coded data, and further can receive, decode and reproduce the data in real time so as to realize personal broadcasting.

When each device in this system performs coding or decoding, the image coding device or the image decoding device, as shown in the above-mentioned embodiments, can be used.

A cell phone will be explained as an example of the device.

Figure 36:
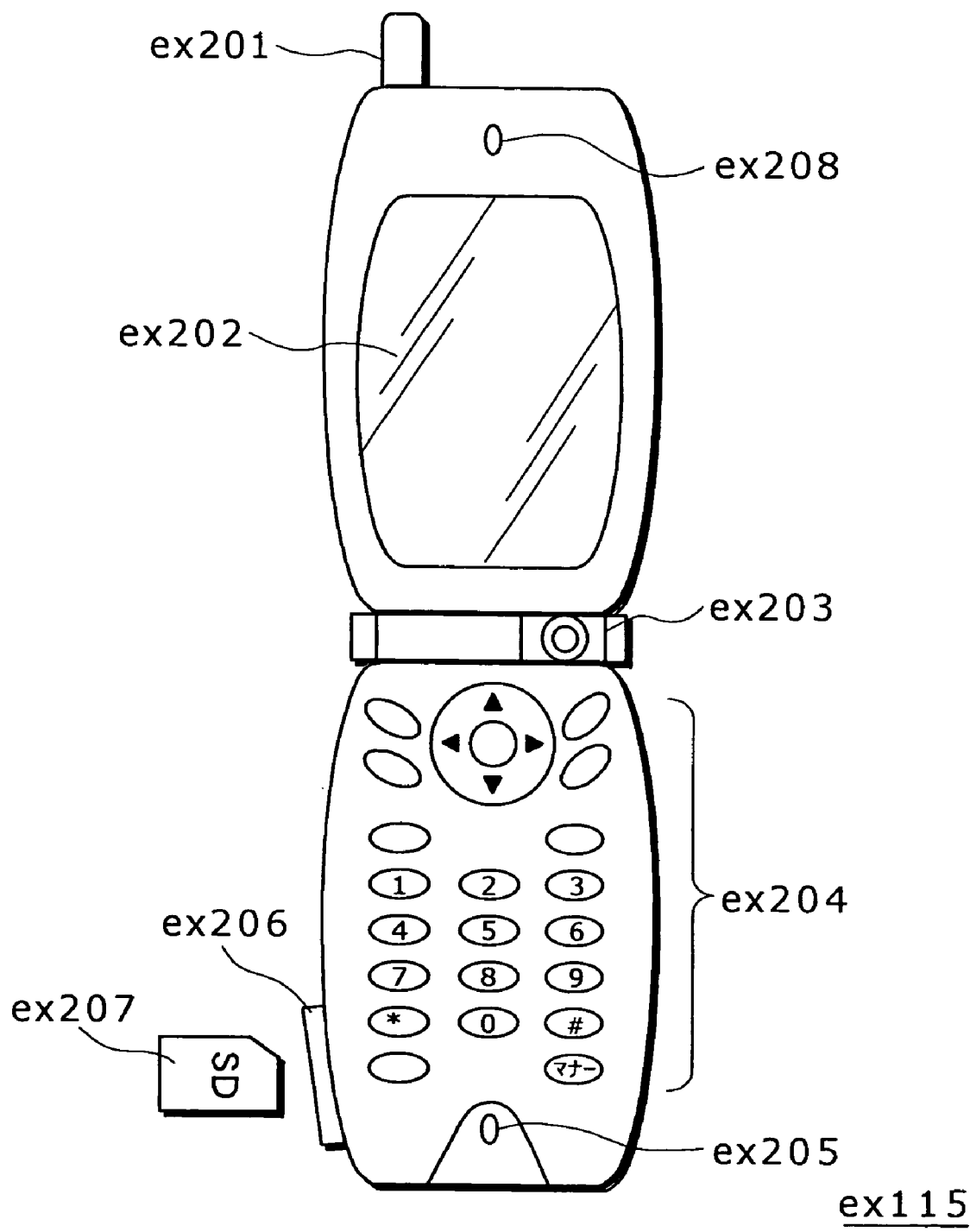
FIG. 36 is an outline view that shows an example of the cell phone using the image coding method and the image decoding method according to the present invention.

FIG. 36 is a diagram that shows the cell phone ex115 using the image coding method and the image decoding method explained in the above-mentioned embodiments. The cell phone ex115 has an antenna ex201 for communicating with the cell site ex110 through radio waves, a camera unit ex203 such as a CCD camera capable of shooting moving and still pictures, a display unit ex202 such as a liquid crystal display for displaying the data obtained by decoding pictures and the like shot by the camera unit ex203 and received by the antenna ex201, a main body including a set of operation keys ex204, a voice output unit ex208 such as a speaker for outputting voices, a voice input unit 205 such as a microphone for inputting voices, a storage medium ex207 for storing coded or decoded data such as data of moving or still pictures shot by the camera, data of received e-mails and data of moving or still pictures, and a slot unit ex206 for attaching the storage medium ex207 to the cell phone ex115. The storage medium ex207 stores in itself a flash memory element, a kind of EEPROM (Electrically Erasable and Programmable Read Only Memory) that is an electrically rewritable and erasable nonvolatile memory, in a plastic case such as a SD card.

Further, the cell phone ex115 will be explained using FIG. 37. In the cell phone ex115, a main control unit ex311 for overall controlling each unit of the main body including the display unit ex202 and operation keys ex204 is connected to a power supply circuit unit ex310, an operation input control unit ex304, a picture coding unit ex312, a camera interface unit ex303, an LCD (Liquid Crystal Display) control unit ex302, a picture decoding unit ex309, a multiplex/demultiplex unit ex308, a read/write unit ex307, a modem circuit unit ex306 and a voice processing unit ex305 to each other through a synchronous bus ex313.

When a call-end key or a power key is turned ON by a user's operation, the power supply circuit unit ex310 supplies each unit with power from a battery pack so as to activate the digital cell phone with a camera ex115 for making it into a ready state.

In the cell phone ex115, the voice processing unit ex305 converts the voice signals received by the voice input unit ex205 in conversation mode into digital voice data under the control of the main control unit ex311 including a CPU, ROM and RAM, the modem circuit unit ex306 performs spread spectrum processing of the digital voice data, and the send/receive circuit unit ex301 performs digital-to-analog conversion and frequency transform of the data, so as to transmit it through the antenna ex201. Also, in the cell phone ex115, the send/receive circuit unit ex301 amplifies the data received by the antenna ex201 in conversation mode and performs frequency transform and analog-to-digital conversion for the data, the modem circuit unit ex306 performs inverse spread spectrum processing of the data, and the voice processing unit ex305 converts it into analog voice data, so as to output it through the voice output unit 208.

Furthermore, when transmitting an e-mail in data communication mode, the text data of the e-mail inputted by operating the operation keys ex204 on the main body is sent out to the main control unit ex311 through the operation input control unit ex304. In the main control unit ex311, after the modem circuit unit ex306 performs spread spectrum processing of the text data and the send/receive circuit unit ex301 performs digital-to-analog conversion and frequency transform for it, the data is transmitted to the cell site ex110 through the antenna ex201.

When picture data is transmitted in data communication mode, the picture data shot by the camera unit ex203 is supplied to the picture coding unit ex312 through the camera interface unit ex303. When it is not transmitted, it is also possible to display the picture data shot by the camera unit ex203 directly on the display unit 202 through the camera interface unit ex303 and the LCD control unit ex302.

The picture coding unit ex312, which includes the image coding device as explained in the present invention, compress and codes the picture data supplied from the camera unit ex203 by the coding method used for the image coding device as shown in the above-mentioned embodiments so as to transform it into coded picture data, and sends it out to the multiplex/demultiplex unit ex308. At this time, the cell phone ex115 sends out the voices received by the voice input unit ex205 during shooting by the camera unit ex203 to the multiplex/demultiplex unit ex308 as digital voice data through the voice processing unit ex305.

The multiplex/demultiplex unit ex308 multiplexes the coded picture data supplied from the picture coding unit ex312 and the voice data supplied from the voice processing unit ex305 by a predetermined method, the modem circuit unit ex306 performs spread spectrum processing of the multiplexed data obtained as a result of the multiplexing, and the send/receive circuit unit ex301 performs digital-to-analog conversion and frequency transform of the data for transmitting through the antenna ex201.

As for receiving data of a moving picture file which is linked to a Web page or the like in data communication mode, the modem circuit unit ex306 performs inverse spread spectrum processing of the data received from the cell site ex110 through the antenna ex201, and sends out the multiplexed data obtained as a result of the processing to the multiplex/demultiplex unit ex308.

In order to decode the multiplexed data received through the antenna ex201, the multiplex/demultiplex unit ex308 separates the multiplexed data into a bit stream of picture data and a bit stream of voice data, and supplies the coded picture data to the picture decoding unit ex309 and the voice data to the voice processing unit ex305 respectively through the synchronous bus ex313.

Next, the picture decoding unit ex309, which includes the image decoding device as explained in the present invention, decodes the bit stream of picture data by the decoding method corresponding to the coding method as shown in the above-mentioned embodiments to generate reproduced moving picture data, and supplies this data to the display unit ex202 through the LCD control unit ex302, and thus picture data included in a moving picture file linked to a Web page, for instance, is displayed. At the same time, the voice processing unit ex305 converts the voice data into analog voice data, and supplies this data to the voice output unit ex208, and thus voice data included in a moving picture file linked to a Web page, for instance, is reproduced.

Figure 38:
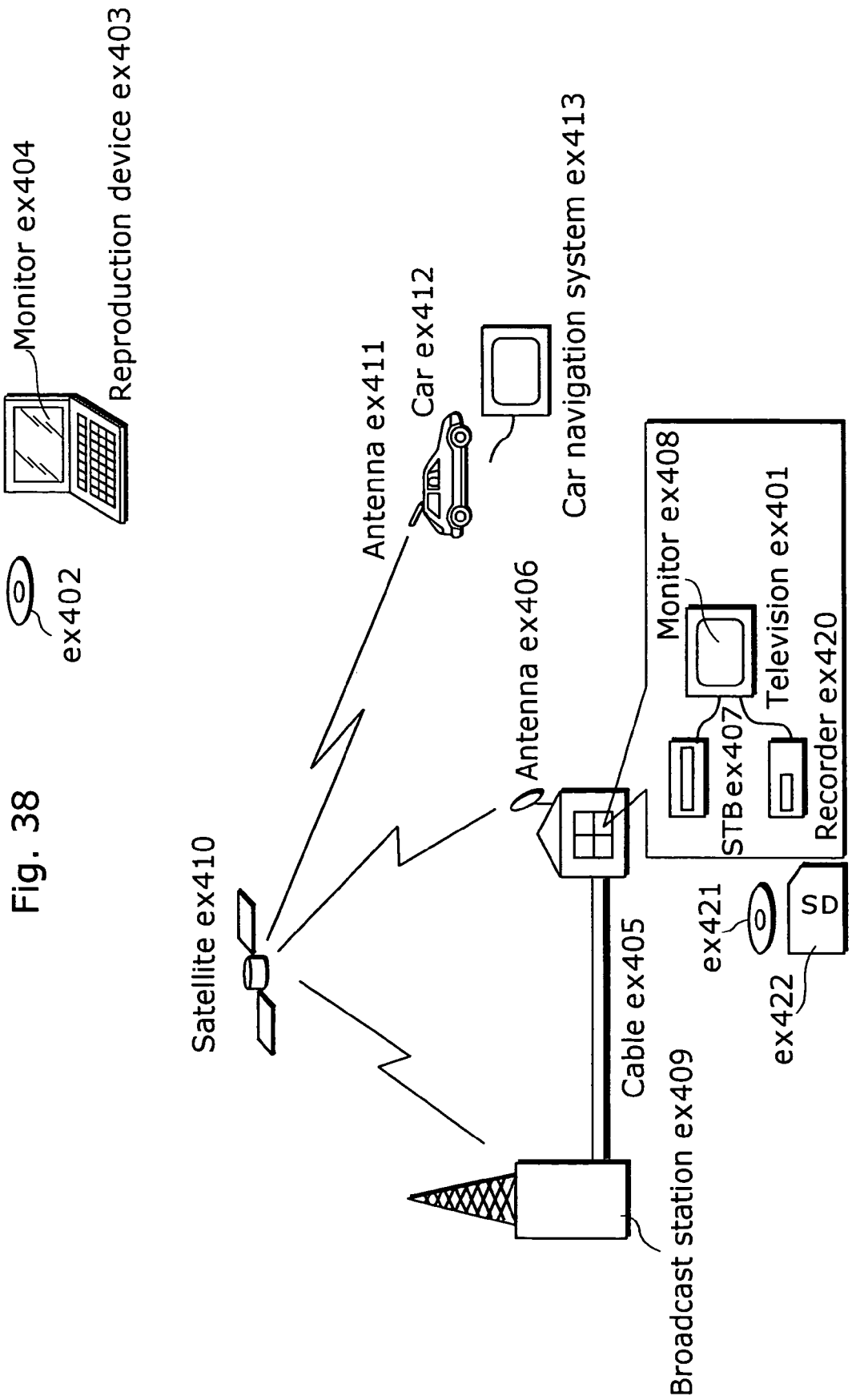
FIG. 38 is a block diagram that shows the configuration of a digital broadcasting system using the image coding method and the image decoding method according to the present invention.

The present invention is not limited to the above-mentioned system, and either the image coding device or the image decoding device in the above-mentioned embodiments can be incorporated into a digital broadcasting system as shown in FIG. 38. Such ground-based or satellite digital broadcasting has been in the news lately. More specifically, a bit stream of video information is transmitted from a broadcast station ex409 to or communicated with a broadcast satellite ex410 through radio waves. Upon receipt of it, the broadcast satellite ex410 transmits radio waves for broadcasting, a home-use antenna ex406 with a satellite broadcast reception function receives the radio waves, and a television (receiver) ex401 or a set top box (STB) ex407 decodes the bit stream for reproduction. The image decoding device as shown in the above-mentioned embodiments can be implemented in the reproduction device ex403 for reading and decoding the bit stream recorded on a storage medium ex402 that is a recording medium such as a CD and DVD. In this case, the reproduced video signals are displayed on a monitor ex404. It is also conceived to implement the image decoding device in the set top box ex407 connected to a cable ex405 for a cable television or the antenna ex406 for satellite and/or ground-based broadcasting so as to reproduce them on a monitor ex408 of the television ex401. The image decoding device may be incorporated into the television, not in the set top box. Or, a car ex412 having an antenna ex411 can receive signals from the satellite ex410 or the cell site ex107 for reproducing moving pictures on a display device such as a car navigation system ex413.

Furthermore, the image coding device as shown in the above-mentioned embodiments can code picture signals for recording on a recording medium. As a concrete example, there is a recorder ex420 such as a DVD recorder for recording picture signals on a DVD disk ex421 and a disk recorder for recording them on a hard disk. They can be recorded on an SD card ex422. If the recorder ex420 includes the image decoding device as shown in the above-mentioned embodiments, the picture signals recorded on the DVD disk ex421 or the SD card ex422 can be reproduced for display on the monitor ex408.

Figure 37:
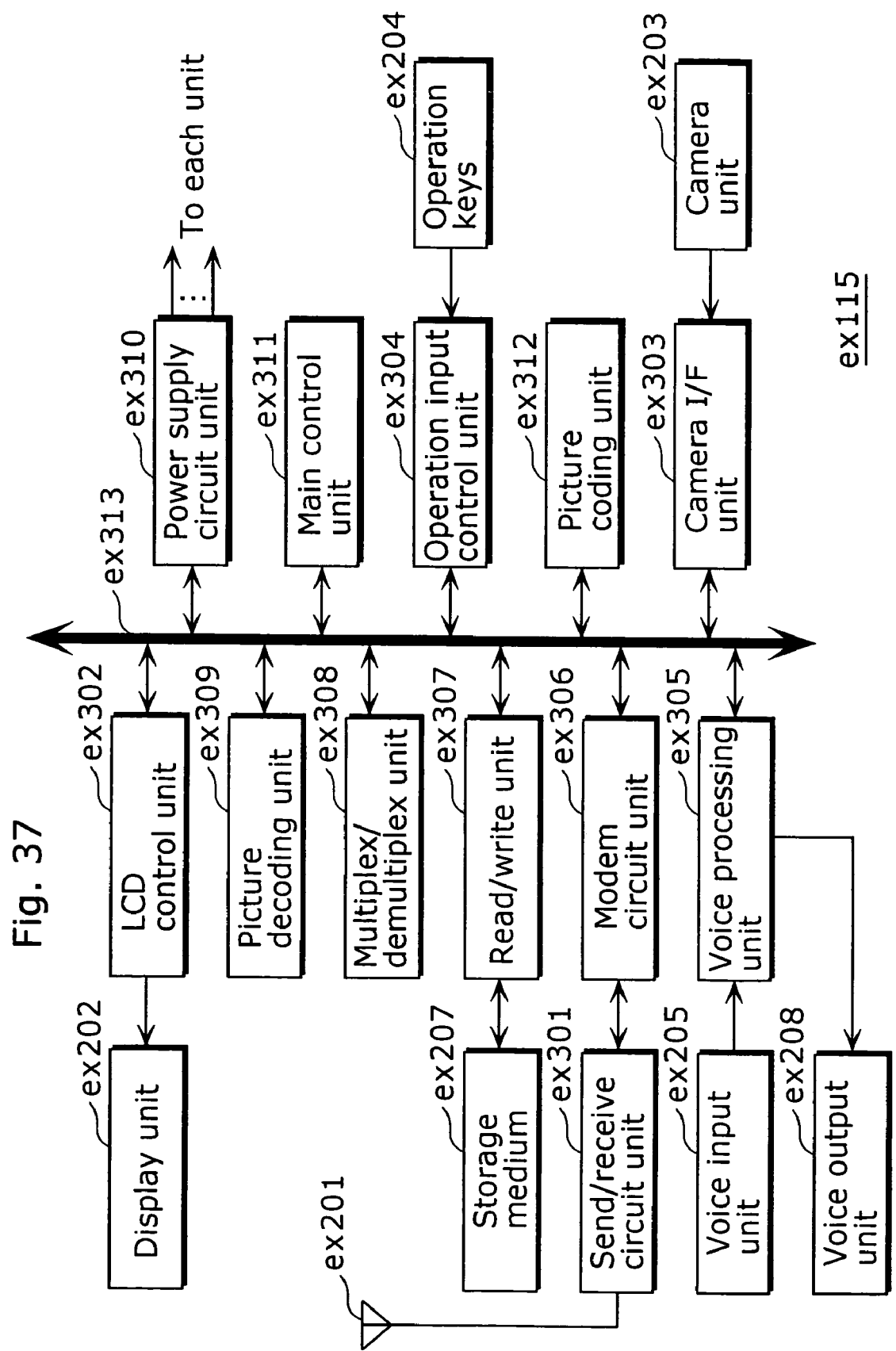
FIG. 37 is a block diagram that shows the cell phone using the image coding method and the image decoding method according to the present invention.

As the structure of the car navigation system ex413, the structure without the camera unit ex203, the camera interface unit ex303 and the picture coding unit ex312, out of the components shown in FIG. 37, is conceivable. The same goes for the computer ex111, the television (receiver) ex401 and others.

In addition, three types of implementations can be conceived for a terminal such as the above-mentioned cell phone ex114: a sending/receiving terminal implemented with both an encoder and a decoder; a sending terminal implemented with an encoder only; and a receiving terminal implemented with a decoder only.

As described above, it is possible to use the image coding method or the image decoding method in the above-mentioned embodiments in any of the above-mentioned device and system, and using this method, the effects described in the above embodiments can be obtained.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

As is described above, by the image coding methods and the image decoding methods according to the present invention, it is possible to realize the image coding method and the image decoding method for restoring the image correctly even if part of the memory management information is lost by the transmission channel error and the image coding method and the image decoding method for selecting candidates of the reference images that can be referred to more appropriately and improving the coding efficiency, and therefore its practical value is high.

INDUSTRIAL APPLICABILITY

The image coding device according to the present invention is useful as the image coding device that is included in a personal computer and a PDA (Personal Digital Assistance) that are equipped with the communication function, a digital broadcasting station, a cell phone and the like.

Additionally, the image decoding device according to the present invention is useful as the image decoding device that is included in a personal computer and a PDA that are equipped with the communication function, an STB (set-top box) that receives digital broadcasting, a cell phone and the like.

The invention claimed is:

1. A picture coding method for coding a picture with reference to a reference picture selected from among reference pictures stored in a memory, said method comprising:
    coding a current picture to be coded with reference to a selected reference picture;
    coding first memory management information for managing the reference pictures stored in the memory, the first memory management information being attached to the coded current picture; and
    coding the first memory management information again as second memory management information, the second memory management information being attached to another picture which is different from the current picture.

* * * * *